United States Patent
Tezuka et al.

(10) Patent No.: US 7,034,850 B2
(45) Date of Patent: Apr. 25, 2006

(54) DISPLAYING METHOD, DISPLAYING APPARATUS, FILTERING UNIT, FILTERING PROCESS METHOD, RECORDING MEDIUM FOR STORING FILTERING PROCESS PROGRAMS, AND METHOD FOR PROCESSING IMAGES

(75) Inventors: Tadanori Tezuka, Kaho-Gun (JP); Hiroki Taoka, Osaka (JP); Bunpei Toji, Iizuka (JP); Hiroyuki Yoshida, Kasuya-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 474 days.

(21) Appl. No.: 10/318,212

(22) Filed: Dec. 13, 2002

(65) Prior Publication Data

US 2003/0146920 A1 Aug. 7, 2003

(30) Foreign Application Priority Data

Dec. 13, 2001 (JP) ............................. 2001-379733
Dec. 20, 2001 (JP) ............................. 2001-387290
Jan. 21, 2002 (JP) ............................. 2002-011851

(51) Int. Cl.
*G09G 5/02* (2006.01)

(52) U.S. Cl. ...................... 345/640; 348/590; 345/600; 345/636

(58) Field of Classification Search ................ 345/600, 345/636, 639, 641, 640; 348/590, 591, 597
See application file for complete search history.

(56) References Cited

U.S. PATENT DOCUMENTS

| | | | | |
|---|---|---|---|---|
| 5,821,913 A | * | 10/1998 | Mamiya | 345/88 |
| 6,188,385 B1 | | 2/2001 | Hill et al. | |
| 6,219,025 B1 | * | 4/2001 | Hill et al. | 345/589 |
| 6,225,973 B1 | * | 5/2001 | Hill et al. | 345/589 |
| 6,239,783 B1 | * | 5/2001 | Hill et al. | 345/694 |
| 6,278,434 B1 | * | 8/2001 | Hill et al. | 345/660 |
| 6,542,161 B1 | * | 4/2003 | Koyama et al. | 345/589 |
| 2002/0008714 A1 | * | 1/2002 | Tezuka et al. | 345/694 |

* cited by examiner

*Primary Examiner*—Richard Hjerpe
*Assistant Examiner*—Michelle K. Lay
(74) *Attorney, Agent, or Firm*—Wenderoth, Lind & Ponack, L.L.P.

(57) ABSTRACT

A line image which comprises one line parallel to the juxtaposing direction of light-emitting elements is extracted from a three-time image, and a work region is determined, in which, in the juxtaposing direction, an M sub-pixel is added to the front side of the line image and an N sub-pixel is added to the rear side thereof. A background image of a region corresponding to the work region is read out from the frame memory. The read out background image whose precision is made the same as that of the three-time image in a pseudo state, and the line image are blended to obtain a blend image. Image data resulting from the blend image are written in a region corresponding to the work region of the frame memory. The above process is repeated for all lines of the three-time image.

18 Claims, 31 Drawing Sheets

Fig. 2

| index<br>fields | 1 | | | 2 | | | k | | | k+1 | | |
|---|---|---|---|---|---|---|---|---|---|---|---|---|
| background | $Rb_1$ | $Gb_1$ | $Bb_1$ | $Rb_2$ | $Gb_2$ | $Bb_2$ | $Rb_k$ | $Gb_k$ | $Bb_k$ | — | — | — |
| foreground | $Rf_1$ | $Gf_1$ | $Bf_1$ | $Rf_2$ | $Gf_2$ | $Bf_2$ | $Rf_k$ | $Gf_k$ | $Bf_k$ | — | — | — |
| α value | $\alpha_1$ | | | $\alpha_2$ | | | $\alpha_k$ | | | — | | |
| β | $\beta_1$ | | | $\beta_2$ | | | $\beta_k$ | | | — | | |
| blending | $R_1$ | $G_1$ | $B_1$ | $R_2$ | $G_2$ | $B_2$ | $R_k$ | $G_k$ | $B_k$ | — | — | — |
| conversion | $Y_1$ | $Cb_1$ | $Cr_1$ | $Y_2$ | $Cb_2$ | $Cr_2$ | $Y_k$ | $Cb_k$ | $Cr_k$ | — | — | — |
| filter | $Y_1^{\#}$ | | | $Y_2^{\#}$ | | | $Y_k^{\#}$ | | | — | | |
| hue | $Cb_1^{\#}$ | | $Cr_1^{\#}$ | $Cb_1^{\#}$ | | $Cr_1^{\#}$ | $Cb_m^{\#}$ | | $Cr_m^{\#}$ | — | | — |
| inverse<br>conversion | $R_1^{\#}$ | $G_1^{\#}$ | $B_1^{\#}$ | $R_1^{\#}$ | $G_1^{\#}$ | $B_1^{\#}$ | $R_m^{\#}$ | $G_m^{\#}$ | $B_m^{\#}$ | — | — | — | k = 3m work region length m
(pixel precision)

$m = (M + \text{len} + N) / 3$ $(x, y) = (9, 3)$, $\text{len} = 2 \rightarrow M = 3$, $\text{len} = 2$, $N = 4$ $m = 3$ (pixel precision)
$sx = (9 \text{ div } 3) - 1 = 2$ (pixel precision)

Fig. 14 (a)
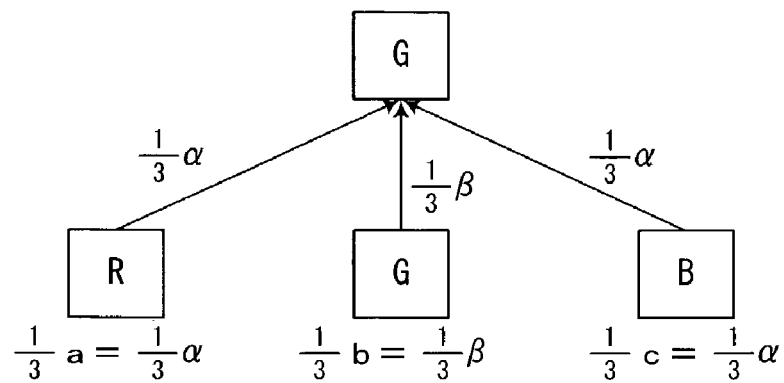
Fig. 14 (b)
| α value | a | b | c |
|---|---|---|---|
| 0.0 | 0 | 3 | 0 |
| ⋮ | ⋮ | ⋮ | ⋮ |
| 0.5 | 0.5 | 2 | 0.5 |
| ⋮ | ⋮ | ⋮ | ⋮ |
| 1.0 | 1 | 1 | 1 |
Fig. 14 (c)
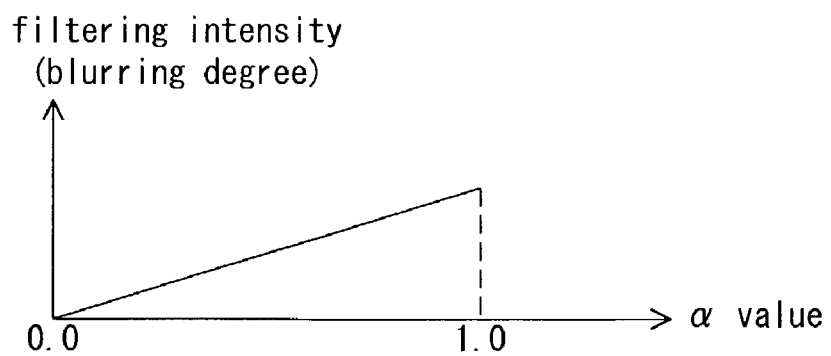

| α value | A | B | C | D | E |
|---|---|---|---|---|---|
| 0.0 | 0 | 0 | 9 | 0 | 0 |
| ⋮ | ⋮ | ⋮ | ⋮ | ⋮ | ⋮ |
| 0.5 | 0.25 | 2 | 4.5 | 2 | 0.25 |
| ⋮ | ⋮ | ⋮ | ⋮ | ⋮ | ⋮ |
| 1.0 | 1 | 2 | 3 | 2 | 1 |

| α value | a | b | c |
|---|---|---|---|
| 0.0 | 0 | 3 | 0 |
| ⋮ | ⋮ | ⋮ | ⋮ |
| 0.1 | 0.5 | 2 | 0.5 |
| ⋮ | ⋮ | ⋮ | ⋮ |
| 0.2 | 1 | 1 | 1 |
| ⋮ | ⋮ | ⋮ | ⋮ |
| 0.6 | 1 | 1 | 1 |
| ⋮ | ⋮ | ⋮ | ⋮ |
| 1.0 | 1 | 1 | 1 |

Fig. 18

| α value | A | B | C | D | E |
|---|---|---|---|---|---|
| 0.0 | 0 | 0 | 9 | 0 | 0 |
| ⋮ | ⋮ | ⋮ | ⋮ | ⋮ | ⋮ |
| 0.1 | 0.25 | 2 | 4.5 | 2 | 0.25 |
| ⋮ | ⋮ | ⋮ | ⋮ | ⋮ | ⋮ |
| 0.2 | 1 | 2 | 3 | 2 | 1 |
| ⋮ | ⋮ | ⋮ | ⋮ | ⋮ | ⋮ |
| 0.6 | 1 | 2 | 3 | 2 | 1 |
| ⋮ | ⋮ | ⋮ | ⋮ | ⋮ | ⋮ |
| 1.0 | 1 | 2 | 3 | 2 | 1 | target sub-pixel $$V(x, y) = \frac{1}{9}Y(x-2, y) + \frac{2}{9}Y(x-1, y) + \frac{3}{9}Y(x, y)$$
$$+ \frac{2}{9}Y(x+1, y) + \frac{1}{9}Y(x+2, y)$$

DISPLAYING METHOD, DISPLAYING APPARATUS, FILTERING UNIT, FILTERING PROCESS METHOD, RECORDING MEDIUM FOR STORING FILTERING PROCESS PROGRAMS, AND METHOD FOR PROCESSING IMAGES

BACKGROUND OF THE INVENTION

1. Field of the Invention

The present invention relates to a displaying method utilizing a sub-pixel display technology and arts related thereto.

2. Description of the Related Art

Displaying apparatuses utilizing various types of display devices have been conventionally used. Of such displaying apparatuses, there is, for example, a type such as a color LCD, color plasma display, etc., in which three light-emitting elements each emitting three primary colors R, G and B are disposed in prescribed order to comprise one pixel, the pixels are juxtaposed in the first direction to comprise one line, and a plurality of lines are provided in the second direction orthogonal to the first direction to comprise a display panel.

For example, there are many display devices whose display screen is comparatively narrow and by which it is difficult to provide fine display as in display devices built in cellular telephones, mobile computers, etc. In such display devices, if an attempt is made to display small characters, photographs or complicated pictures, etc., a portion of the image collapses and easily becomes unclear.

In order to improve display sharpness on a narrow display panel, literature (Title: [Sub-pixel Font Rendering Technology]) regarding sub-pixel displaying, that utilizes one pixel consisting of three light-emitting elements of R, G and B, has been laid open on the Internet. The present inventor et al. downloaded and confirmed the literature from the Site (http://grc.com) or its peripheries on Jun. 19, 2000.

Next, a description is given of the technology with reference to FIG. 28 through FIG. 33. The English letter [A] is taken as an example of an image that is displayed.

Here, FIG. 28 is an exemplary of a single line in the case where a single pixel is thus formed of three light-emitting elements. The horizontal direction (that is, the direction along which light-emitting elements of the three primary colors R, G and B are arranged) in FIG. 28 is called the first direction, and the longitudinal direction orthogonal thereto is called the second direction.

In the present specification, there are cases where the first direction is called a "juxtaposing direction".

Also, the aligning queue of the light-emitting elements is not the order of R, G and B. Another aligning queue may be taken into consideration. However, even if the aligning queue is changed, the prior art and the invention are applicable as well.

And, the single pixel (three light-emitting elements) is arranged in a row in the first direction to comprise a single line. Further, the line is arranged in the second direction to comprise a display panel.

In the sub-pixel technology, an original image is an image shown in, for example, FIG. 29. In this example, the letter [A] is displayed in a region consisting of seven pixels in both horizontal and longitudinal directions. On the contrary, where respective light-emitting elements of R, G and B are regarded as a single pixel in order to provide a sub-pixel display, as shown in FIG. 30, a font that has resolution power three times in the horizontal direction in a region consisting of 21 (=7×3) pixels in the horizontal direction and seven pixels in the longitudinal direction is prepared.

And, as shown in FIG. 31, colors of the respective pixels in FIG. 29 (that is, pixels not existing in FIG. 30 but existing in FIG. 29) are defined. If the letter is merely displayed as it is, color unevenness occurs. Therefore, as shown in FIG. 32(a), a filtering process is carried out on the basis of coefficients (factors). In FIG. 32(a), the coefficients are shown, corresponding to brightness. Coefficients such as 3/9 times for the center target sub-pixel, 2/9 times for the sub-pixels adjacent thereto, and 1/9 times for the sub-pixels further adjacent thereto are multiplied to adjust the brightness of the respective sub-pixels.

Next, referring to FIG. 33, a detailed description is given of these coefficients. In FIG. 33, an [*] indicates that any one of the light-emitting elements of the three primary colors of R, G and B may be acceptable. And, a filtering process is commenced from the first stage at the bottom, and is shifted to the second stage and the third stage in order.

Herein, when shifting from the first stage to the second stage, energy is uniformly collected at any one of the light-emitting elements of the three primary colors R, G and B. That is, the coefficient for the first stage is only 1/3. Similarly, when shifting from the second stage to the third stage, energy is uniformly collected, that is, the coefficient for the second stage is only 1/3.

However, since a target sub-pixel in the third stage can be reached through the center sub-pixel, left sub-pixel and right sub-pixel in the second stage from the center sub-pixel in the first stage, that is, three channels in total, a synthetic coefficient (which is provided by adding the coefficient in the first stage to that in the second stage) of the center sub-pixel in the first stage becomes $1/3 \times 1/3 + 1/3 \times 1/3 + 1/3 \times 1/3 = 3/9$.

Also, since there are two channels to reach the target sub-pixel of the third stage from the sub-pixels adjacent to the center sub-pixel of the first stage, the synthetic coefficient of the sub-pixels adjacent to the center sub-pixel of the first stage becomes $1/3 \times 1/3 + 1/3 \times 1/3 = 2/9$.

In addition, since there is only one channel to reach the target sub-pixel of the third stage from the sub-pixels adjacent next to the center sub-pixel of the first stage, the synthetic coefficient of the sub-pixels adjacent next to the center sub-pixel of the first stage becomes $1/3 \times 1/3 = 1/9$.

By using a filtering process as described above utilizing a feature (the point in which a single pixel consists of three sub-pixels) of a display device, ease in viewing can be improved rather than mere display of pixel precision.

A technology similar to the above is also disclosed in Patent Publication No. WO 00142762, etc.

With these prior arts, there is a premise in that comparatively small graphic objects such as fonts and icons are displayed. And, the filtering process is carried out in terms of one-pixel precision.

On the other hand, as graphic objects, there are objects composed of geometric elements such as a straight line, a curved line, a circle, an ellipse, etc., and a comparatively large object like a bitmap image in addition to the above. In particular, taking note of the features of this type of display device, it is considered that a three-time image is displayed, in which precision in the juxtaposing direction is made three times that of the direction orthogonal to the juxtaposing direction.

The three-time images may be those inputted by a digital camera, scanner, etc., and may also be those to which some processes are applied thereto, or further, may be those artificially produced by various types of graphic editing applications (which may be either raster type or vector type, may be two-dimensional or three-dimensional, and includes computer-graphic applications).

OBJECTS OF SUMMARY OF THE INVENTION (Problem 1) However, with prior arts, no consideration is taken into a process of superimposing a foreground image on a background image. As a matter of course, no countermeasure is taken. Therefore, if a type of superimposing process is carried out, color blurring results in the vicinity of the boundary of the background image and foreground image, wherein a problem occurs in that the display quality is lowered.

(Problem 2) Also, there was no technology for blending a foreground image with a background image, to which a filtering process as described above is applied, in a translucent state.

Therefore, conventionally, no assumption is taken for a filtering process with respect to an image (more specifically, called an alpha blending image), which is obtained by such a translucent blending process, wherein no countermeasure is taken.

It is therefore an object of the present invention to solve the above-described first and second problems. The details thereof are given below.

It is an object of the invention to provide a technique for efficiently and easily displaying a comparatively large graphic object while being superimposed with a background image.

Also, it is another object of the invention to provide a filter unit, which is capable of generating a high-quality image, with an adequate filtering process applied, with respect to an image which is obtained by translucently blending a foreground image with a background image (that is, an alpha blending image), and its related technology.

A displaying method according to the first aspect of the invention is to cause a display device, which comprises a single pixel by aligning three light-emitting elements emitting respective colors of R, G and B in the juxtaposing direction, to execute display by independently controlling the light-emitting elements on the basis of data of a frame memory.

And, the method comprises the first step of extracting a line image that comprises a line parallel to the juxtaposing direction of the light-emitting elements, the second step of determining a work region in which an M sub-pixel is added to the front side of the line image and an N sub-pixel is added to the back side thereof in the juxtaposing direction (where M and N are natural numbers), the third step of reading out a background image in a region corresponding to the work region from a frame memory, the fourth step of obtaining a blend image by blending an image, which is obtained by making the read out background image into the same precision as a three-time image in a pseudo state, and the line image, and the fifth step of writing image data resulting from the blend image in a region corresponding to the work region of the frame memory, and the first step through the fifth step are repeated for all the lines of a three-time image.

With such a configuration, since the process is carried out line by line in parallel to the juxtaposing direction, it is possible to efficiently process three-time images which are longer in the direction.

In addition, in the second step, since a work region in which M and N sub-pixels are added before and after the line image is established, the process is carried out in a larger range than the line image.

Herein, when superimposing a line image, which comprises a portion or the entirety of a foreground image, on a background image, colors blur in the vicinity of the boundary of these images.

Accordingly, with the configuration, the work region is set to a slightly larger range, and the vicinity of the boundary is devised to be included in the work region, wherein a blending process is carried out, including the vicinity of the boundary, thereby preventing color blurring from occurring and improving the display quality.

Further, in the fourth step, since an image in which a read out background image is made the same precision as that of a three-time image in a pseudo state is blended with a line image, it is possible to superimpose a background existing in the frame memory on the line image which becomes a foreground image with respect thereto apparently at the same precision while maintaining the quality level of fine brightness components, which the three-time image has, and it is possible to sufficiently reflect the display quality of the three-time image onto the display results.

In a displaying method according to the second aspect of the invention, in addition to the first aspect of the invention, the work region has a length which can be divided by three in terms of the sub-pixel precision.

By this configuration, since it is possible to make the length of a portion of the region of the frame memory completely coincident with the length of the work region, in the fourth step, it is possible to neatly superimpose the background image on the foreground image.

In a displaying method according to the third aspect of the invention, in addition to the first aspect or the second aspect of the invention, an $\alpha$ value regarding the line image is obtained in the first step, and is blended in compliance with an $\alpha$ value obtained in the fourth step.

By this configuration, it is possible to adjust the superimposing degree of the background in the frame memory and the foreground of the line image in compliance with the $\alpha$ value.

In a displaying method according to the fourth aspect of the invention, in addition to the third aspect of the invention, the $\alpha$ value used for blending is compared with a fixed threshold value in terms of size, and filter parameter $\beta$ that is normalized to be 0 or 1 is generated.

By this configuration, it is possible to cause the range, for which a filtering process is applied, to relate to the $\alpha$ value.

In a displaying method according to the fifth aspect of the invention, in addition to the fourth aspect of the invention, a range where $\beta=1$ is established is enlarged before applying a filtering process of brightness components.

By this configuration, the range for which a filtering process is applied is enlarged, and the filtering process can be operated in the vicinity of the boundary between the line image and the background image.

In a displaying method according to the sixth aspect of the invention, in addition to the third, fourth or fifth aspect of the invention, a filtering process is applied to brightness components in a range where $\beta=1$ is established.

By this configuration, the filtering process is operated in the vicinity of the boundary between the line image and the background image, wherein color blurring can be suppressed, and display quality can be improved.

In a displaying method according to the seventh aspect of the invention, in addition to the first, second, third, fourth, fifth or sixth aspect of the invention, color conversion from a color space RGB to a color space YCbCr is made by Y=G, Cb=G−B and Cr=G−R, and inverted color conversion from the color space YCbCr to the color space RGB is made by R=Y−Cr, G=Y and B=Y−Cb.

By this configuration, multiplication that require high calculation cost can be omitted while suppressing image deterioration in line with the conversions, wherein high-speed processing can be achieved.

A filtering unit according to the eighth aspect of the invention is provided with a unit for determining a filtering coefficient, which is applied to an alpha blending image obtained by translucent blending, on the basis of an α value used in translucent blending of a foreground image with a background image, and a unit for applying a filtering process with respect to the alpha blending image on the basis of a filtering coefficient that is determined by the filtering coefficient determining unit.

By this configuration, since the filtering coefficient can be determined in response to the size of an α value (degree of translucent blending), filtering intensity with respect to a portion (background portion), where the α value is small and the background image intensively appears, of the alpha blending images can be made small.

Resultantly, the background portion of the alpha blending images can be prevented from blurring due to a filtering process, and a high-quality image can be generated.

In a filtering unit according to the ninth aspect of the invention, in addition to the eighth aspect of the invention, both the background image and foreground image are grayscale images.

By this configuration, where grayscale images are translucently blended, and a filter process is applied to the alpha blending image, it is possible to suppress the background portion of the alpha blending image from blurring.

In a filtering unit according to the tenth aspect of the invention, in addition to the eighth aspect of the invention, both a background image and a foreground image are color images.

By this configuration, where color images are translucently blended, and a filtering process is applied to the alpha blending image, it is possible to prevent the background portion of the alpha blending image from blurring.

In a filtering unit according to the eleventh aspect of the invention, in addition to the eighth aspect of the invention, either one of the background image or foreground image is a grayscale image, and the other is a color image.

By this configuration, where a color image and a grayscale image are translucently blended, and a filter process is applied to the alpha blending image, it is possible to suppress the background portion of the alpha blending image from blurring.

In a filtering unit according to the twelfth aspect of the invention, in addition to the tenth aspect or the eleventh aspect of the invention, the type of color image is YCbCr.

By this configuration, since a filtering process is carried out for a Y component that is precisely a brightness component of the color image, a filtering effect can be remarkably effectively displayed, and color unevenness can be remarkably effectively suppressed.

In a filtering unit according to the thirteenth aspect of the invention, in addition to the eighth, ninth, tenth, eleventh, or twelfth aspect of the invention, the filtering coefficient determining unit determines a filtering coefficient for a filtering process with respect to data of a target sub-pixel as a function of an α value that is used when generating data of the target sub-pixel of the alpha blending image.

By this configuration, if a function that weakens the filtering intensity for the background portion of the alpha blending image is employed, the background portion of the alpha blending image can be prevented from blurring due to the filtering process.

In a filtering unit according to the fourteenth aspect of the invention, in addition to the thirteenth aspect of the invention, the filtering coefficient determining unit determines filtering coefficients so that, where an α value used to generate data of the target sub-pixel of the alpha blending image is [α], the ratio of the three filtering coefficients for a filtering process with respect to a target sub-pixel becomes as follows:

$$\alpha:1+2(1-\alpha):\alpha$$

By this configuration, while, in the background portion where the α value is small, the filtering intensity is weakened in response to the size of [α], and the background portion of the alpha blending image can be prevented from blurring, the filtering intensity is strengthened in response to the size of [α] in the foreground portion where the α value is not small (that is, a portion where a complete foreground portion only, a portion where an almost complete foreground portion only, or a portion where the background is made transparent in the foreground), and the foreground portion of the alpha blending image can be prevented from blurring.

Also, since there are three filtering coefficients for a filtering process with respect to data of the target sub-pixel, the filtering coefficients can be simply determined, and the filtering process can be also easily carried out, wherein the processing speed can be improved.

In a filtering unit according to the fifteenth aspect of the invention, in addition to the thirteenth aspect of the invention, the filtering coefficient determining unit determines the filtering coefficients so that, where an α value used to generate data of the target sub-pixel of the alpha blending image is made into [α], the ratio of five filtering coefficients for the filtering process with respect to data of the target sub-pixel becomes as follows:

$$\alpha^2:2\alpha\beta:2\alpha^2+\beta^2:2\alpha\beta:\alpha^2\beta=1+2(1-\alpha)$$

By this configuration, while the filtering intensity is weakened in response to the size of [α] in the background portion where the α value is small, and it is possible to prevent the background portion of the alpha blending image from blurring, the filtering intensity is strengthened in response to the size of [α] in the foreground portion where the α value is not small (that is, a portion where a complete foreground portion only, a portion where an almost complete foreground portion only, or a portion where the background is made transparent into the foreground), and it is possible to prevent the foreground portion of the alpha blending image from color unevenness.

Further, since there are five filtering coefficients for a filtering process with respect to data of the target sub-pixel, a fine filtering process can be carried out with respect to the foreground portion of the alpha blending image.

As a result, it is possible to remarkably effectively prevent color unevenness with regard to the foreground portion of the alpha blending image.

In a filtering unit according to the sixteenth aspect of the invention, in addition to the eighth, ninth, tenth, eleventh or twelfth aspect of the invention, where an α value used to generate data of the target sub-pixel of the alpha blending image is made into [α], the filtering coefficient determining unit determines the filtering coefficient to be fixed in the case of α>0.2 and determines the filtering coefficient as a function of [α] in the case of α≦0.2.

By this configuration, where $\alpha \leq 0.2$, when looking at an alpha blending image, a human recognizes that it is a portion of only the background. Therefore, if a function by which the filtering intensity is weakened in response to the size of [$\alpha$] is employed only where $\alpha \leq 0.2$, it is possible to prevent the background portion of the alpha blending image from blurring in a practical range of use.

On the other hand, when looking at an alpha blending image where $\alpha > 0.2$, a human recognizes that it is a portion of only the foreground or a portion where the background is made transparent into a foreground. Therefore, when $\alpha > 0.2$, by carrying out a filtering process using a filter coefficient of a fixed value by which the filtering intensity is strengthened, the foreground portion (that is, a portion where complete foreground portion only, a portion where an almost complete foreground portion only, or a portion where the background is made transparent into the foreground) of the alpha blending image can be prevented from color unevenness, and at the same time, a process for $\alpha > 0.2$ can be simplified, and the process can be accelerated.

In a filtering unit according to the seventeenth aspect of the invention, in addition to the sixteenth aspect of the invention, the filtering coefficient determining unit determines filtering coefficients so that, wherein an $\alpha$ value used to generate data of the target sub-pixel of the alpha blending image is made into [$\alpha$], the ratio of the three filtering coefficients for the filtering process with respect to data of the target sub-pixel becomes as follows:

then $\alpha > 0.2$

1:1:1 then $\alpha \leq 0.2$ $\alpha\#:1+2(1-\alpha\#):\alpha\# \quad \alpha\#=5.0\times\alpha$ By this configuration, in a portion where, when a human looks at an alpha blending image, it is recognized that it is a portion of only the background ($\alpha \leq 0.2$), the filtering intensity is weakened in response to the size of [$\alpha$], wherein it is possible to prevent the background portion of the alpha blending image from blurring in a practical range of use.

Furthermore, since there are three filtering coefficients for a filtering process with respect to data of the target sub-pixel, the filtering coefficient can be simply determined where $\alpha \leq 0.2$, and the filtering process can be easily carried out, wherein the processing speed can be accelerated as a whole.

On the other hand, at a portion where a human recognizes that, when looking at an alpha blending image, it is a portion of only the foreground or a portion where the background is made transparent into the foreground ($\alpha > 0.2$), the filtering intensity is strengthened, and color unevenness of the foreground portion of the alpha blending image can be suppressed.

In a filtering unit according to the eighteenth aspect of the invention, in addition to the sixteenth aspect of the invention, the filtering coefficient determining unit determines filtering coefficients so that, where an $\alpha$ value used to generate data of the target sub-pixel of the alpha blending image is made into [$\alpha$], the ratio of five filtering coefficients for a filtering process with respect to data of the target sub-pixel becomes as follows:

then $\alpha > 0.2$

1:2:3:2:1 then $\alpha \leq 0.2$ $\alpha\#^2:2\alpha\#\beta:2\alpha\#^2+\beta^2:2\alpha\#\beta:\alpha\#^2 \quad \alpha\#=5.0\times\alpha \quad \beta=1+2(1-\alpha\#)$ By this configuration, the filtering intensity is weakened in response to the size of [$\alpha$] at a portion where, when a human looks at an alpha blending image, it is recognized that it is a portion of only the background ($\alpha \leq 0.2$), and it is possible to prevent the background portion of the alpha blending image from blurring in the sufficiently practical range of use.

On the other hand, the filtering intensity is strengthened at a portion where, when a human looks at an alpha blending image, it is recognized that it is a portion of only the foreground or a portion where the background is made transparent into the foreground ($\alpha > 0.2$), and color phase irregularity of the foreground portion of the alpha blending image can be suppressed.

In addition, since there are five filtering coefficients for a filtering process with respect to data of the target sub-pixel, a fine filtering process can be carried out for the foreground portion of the alpha blending image, and color unevenness can be remarkably effectively suppressed.

In a filtering unit according to the nineteenth aspect of the invention, in addition to the eighth, ninth, tenth, eleventh or twelfth aspect of the invention, the filtering coefficient determining unit determines a filtering coefficient for a filtering process with respect to data of the target sub-pixel as a function of the $\alpha$ value that is obtained from a plurality of $\alpha$ values used to generate a plurality of data of a plurality of sub-pixels in a prescribed range including the target sub-pixel of the alpha blending image.

By this configuration, by employing a function for which the filtering intensity with respect to the background portion of the alpha blending image is weakened, the background portion of the alpha blending image can be prevented from blurring due to the filtering process.

In addition, by obtaining the $\alpha$ value, for which the filtering intensity is strengthened when substituted in the function, from a plurality of $\alpha$ values of a plurality of sub-pixels in a prescribed range including the target sub-pixel, the blurring degree of the target sub-pixel can be increased.

As a result, color phase irregularity, resulting from a radical change in the filtering coefficients where the $\alpha$ value remarkably changes between the sub-pixels belonging to a prescribed range, can be suppressed.

In a filtering unit according to the twentieth aspect of the invention, in addition to the nineteenth aspect of the invention, the filtering coefficient determining unit determines the filtering coefficients so that, where an $\alpha$ value used to generate data of the target sub-pixel of the alpha blending image is made into [$\alpha 1$], an $\alpha$ value used to generate data of a sub-pixel adjacent to one side of the target sub-pixel is made into [$\alpha 2$], and an $\alpha$ value used to generate data of a sub-pixel adjacent to the other side of the target sub-pixel is made into [$\alpha 3$], and the maximum value among [$\alpha 1$], [$\alpha 2$] and [$\alpha 3$] is made into [$\alpha\$$], the ratio of the three filtering coefficients for a filtering process with respect to data of the target sub-pixel becomes as follows:

$\alpha\$:1+2(1-\alpha\$):\alpha\$$

By this configuration, while the filtering intensity is weakened at the background portion in which the $\alpha$ value is small, and the background portion of the alpha blending image can be prevented from blurring, the filtering intensity is strengthened at the foreground portion (that is, a portion where a complete foreground only, a portion where an almost complete foreground only, or a portion where the background is made transparent into the foreground) where the α value is not small, and color unevenness of the foreground portion of the alpha blending image can be suppressed.

Also, by determining a filtering coefficient using the maximum value [α$] of the three α values of the target sub-pixel and sub-pixels adjacent thereto, the filtering intensity is strengthened, and the blurring degree of the target sub-pixel can be increased.

As a result, in a case where the α value remarkably changes between the adjacent sub-pixels, it is possible to prevent color phase irregularity resulting from a radical change in the filtering coefficient.

In addition, since there are three filtering coefficients for the filtering process with respect to data of the target sub-pixel, the filtering coefficients can be easily determined, and the filtering process can be simply carried out, wherein the processing speed can be accelerated.

In a filtering unit according to the twenty-first aspect of the invention, in addition to the nineteenth aspect of the invention, the filtering coefficient determining unit determines filtering coefficients so that, where an α value used to generate data of the target sub-pixel of an alpha blending image is made into [α1], an α value used to generate data of a sub-pixel closer to the target sub-pixel of two sub-pixels consecutively adjacent to one side of the target sub-pixel is made into [α2], an α value used to generate data of sub-pixel distant from the target sub-pixel of two sub-pixels consecutively adjacent to the one side is made into [α3], an α value used to generate data of a sub-pixel closer to the target sub-pixel of two sub-pixels consecutively adjacent to the other side of the target sub-pixel is made into [α4], an α value distant from the target sub-pixel of two sub-pixels consecutively adjacent to the other side is made into [α5], and the maximum value among [α1], [α2], [α3], [α4], and [α5] is made into [α$], the ratio of the five filtering coefficients for a filtering process with respect to data of the target sub-pixel becomes as follows:

$$\alpha\$^2:2\alpha\$\beta:2\alpha\$^2+\beta^2:2\alpha\$\beta:\alpha\$^2\beta=1+2(1-\alpha\$)$$

By this configuration, while the filtering intensity is weakened at the background portion where the α value is small, and it is possible to prevent the background portion of the alpha blending image from blurring, the filtering intensity is strengthened at the foreground portion where the α value is not small (that is, a portion where a complete foreground only, a portion where an almost complete foreground only, or a portion where the background is made transparent into the foreground), and color unevenness of the foreground portion of the alpha blending image can be suppressed.

Further, by determining the filtering coefficient using the maximum value [α$] of the five α values of the target sub-pixel and sub-pixels consecutively adjacent thereto, the filtering intensity is strengthened, and the blurring degree of the target sub-pixel can be increased.

As a result, in a case where the α value remarkably changes between sub-pixels located in the vicinity thereof, it is possible to prevent color phase irregularity resulting from a radical change in the filtering coefficient.

Also, since there are five filtering coefficients for a filtering process with respect to data of the target sub-pixel, a fine filtering process can be carried out with respect to the foreground portion of the alpha blending image.

Resultantly, it is possible to remarkably effectively prevent color unevenness with respect to the foreground portion of the alpha blending image.

In a filtering unit according to the twenty-second aspect of the invention, in addition to the eighth, ninth, tenth, eleventh or twelfth aspect of the invention, the filtering coefficient determining unit obtains an α value used to determine a filtering coefficient for a filtering process with respect to data of the target sub-pixel among a plurality of α values used to generate a plurality of data of a plurality of sub-pixels, including the target sub-pixel, in a prescribed range of the alpha blending image, and makes the filtering coefficient constant where α$>0.2 when the obtained α value is made into [α$] and determines the filtering coefficient as a function of the [α$] where α$≦0.2.

By this configuration, where α$≦0.2, since a human recognizes that it is a portion of only the background when looking at an alpha blending image, such a function, by which the filtering intensity is weakened in response to the size of [α$] only when α$≦0.2, is employed, whereby it is possible to prevent the background portion of the alpha blending image from blurring in a sufficiently practical range of use.

In addition, when substituted in the function, the blurring degree of the target sub-pixel can be increased by acquiring [α$], by which the filtering intensity is strengthened, among a plurality of α values of a plurality of sub-pixels in a prescribed range including the target sub-pixel.

As a result, in a case where the α value remarkably changes between the sub-pixels belonging to a prescribed range, it is possible to prevent color phase irregularity resulting from a radical change in the filtering coefficient.

On the other hand, when looking at an alpha blending image where α$>0.2, a human recognizes that it is a portion of only foreground or a portion where the background is made transparent into the foreground. Therefore, where α$>0.2, a filtering process is carried out, using a filtering coefficient of a fixed value by which the filtering intensity is strengthened, and it is possible to prevent color unevenness of the foreground portion of the alpha blending image (that is, a portion where a complete foreground only, a portion where an almost complete foreground only or a portion where the background is made transparent into the foreground), and a process can be simplified where α>0.2. In addition, the process can be accelerated.

In a filtering unit according to the twenty-third aspect of the invention, in addition to the twenty-second aspect of the invention, the filtering coefficient determining unit determines filtering coefficients so that, where an α value used to generate data of the target sub-pixel of an alpha blending image is made into [α1], an α value used to generate data of the sub-pixel adjacent to one side of the target sub-pixel is made into [α2], an α value used to generate data of the sub-pixel adjacent to the other side of the target sub-pixel is made into [α3], and the maximum value among [α1], [α2], and [α3] is made into [α$], the ratio of the three filtering coefficients for a filtering process with respect to data of the target sub-pixel becomes as follows:

then α$>0.2

1:1:1 then α$≦0.2

α\:1+2(1−α\):α\α\=5.0×α$

By this configuration, in a portion where, when a human looks at an alpha blending image, it is recognized that it is a portion of only the background (α$≦0.2), the filtering intensity is weakened in response to the size of [α$], wherein it is possible to prevent the background portion of the alpha blending image from blurring in a sufficiently practical range of use.

Further, by determining the filtering coefficient using the maximum value [α$] among the three α values of the target sub-pixel and sub-pixel adjacent to both sides thereof, the filtering coefficient is strengthened, and the blurring degree of the target sub-pixel can be increased.

As a result, in a case where the α value remarkably changes between the adjacent sub-pixels, it is possible to prevent color phase irregularity resulting from a radical change in the filtering coefficient.

Also, since there are three filtering coefficients for a filtering process with respect to data of the target sub-pixel, where α$≦0.2, the filtering coefficient can be easily determined, and the filtering process can be simply carried out, wherein the processing speed can be accelerated as a whole.

On the other hand, in a portion where, when a human looks at an alpha blending image, it is recognized that it is a portion of only the foreground or a portion where the background is made transparent into the foreground (α$>0.2), the filtering intensity is strengthened, and color unevenness of the foreground portion of the alpha blending image can be suppressed.

In a filtering unit according to the twenty-fourth aspect of the invention, in addition to the twenty-second aspect of the invention, the filtering coefficient determining unit determines filtering coefficients so that, where an α value used to generate data of the target sub-pixel of the alpha blending image is made into [α1], an α value used to generate data of sub-pixels closer to the target sub-pixel of the two sub-pixels consecutively adjacent to one side of the target sub-pixel is made into [α2], an α value used to generate data of the sub-pixel distant from the target sub-pixel of the two sub-pixels consecutively adjacent to one side thereof is made into [α3], an α value used to generate data of sub-pixels closer to the target sub-pixel of the two sub-pixels consecutively adjacent to the other side of the target sub-pixel is made into [α4], an α value used to generate data of the sub-pixel distant from the target sub-pixel of the two sub-pixels consecutively adjacent to the other side thereof is made into [α5], and the maximum value among [α1], [α2], [α3], [α4], and [α5] is made into [α$], the ratio of the five filtering coefficients for a filtering process with respect to data of the target sub-pixel becomes as follows:

then α$>0.2

1:2:3:2:1 then α$≦0.2

$\alpha\psi^2:2\alpha\psi\beta:2\alpha\psi^2+\beta^2:2\alpha\psi\beta:\alpha\psi^2 \alpha\psi=5.0\times\alpha\$ \beta=1+2(1-\alpha\psi)$ By this configuration, at a portion (α$≦0.2) where it is recognized that an alpha blending image is a portion of only the background when a human looks at the alpha blending image, the filtering intensity is weakened in response to the size of [α$], wherein it is possible to prevent the background portion of the alpha blending image from blurring in a sufficiently practical range of use.

Further, by determining the filtering coefficients using the maximum value [α$] among the five α values of the target sub-pixel and sub-pixels consecutively adjacent thereto, the filtering intensity is strengthened, and it is possible to increase the blurring degree of the target sub-pixel.

As a result, in a case where the α value remarkably changes between the sub-pixels located in the vicinity, it is possible to prevent color phase irregularity resulting from a radical change in the filtering coefficient.

On the other hand, at a portion (α$>0.2) where it is recognized that an alpha blending image is a portion of only the foreground or a portion where the background is made transparent into the foreground when a human looks at the alpha blending image, the filtering intensity is strengthened, and color unevenness of the foreground portion of the alpha blending image can be suppressed.

Further, since there are five filtering coefficients for a filtering process with respect to data of the target sub-pixel, a fine filtering process can be carried out with respect to the foreground portion of the alpha blending image, and it is possible to remarkably effectively suppress the color unevenness.

A method for processing image information according to the twenty-fifth aspect of the invention repeatedly carries out the first step of reading out display data stored in expression in the first color space from a portion region of a frame memory, the second step of converting the read out display data from the first color space to the second color space, the third step of executing a specified process for the display data converted to the second color space, the fourth step of converting the display data, to which the process in the third step is applied, from the second color space to the first color space, and the fifth step of writing the display data, which is converted to the first color space in the fourth step, in a portion region. And the method generates correction information to be referred to, in the following second step along with expression in the first color space in the third step, writes the correction information along with expression in the above-described portion region in the first color space in the fourth step, and reads out the correction information along with the display data stored in the expression in the first color space in the first step.

By this configuration, not only R, G and B values but also correction information are written in the frame memory. By referring to the correction information when converting, a difference in line with the conversion can be made small, and resultant color blurring can be suppressed, wherein it is possible to satisfactorily maintain the display quality.

In a method for processing image information according to the twenty-sixth aspect of the invention, in addition to the twenty-fifth aspect of the invention, a background image is stored in a frame memory, and a specified process in the third step superimposes a foreground image onto the background image.

By this configuration, color blurring, which easily occurs at a portion where no foreground image is superimposed (that is, a portion where the background image remains as it is), can be suppressed when superimposing the foreground image on the present background image in the frame memory, and the display quality can be improved.

In a method for producing image information according to the twenty-seventh aspect of the invention, in addition to the twenty-fifth or twenty-sixth aspect of the invention, the first color space is a color space RGB, and the second color space is a color space YCbCr.

By this configuration, color blurring can be suppressed when mutual conversion is caried out between the color space RGB and the color space YCbCr.

In a method for processing image information according to the twenty-eighth aspect of the invention, in addition to the twenty-seventh aspect of the invention, a 32-bit region is assigned per pixel in the frame memory. A 24-bit region of the 32-bit region is used for R, G and B values, and correction information is held in the remaining 8 bits.

By this configuration, the frame memory can be used without any loss or with no memory region added to the correction information. Herein, in so-called full colors, 8 bits are assigned to respective values of R, G and B per pixel, thereby expressing approximately 17,660,000 colors. However, in actuality, it is normal that a 32-bit region is assigned to one pixel.

Therefore, in prior arts, 8 bits of the assigned 32 bits (that is, 32−24=8 bits) are not particularly employed and become useless. Herein, in this configuration, by storing correction information in the remaining 8 bits, which are not effectively used, it is possible to effectively employ the frame memory.

In a method for displaying an image according to the twenty-ninth aspect of the invention, in addition to the twenty-seventh or twenty-eighth aspect of the invention, in the second step, display data is converted from the color space RGB to the color space YCbCr by the following expressions:

$$Y2=iG$$

$$Y1=Y2-D1$$

$$Y3=Y2-D2$$

$$Cr=Y1-R$$

$$Cb=Y3-B$$

Y1, Y2, Y3: brightness components
D1, D2: correction information or its equivalent expressions.

By this configuration, calculations whose costs are high, such as multiplication and division, can be avoided while sufficiently maintaining calculation precision, and the calculation speed thereof can be improved.

In a method for displaying an image according to the thirtieth aspect of the invention, in addition to the twenty-seventh or twenty-eighth aspect of the invention, in the third step, display data is converted from the color space YCbCr to the color space RGB by the following expressions:

$$R=Y1-Cr$$

$$G=Y2$$

$$B=Y3-Cb$$

$$D1=Y2-Y1$$

$$D2=Y2-Y3$$

Y1, Y2, Y3: brightness components
D1, D2: correction information or its equivalent expressions.

By this configuration, calculations whose costs are high, such as multiplication and division, can be avoided while sufficiently maintaining calculation precision, and the calculation speed thereof can be improved.

In a method for displaying an image according to the thirty-first aspect of the invention, in addition to the twenty-seventh or twenty-eighth aspect of the invention, in the second step, display data is converted from the color space RGB to the color space YCbCr by the following expressions:

$$\begin{pmatrix} Y2 \\ Cb \\ Cr \end{pmatrix} = \begin{pmatrix} 1 & 0 & 1.402 \\ 1 & -0.344 & -0.714 \\ 1 & 1.772 & 0 \end{pmatrix}^{-1} \begin{pmatrix} R+D1 \\ G \\ B+D2 \end{pmatrix}$$

$$Y1=Y2-D1, Y3=Y2-D2$$

Y1, Y2, Y3: brightness components
D1, D2: correction information or its equivalent expressions.

By this configuration, higher precise conversions can be carried out.

In a method for displaying an image according to the thirty-second aspect of the invention, in addition to the twenty-seventh or twenty-eighth aspect of the invention, in the third step, display data is converted from the color space YCbCr to the color space RGB by the following expressions:

$$R=Y1+1.402Cr$$

$$G=Y2-0.344Cb-0.714Cr$$

$$B=Y3+1.772Cb$$

$$D1=Y2-Y1, D2=Y2-Y3$$

Y1, Y2, Y3: brightness components
D1, D2: correction information or its equivalent expressions.

By this configuration, higher precise conversions can be carried out.

In a method for processing image information according to the thirty-third aspect of the invention, in addition to the twenty-ninth, thirtieth, thirty-first or thirty-second aspect of the invention, three brightness components Y1, Y2 and Y3 comprise one pixel in a display device that enables display by means of display data in the frame memory, and are brightness components of three light-emitting elements, which emit the respective colors of R, G and B.

By this configuration, brightness components can be displayed in terms of sub-pixel precision, wherein the display quality can be improved.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a configuration view of a line data portion of Embodiment of the invention;

FIG. 7(a) is a view (before enlargement) describing α values of Embodiment 1 of the invention;

FIG. 7(b) is a view after enlargement) describing α values of Embodiment 1 of the invention;

FIG. 14(a) is a view describing the first example of determination of filtering coefficients;

FIG. 14(b) is an exemplary view of filtering coefficients according to the first example;

FIG. 14(c) is a view showing the relationship between the filtering intensity and α values according to the first example;

FIG. 18 is an exemplary view of filtering coefficients according to the fourth example of an image-processing apparatus according to Embodiment 4 of the invention;

DETAILED DESCRIPTION OF THE PREFERRED EMBODIMENTS

Next, a description is given of embodiments of the invention with reference to the accompanying drawings.

Embodiments 1 and 2 mainly describe examples to resolve the first problem described above.

Embodiments 3, 4, 5 and 6 mainly describe examples to resolve the second problem described above.

EMBODIMENT 1

Figure 1:
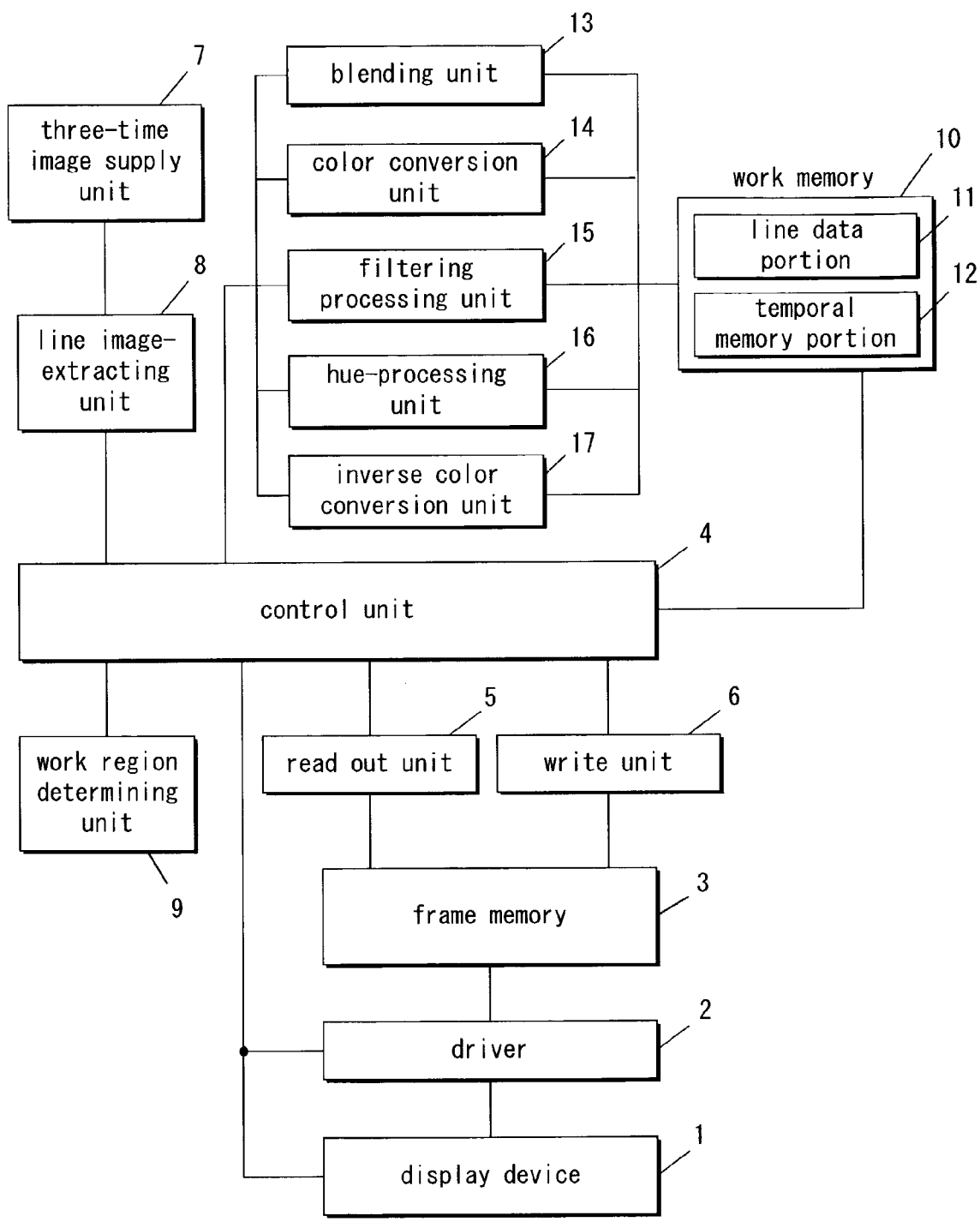
FIG. 1 is a block diagram of a displaying apparatus according to Embodiment 1 of the present invention.

FIG. 1 is a block diagram of a displaying apparatus according to Embodiment 1 of the present invention. First, a brief description is given, using FIG. 1.

In FIG. 1, display device 1 is a color liquid crystal panel, etc. In the display device 1, light-emitting elements that emit respective colors of R, G and B are disposed in a juxtaposing direction in a fixed order (for example, order of R, G and B) and comprise one pixel.

And, one pixel is disposed in the juxtaposing direction and in the direction orthogonal to the juxtaposing direction, which comprises a display screen. A plasma display and organic EL display, etc., may be used as the display device 1.

A driver 2 controls the respective light-emitting elements of the display device 1 independently.

A frame memory 3 provides display data to the driver 2. In the example, the frame memory 3 has respective values of R, G and B with eight bits per pixel.

Figure 3:
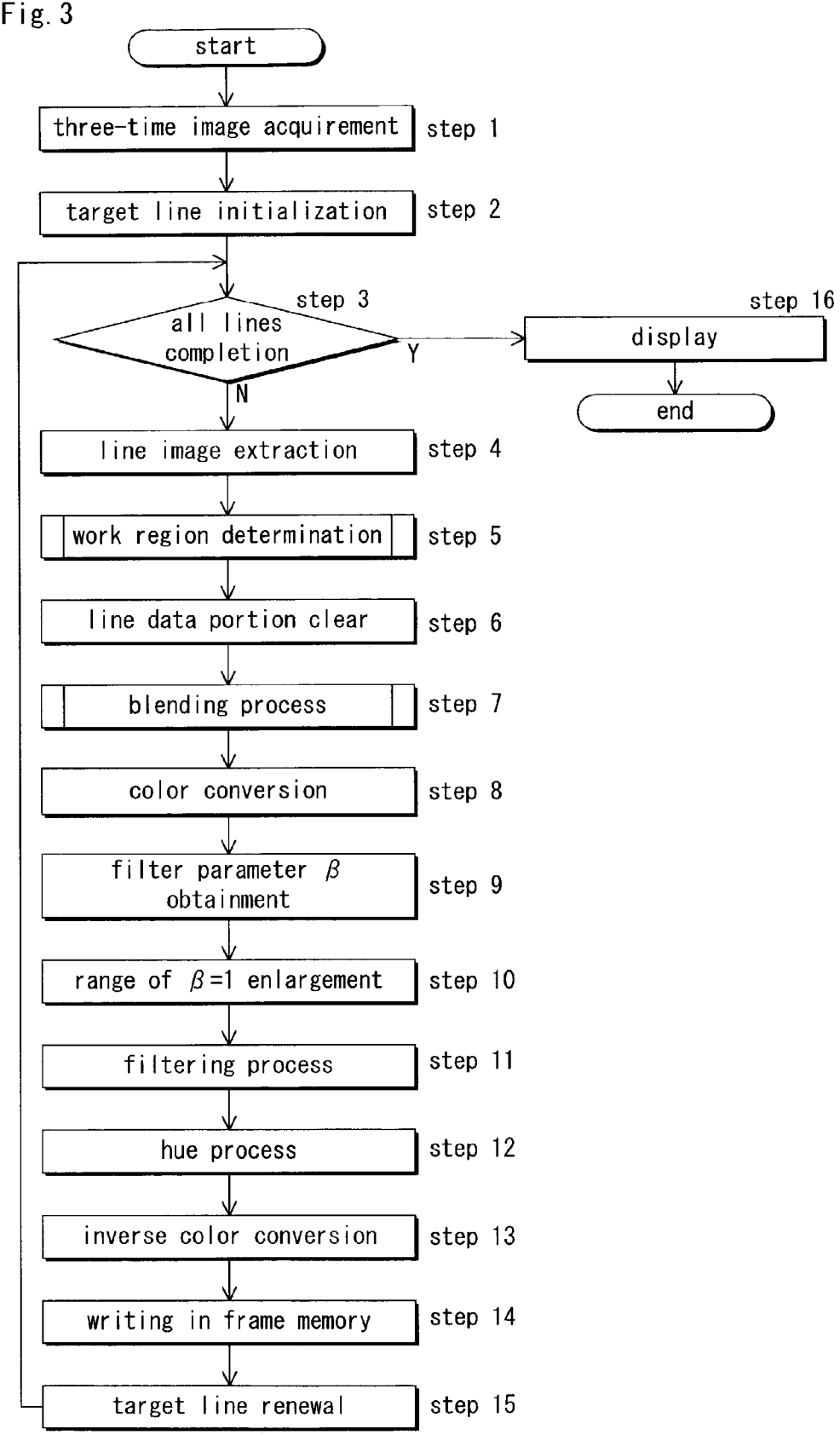
FIG. 3 is a flowchart thereof.

A control unit 4 executes control programs on the basis of flowcharts in FIG. 3, etc., and controls respective elements shown in FIG. 1.

A read out unit 5 reads out display data from a specified region of the frame memory 3 in response to instructions of the control unit 4. Also, a write unit 6 writes display data in a specified region of the frame memory 3 in response to instructions of the control unit 4.

A three-time image supply unit 7 supplies a three-time image to this system. The three-time image may be, as described above, a bitmap image or a raster image that is obtained by developing a vector image in a memory.

A line image-extracting unit 8 extracts a line image, which comprises one line, (parallel to the juxtaposing direction) indicated by the control unit 4, of three-time images provided from the three-time image supply unit.

In this example, the line image-extracting unit 8 extracts commencement coordinates (x, y) written in the frame memory of a line image, length len (pixel precision) of the line image, values of R, G and B of respective sub-pixels of the line image, and α values (parameters for blending of the background and foreground) (Ri, Gi, Bi, αi; i=1, 2, . . . , 3×len).

Herein, in the example, although the α values are controlled in terms of sub-pixel precision, the present invention is not limited to this. For example, it may be acceptable that one α value is used per pixel.

A work region determining unit 9 determines a work region, in which an M sub-pixel is added to the front side of a line image and an N sub-pixel is added to the rear side thereof in the juxtaposing direction, using M and N as natural numbers.

The work memory 10 stores necessary information for processing of the control unit 4. In the example, the work memory 10 is provided with a line data portion 11 having a structure shown in FIG. 2 and a temporal memory portion 12 that stores other information.

The line data portion 11 has an index in the horizontal direction as shown in FIG. 2, and it is sufficient that the maximum value (that is, amount of data) of the index is a length greatest (equivalent to the sub-pixel precision) in the juxtaposing direction on the display screen of the display device 1. In other words, by repeatedly using the line data portion 11 per line of the display screen, a further smaller region than storing the data amount of the entire display screen of the display device 1 may be sufficient, wherein memory consumption can be saved.

Fields that store necessary information such as background, foreground, α values, etc., are provided on the vertical axis of the line data portion 11. Also, parameter β is a value defined to be [0] or [1] compliance with the α values as described below. A filtering process of brightness components operates only in a range where β=1.

In FIG. 1, the blending unit 13 blends an image, in which the background image read out from the frame memory 3 is made to the same precision as that of a three-time image in a pseudo state, and a line image together to obtain a blend image. Herein, in the present embodiment, the blending unit 13 carries out blending in a color space RGB.

A color conversion unit 14 converts color from the color space RGB to a color space YCbCr.

A filtering processing unit 15 carries out a filtering process with respect to a brightness component Y in order to suppress color blurring. In the example, although the filtering process utilizes coefficients of $1/5$, $2/5$, $3/5$, $2/5$ and $1/5$ as described in a paper disclosed by http://grc.com, other coefficients may be used.

A hue-processing unit 6 carries out an averaging process with respect to a hue component (CbCr). The hue-processing unit 16 may be omitted.

An inverse color conversion unit 17 carries out inverse color conversion from the color space YCbCr to the color space RGB. This concludes a brief description.

Next, a detailed description is given of respective processes along a flowchart in FIG. 3. First, in Step 1 in FIG. 3, a three-time image is supplied from the three-time image supply unit 7.

Next, the control unit 4 records the target line as the first line in the temporal memory portion 12 (Step 2), and the process shifts to Step 3.

In Step 3, the control unit 4 checks that a process for all lines of a three-time image have not been completed, and gives the line image-extracting unit 8 an instruction for extracting a line image for the current target line (Step 4).

Thereby, the line image-extracting unit 8 extracts a commencement coordinate (x, y) of the line image, values of R, G and B and α values of respective sub-pixels, and a length len of (pixel precision) of the three-time image with respect to the target line, and returns these to the control unit 4, wherein the control unit 4 stores these in the temporal memory portion 12.

Next, the control unit 4 transfers x, y and len of the respective values stored in the temporal memory portion 12 to the work region determining unit 9 and gives an instruction so that a work region is determined.

Figure 4:
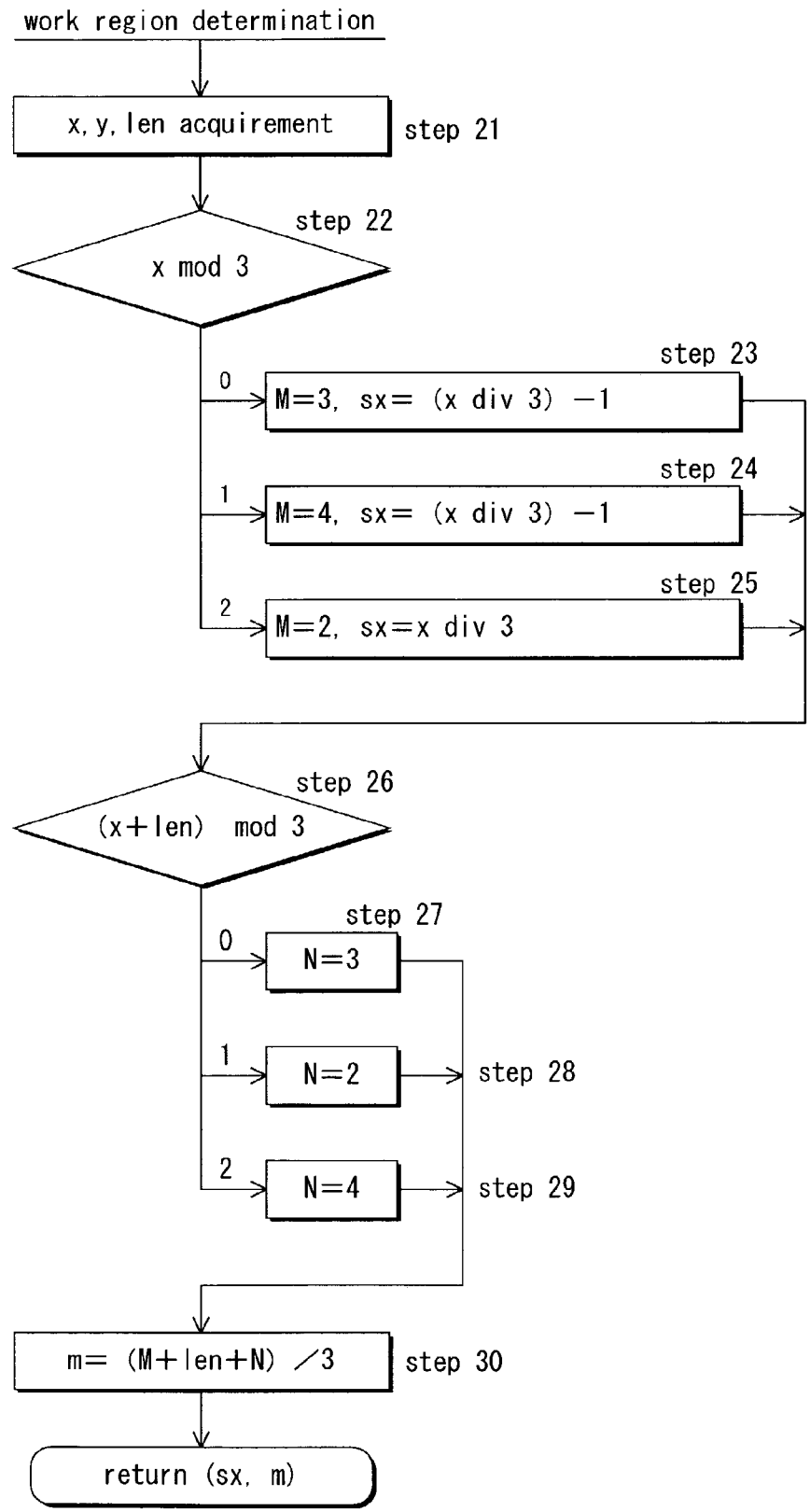
FIG. 4 is a flowchart for determining a work region thereof.

Then, the work region determining unit 9 determines an x coordinate SX of the commencement position of the work region and a work region length m (SX and m are pixel precision) along a flowchart shown in FIG. 4.

In detail, as shown in FIG. 4, the work region determining unit 9 acquires x, y and len (Step 21), and obtains a remainder derived by dividing x by 3 (Step 22).

If the remainder is 0, the pre-insertion sub-pixel number M is made into 3 (M=3), and the x coordinate SX is made into (x div 3) −1 (SX=(x div 3)−1) (Step 23). Also, "a div b" means a quotient (the decimal point is discarded) obtained by dividing FIG. "a" by FIG. "b".

If the remainder is 1, the pre-insertion sub-pixel number M is made into 4 (that is, M=4), and the x coordinate SX is made into (x div 3)−1 (that is, SX=(x div 3)−1) (Step 24). If the remainder is 2, the pre-insertion sub-pixel number M is made into 2 (that is, M=2), and the x coordinate SX is made into (x div 3) (that is, SX=(x div 3) (Step 25).

Next, the work region determining unit 9 obtains the remainder derived by dividing (x+len) by 3 (Step 26).

If the remainder is 0, the post-insertion sub-pixel number N is made into 3 (that is, N=3) (Step 27), Similarly, if the remainder is 1, N is made into 2 (that is, N=2) (Step 28). If the remainder is 2, N is made into 4 (that is, N=4) (Step 29).

Based on the above description, the sub-pixel numbers M and N, and length len are determined. Herein, the work region determining unit 9 determines a work region length m by expression m=(M+len+N)/3 in Step 30.

In this connection, based on the above-described rule, (M+len+N) becomes a figure that can be completely divided by 3, and m becomes an integer.

And, the work region determining unit 9 returns the determined x coordinate SX and work region length m to the control unit 4, and the control unit 4 temporally stores the same in the temporal memory portion 12.

Figure 5:
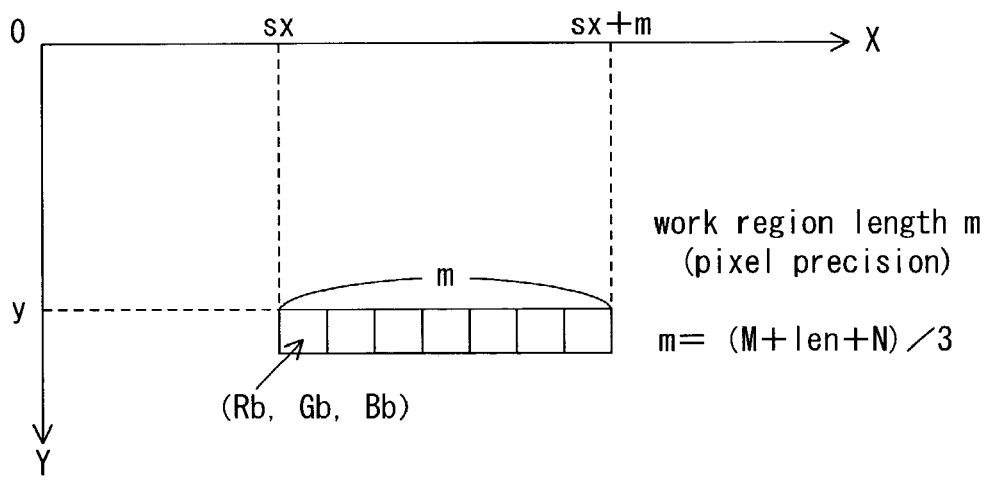
FIG. 5(a) is a view describing the position of the same work region.
FIG. 5(b) is a view describing the detail of the same work region.
Figure 5:
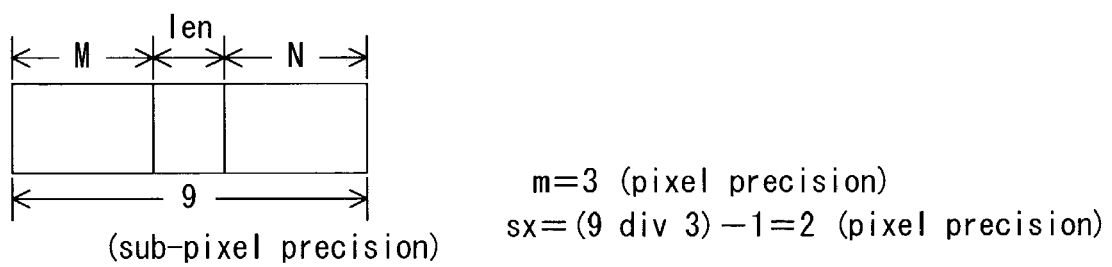

Here, if the work region length m and x coordinate SX are plotted on the basis of a pixel precision coordinate system X-Y of the frame memory 3, these becomes as shown in FIG. 5(*a*).

That is, the rectangular regions in FIG. 5(*a*) become the background of the work region in the frame memory 3.

And, the respective pixels shown by rectangles, respectively, have values of R, G and B. However, these values of R, G and B become values of (Rb, Gb and GB) of the background shown in FIG. 2.

Also, the pixel number of the region is nothing other than m, wherein, if it is expressed in terms of sub-pixel precision, the data become k=3m pieces. Therefore, the indexes of the temporal memory portion 12 shown in FIG. 2 are meaningful in a range from 1 through k. However, any index including and coming after k+1 is not used and is not meaningful.

Further, using FIG. 5(*b*), a description is given of the pre-insertion sub-pixel number M and post-insertion sub-pixel number N.

For example, (x, y)=(9, 3) and len=2, M=3, len=2, N=4, m=3, and SX=2 are derived by the processing in FIG. 4. Therefore, if the relationship is illustrated, it becomes as shown in FIG. 5(*b*).

When this is done, the work region is not only a line image but also includes regions added to the front side and back side of the line image. Where a filtering process described later is carried out, it is possible to carry out uniform and even filtering on brightness components of the line image, including the front side and back side of the line image, wherein color blurring can be suppressed, and display quality can be improved.

Also, the determination of the work region extended to the front side and back side of the line image is not limited to the above-described example, but may be variously modified.

However, as described above, it is favorable that the length of the work region is set so that it becomes a multiple of 3 when being expressed in terms of sub-pixel number, wherein the length of the work region can be completely matched to portion regions (pixel precision) of the frame memory 3.

The work region is thus determined through the above procedure. Next, as shown in FIG. 3, the control unit 4 clears all data of the line data portion 11 in Step 6. In Step 7, the control unit gives an instruction to the blending unit 13 for a blending process.

Figures 6, 7:
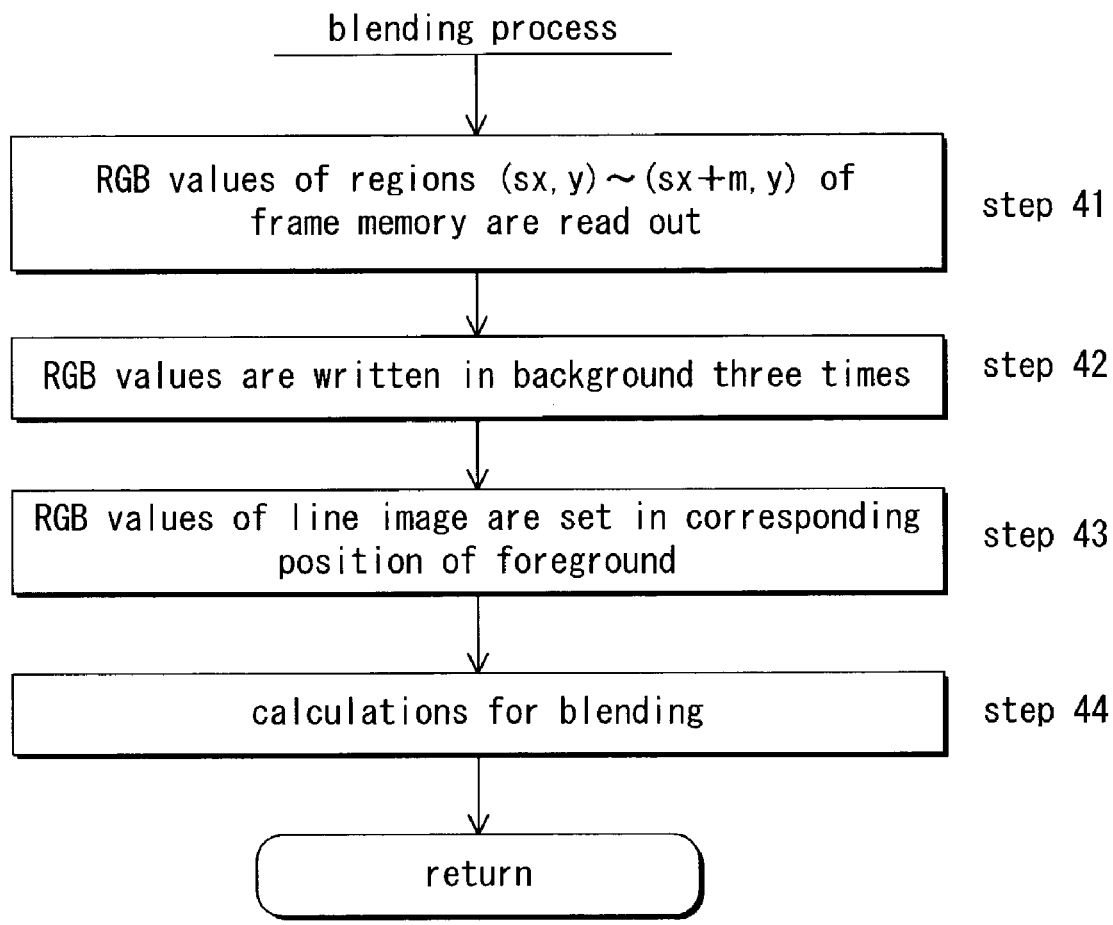
FIG. 6 is a flowchart for blending of Embodiment 1 of the invention.

Then, the blending unit 13 carries out a blending process based on the flowchart in FIG. 6. That is, first, the blending unit 13 urges the control unit 4 to read out values of R, G and B of the regions (SX, Y) through (SX+m, y) (these regions correspond to the work region) of the frame memory 3 in Step 41.

Thereby, the values of R, G and B are transferred to the blending unit 13 through the frame memory 3, read out unit 5 and control unit 4, and the blending unit 13 writes these in respective fields of the [Background] of the line data portion 11 (Step 42).

However, since the indexes of the line data portion 11 are in terms of the sub-pixel precision, the blending unit 13 writes the background image in regions (SX, y) through (SX+m, y) in the line data portion 11, assuming that the precision thereof is made equivalent to a three-time image in a pseudo state.

In further detail, in this example, the blending unit 13 repeatedly writes the same data in the [Background] three times. For example, if (R, G and B)=(Ra, Ga, Ba), (Rb, Gb, Bb), . . . are obtained in terms of pixel precision, the writing thereof becomes Rb1=Rb2=Rb3=Ra, Gb1=Gb2=Gb3=Ga, Bb1=Bb2=Bb3=Ba, Rb4=Rb5=Rb6=Rb, . . . .

As a matter of course, this is only an example. In addition thereto, for example, by linear interpolation, Rb1=Ra, Rb2=Ra+(Rb−Ra)/3, Rb3=Ra+2(Rb−Ra)/3, Rb4=Rb, . . . may be obtained.

Thus, values are set in the fields of the [Background] in FIG. 2.

Next, the blending unit 13 sets values of R, G and B of the line image and α values thereof in the corresponding position of the [Foreground] of the line data portion 11 (Step 43). Also, since the values of R, G and B of the line image and α values thereof are in terms of sub-pixel precision in this example, these may be written as they are, in the corresponding position.

Next, the blending unit 13 carries out calculations for blending the foreground with the background image by the following expression (1) through (3), using the values in the respective fields of the [Background], [Foreground] and [α values] in Step 44.

$$Ri=\alpha i \times Rfi + (1-\alpha i)Rbi \quad (1)$$

$$Gi=\alpha i \times Gfi + (1-\alpha i)Gbi \quad (2)$$

$$Bi=\alpha i \times Bfi + (1-\alpha i)Bbi \quad (3)$$

Herein, the embodiment of the blending may be any other than the above description. It may be subjected to various modifications, for example, a multiplying result of the foreground image and background image may be obtained.

As a result, a blend image in which a foreground image is superimposed on a background image can be obtained. The data thereof are set in the field of [Blending] of the line data portion 11.

As described above, after the blending is completed, the process shifts to Step 8 in FIG. 3. In Step 8, the control unit 4 gives an instruction to the color conversion unit 14 so that the values of R, G and B existing in the field of [Blending] of the line data portion 11 are converted to the color space YCbCr.

Where it is assumed that i=1, 2, . . . k, $$Yi=0.299 \times Ri+0.587 \times Gi+0.114 \times Bi \quad (4)$$

$$Cbi=-0.1687 \times Ri-0.3313 \times Gi+0.5 \times Bi \quad (5)$$

$$Cri=0.5 \times Ri-0.4187 \times Gi-0.0813 \times Bi \quad (6),$$

which are general as color conversion, may be used. However, in the present embodiment, the color conversion unit 14 carries out color conversion, using the following expressions;

$$Yi=Gi \quad (7)$$

$$Cbi=Gi-Bi \quad (8)$$

$$Cri=Gi-Ri \quad (9)$$

When this is done, multiplication whose calculation cost is high can be omitted while suppressing deterioration in image quality in line with the color conversion, and the process can be accelerated. Yi, Cbi and Cri obtained after the color conversion are stored in the fields of [Conversion] of the line data portion 11.

The expressions for color conversion are not limited to the above expressions. If there is a color space that can be expressed in terms of brightness and hue, similar effects can be brought about if other color space is used.

Next, prior to Step 11 (Filtering process of brightness) in FIG. 3, the control unit 4 obtains a filter parameter β in Step 9. Herein, as described above, the filter parameter β defines a range for which a filtering process operates. The filtering process operates for only a range of β=1.

In detail, the control unit 4 compares α values in FIG. 2 with a fixed threshold value δ in terms of size, and normalizes β to be [1] or [0]. That is, when α>δ, β is made into 1 (that is, β=1), and when not, β is made into 0 (that is, β=0). Also, the fixed threshold value δ is experimentally defined. And, the control unit 4 stores β, which is defined as described above, in the field of the filtering parameter β of the line data portion 11.

Next, the control unit 4 enlarges the range of β=1 to the range of the filtering process in Step 10 in FIG. 3. In the present example, since coefficients of ⅕, ⅖, ⅗, ⅖ and ⅕ are used, the range of the filtering process reaches five elements in total.

Accordingly, where an isolated point (β=1) fewer than 5 exists, the range of β=1 is enlarged to become five.

For example, as shown in FIG. 7(*a*), when a point of β=1 is isolated, β=0 is changed to β=1 with respect to two places left of the point and two places right of the point.

Thereby, the range of β=1 is enlarged, and the range of a filtering process can reach the vicinity of the boundary of a line image and a background image, wherein color blurring can be suppressed, and display quality can be improved.

As a matter of course, the handling is merely an example. For example, in the example of FIG. 7(a), where the range of a filtering process is 3, β=0 may be changed to β=1 with respect to only one left and right places of the isolated point of β=1. That is, various modifications may be accepted.

Next, the control unit 4 gives the filtering processing unit 15 an instruction of a filtering process using a brightness component Yi and a filtering parameter βi in Step 11 in FIG. 3.

As described above, the filtering processing unit 15 carries out a filtering process with respect to the brightness component Yi. Result Yi# of the filtering process is stored in the field of [Filter] of the line data portion 11.

However, where βi=0, the filtering process is not applied, and the brightness component Yi is stored in the field of [Filter] as it is.

Thus, by not executing any filtering process with respect to the portion of βi=0, no process for removing color blurring in the unit of the sub-pixel is required, wherein it is possible to prevent the quality from deteriorating by the filtering process with respect to the background portion and portions having high transparency.

Also, by executing a filtering process with the range of βi=1 enlarged, color blurring can be suppressed.

Next, the control unit 4 gives the hue-processing unit 16 a hue process in Step 12 in FIG. 3.

The hue-processing unit 16 averages the hue components three by three (that is, in a range corresponding to one pixel) with respect to the hue components (Cbi, Cri) existing in the field of [Conversion] in FIG. 2. In this case, where it is assumed to be j=1, 2, ..., m, for example, the averaging depends on the following expressions:

$$Cbj\# = (Cb(3j)+Cb(3j+1)+Cb(3j+2))/3$$

$$Crj\# = (Cr(3j)+Cr(3j+1)+Cr(3j+2))/3$$

Also, the hue-processing itself may be omitted. Hue processing may be based on another expression. In addition, in FIG. 2, for convenience of illustration, fields of [Hue] and [Inverse conversion] are stored in terms of sub-pixel precision. Actually, however, the quantity of values in these fields are only equivalent to the work region length m (pixel precision).

Next, the control unit 4 gives the inverse color conversion unit 17 an instruction of inverse color conversion in Step 13 in FIG. 3.

In this example, since the color conversion unit 14 carries out processing by the expressions (7) through (9), the inverse color conversion unit 17 converts values of YCbCr to values of R, G and B by the following expressions opposite thereto;

$$Rj\# = Y(3i)\# - Crj\# \quad (10)$$

$$Gj\# = Y(3i+1)\# \quad (11)$$

$$Bj\# = Y(3i+2)\# - Cbj\# \quad (12)$$

As a matter of course, if the expressions (4) through (6) are used in the color conversion unit 14, in the inverse color conversion unit 17, the following expressions which are opposite thereto are used:

$$Rj\# = Y(3i)\# - 1.402 \times Crj\#$$

$$Gj\# = Y(3i+1)\# - 0.34414 \times Cbj\# - 0.71414 \times Crj\#$$

$$Bj\# = Y(3i+2)\# + 1.772 \times Cbj\#$$

After the above processes are completed, the control unit 4 writes the values of R, G and B (the quantity is m), which are stored in the field of [Inverse conversion] of the line data portion 11, in regions (SX, y) through (SX+m, y) of the frame memory 3 by using the write unit 6 in Step 14 in FIG. 3.

Thereby, the process for one target line is completed. And, the control unit 4 shifts to another target line by one, and repeats the processing for all lines of a three-time image (Step 3).

Also, after all lines are processed, the driver 2 controls respective light-emitting elements of the display device 1 on the basis of display data of the frame memory 3 to renew the display (Step 16).

In the above description, as has been made clear from the expressions (10) through (12), in the present invention, the same brightness component Y is not used for color components R, G and B that comprise one pixel, as in a usual displaying method.

That is, in the present invention, differing brightness components Y (in further detail, Y(3i)#, Y(3i+1)#, and Y(3i+2)#) are used with respect to the color components R, G and B that comprise one pixel.

Accordingly, brightness information of sub-pixel precision, which a three-time image has, is reflected onto an image to be drawn, wherein it is possible to improve the display quality with respect to the usual displaying method.

Also, if brightness information of a three-time image is reflected and brightness components Y differing from each other are utilized when obtaining color components R, G and B that comprise one pixel, effects similar to the above can be obtained. This is also included in the present invention.

Next, a description is given of a case (a) where line-drawing data are supplied, and a case (b) where a bitmap image is supplied, by the three-time image supply unit 7 with reference to examples.

(a) Line Drawing

Figure 8:
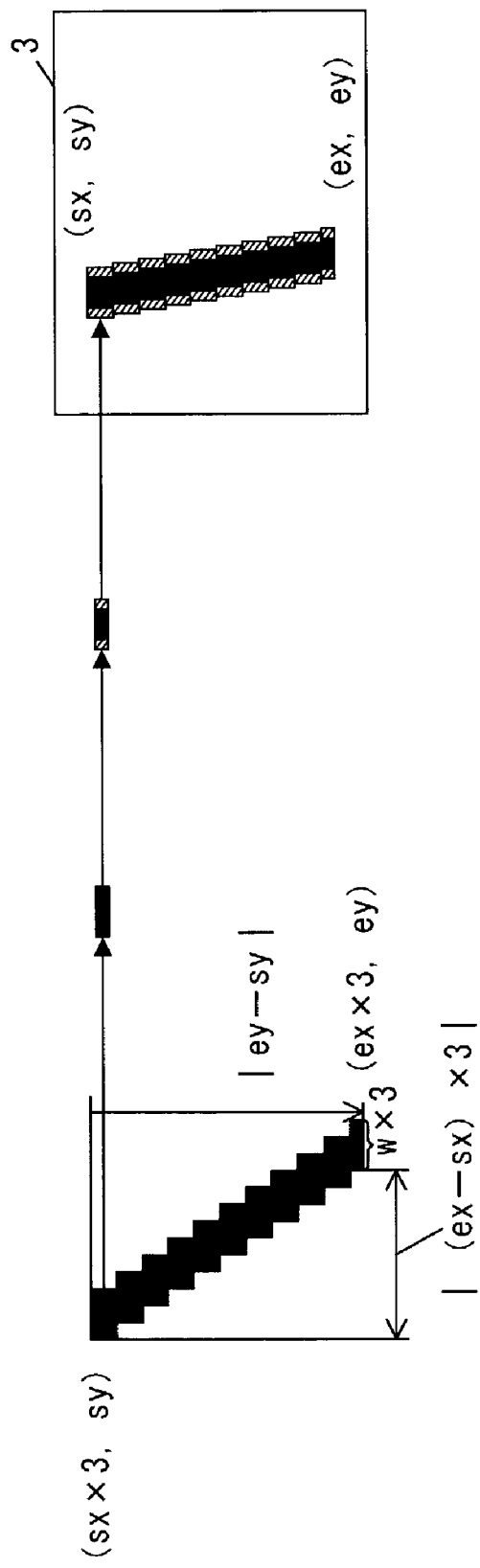
FIG. 8 is an exemplary view of line drawing thereof.

In this example, the process is carried out in a state as shown in FIG. 8.

Herein, a commencement point (sx, sy), termination point (ex, ey), line width (W), and line colors (R, G and B) are transferred to the three-time image supply unit 7 as instructions for drawing a line. A graphic drawing unit that receives instructions carries out drawing by a sub-pixel precision in a prescribed memory space on the basis of the following processes:

(Process 1) The drawing position is initialized to the commencement point (sx X 3, sy) of three-time precision in the horizontal direction.

(Process 2) The drawing commencement position and range per one horizontal line are calculated in terms of three-time precision in the horizontal direction.

(Process 3) The drawing range of one horizontal line is transferred to a line image-extracting unit 8 in which the commencement point (x,y), pixel number (len) to be drawn, and line colors (R, G and B) are arranged equivalently to the pixel number.

(Process 4) Step 3 through step 13 in FIG. 3 are executed.

(Process 5) The drawing position is shifted by one line in the longitudinal direction.

(Process 6) It is checked whether or not the process reaches the termination point (If not, the process returns to Process 2).

(Process 7) The drawing ends.

Through the above processing, the three-time image supply unit 7 develops the line image in a memory in terms of three-time precision, and the results of line drawing are rendered in terms of a sub-pixel as shown in FIG. 8, wherein the display device 1 is able to display a high-quality line.

(b) Bitmap Drawing

Figure 9:
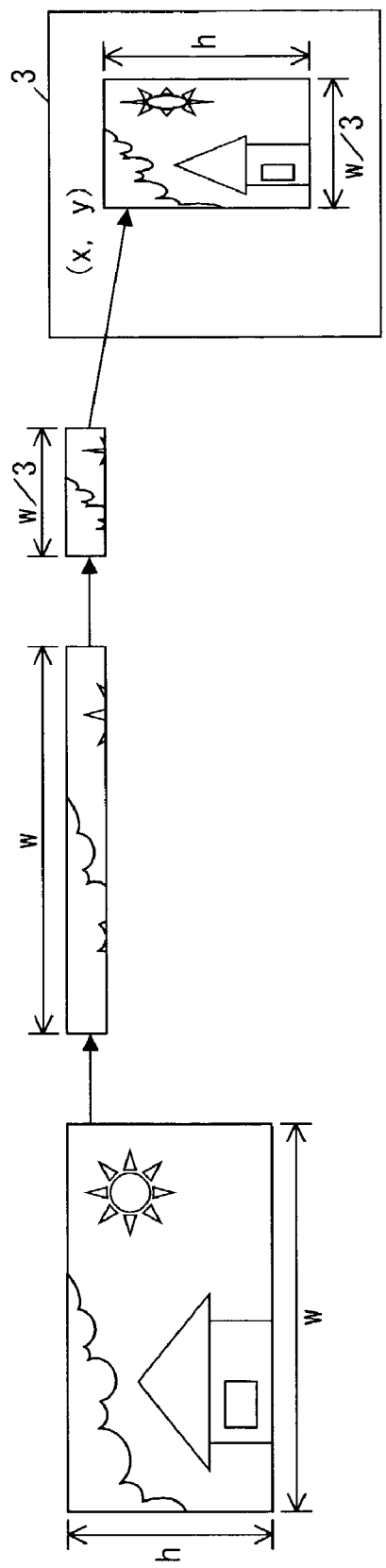
FIG. 9 is an exemplary view of bitmap drawing thereof.

In this example, the process is carried out in a state as shown in FIG. 9.

Herein, the three-time image supply unit 7 has a bitmap image itself. The top left drawing position (left, top) of the bitmap image, width (w) and height (h) of the bitmap image, and bitmap image data (hereinafter including α value data) are transferred from the three-time image supply unit 7 to the line image-extracting unit 8.

In this case, the line image-extracting unit only processes the bitmap image line by line.

Through the above processing, sub-pixel rendering, on which fine brightness information of the three-time image is reflected, is carried out, and the image is neatly superimposed on the background image of the frame memory, wherein a high-quality image can be drawn.

EMBODIMENT 2

In Embodiment 1, the blending unit 13 carried out a blending process by which a background image and a foreground image are superimposed with each other in the color space RGB. The blending process may be carried out in the color space YCbCr.

Figure 10:
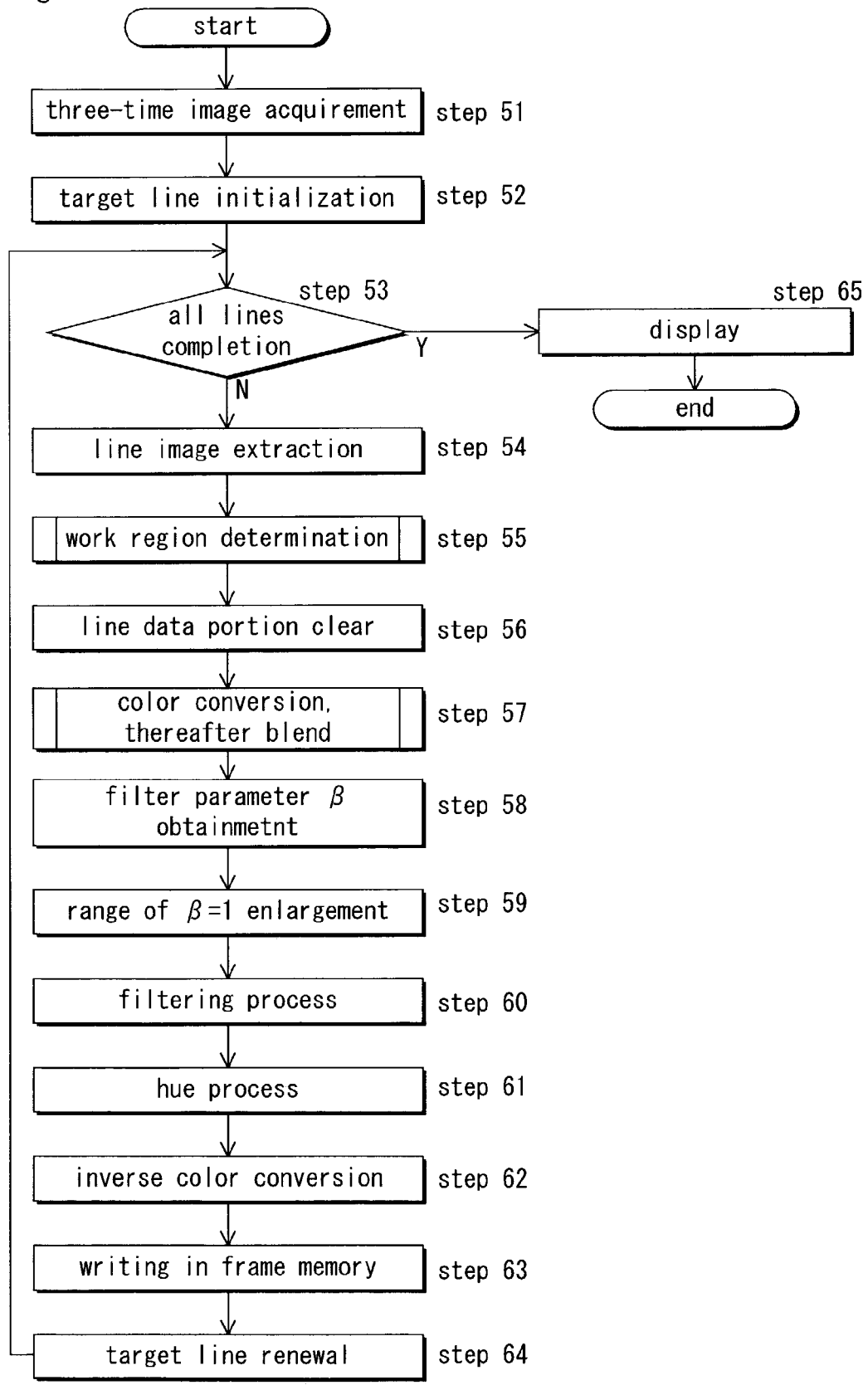
FIG. 10 is a flowchart according to Embodiment 2 of the invention.
Figure 11:
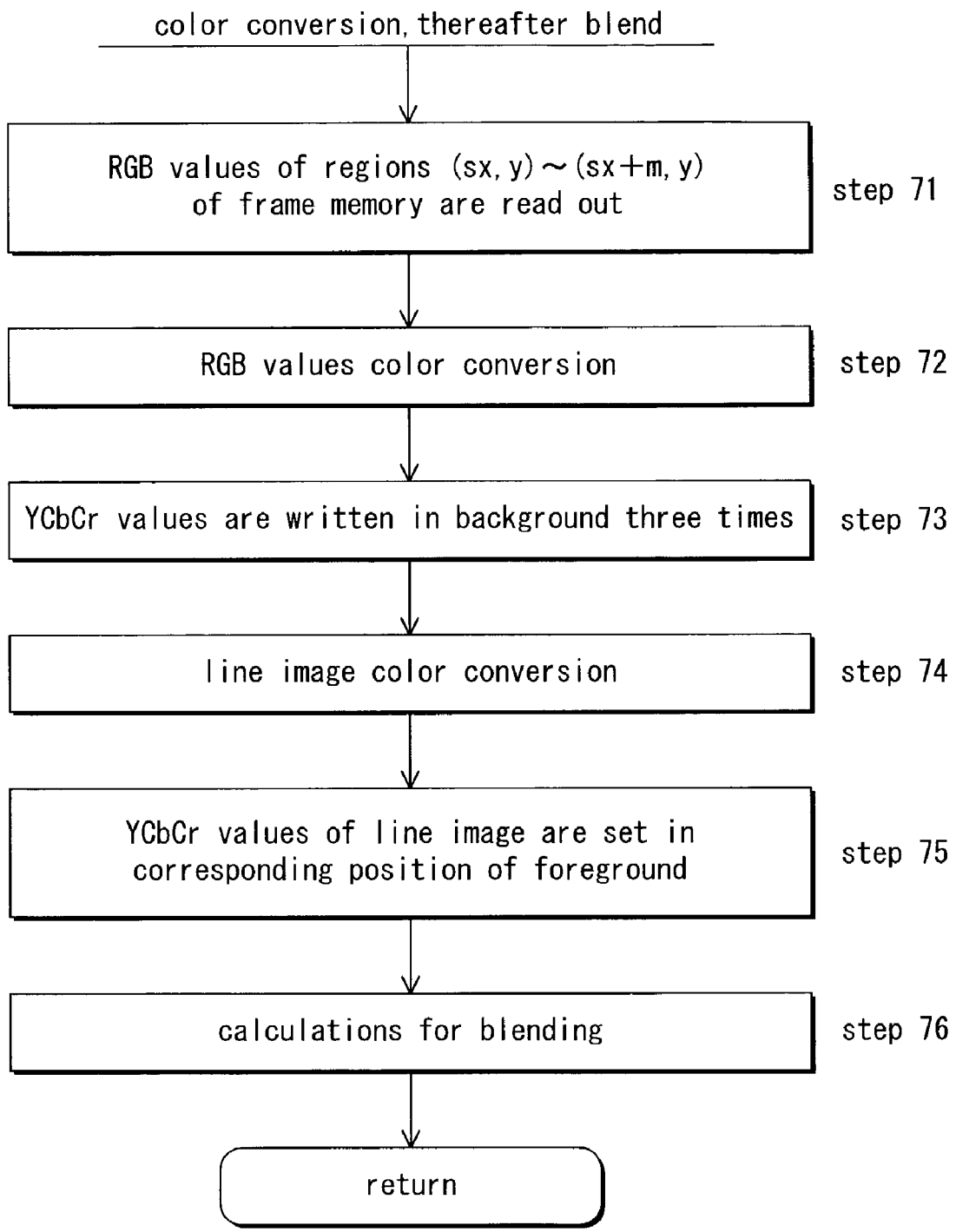
FIG. 11 is a flowchart for blending of Embodiment 2 of the invention.

At this time, the block diagram of FIG. 1 is applicable as it is. FIG. 10 is used instead of FIG. 3, and FIG. 11 is used instead of FIG. 6.

As a whole, Embodiment 2 is almost identical to the process in Embodiment 1. However, these differ from each other in that a background image read out from the frame memory 3 and a line image extracted by the line image-extracting unit 8 are converted to values of YCbCr in advance, and thereafter, the blending unit 13 carries out blending by:

$$Yi = \alpha i \times Yfi + (1-\alpha i) Ybi \quad (13)$$

$$Cbi = \alpha i \times Cbfi + (1-\alpha i) Cbbi \quad (14)$$

$$Cri = \alpha i \times Crfi + (1-\alpha i) Crbi \quad (15)$$

Now, according to the present invention (that is, Embodiments 1 and 2) as described above, a comparatively large graphic object can be efficiently displayed with ease in viewing while superimposing it on the background image.

Further, fine brightness components that the three-time image has are reflected onto the display results, thereby improving the display quality.

Herein, a brief description is given of Embodiments 3 through 6. An image-processing apparatus according to Embodiments 3 through 6 translucently blends a foreground image with the background image, and carries out a filtering process with respect to the alpha blending image.

In this case, there may be cases where a foreground image is translucently blended to the background image for which a filtering process is applied, and a filtering process is carried out on the alpha blending image thus generated.

In such a case, a portion (a portion where a complete background only or a portion where an almost background only), in which the α value is small and the background image intensively appears, of the alpha blending image to be subjected to a filtering process again, and a portion, where the background image intensively appears, of the alpha blending image will blur.

Therefore, in Embodiments 3 through 6, a filtering coefficient is determined so that the filtering intensity is weakened with respect to a portion, where the α value is small and the background image intensively appears, of the alpha blending image, thereby preventing the image from blurring.

EMBODIMENT 3

Figure 12:
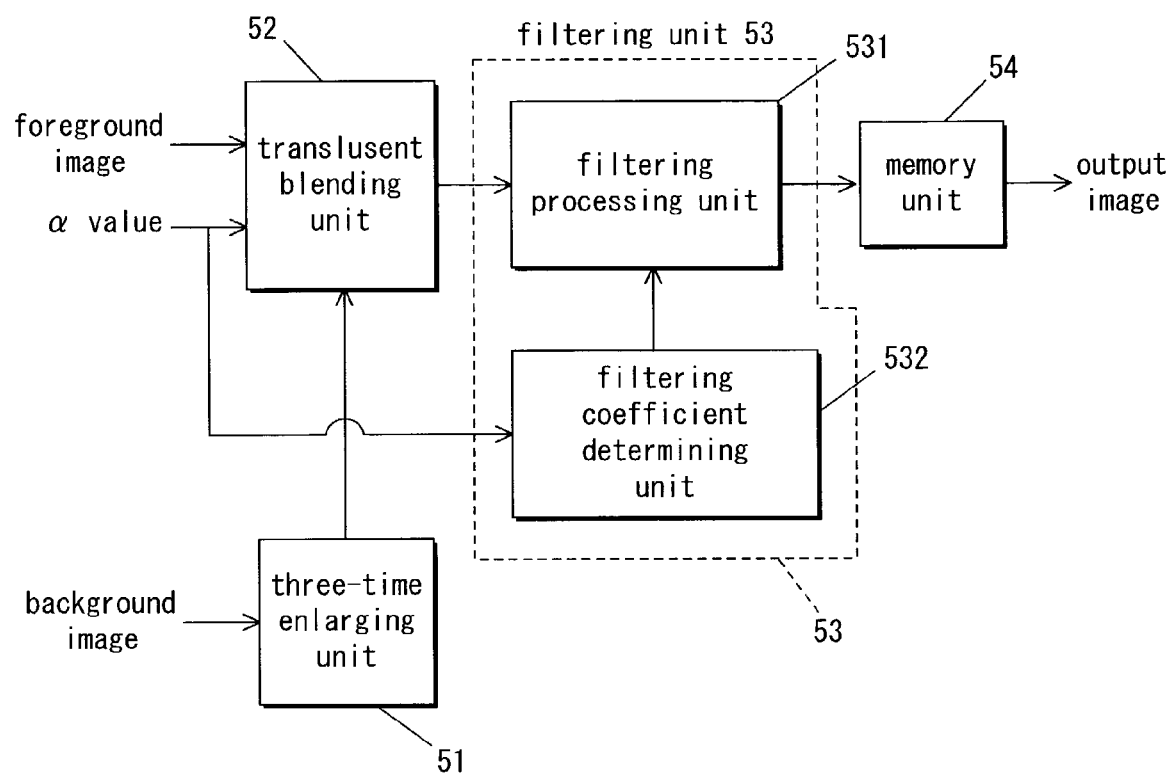
FIG. 12 is a block diagram of an image-processing apparatus according to Embodiment 3 of the invention.

FIG. 12 is a block diagram of an image-processing apparatus according to Embodiment 3 of the invention. The image-processing apparatus is provided with a three-time enlarging unit 51, a translucent blending unit 52, a filtering unit 53, and a memory unit 54.

Also, the filtering unit 53 includes a filtering processing unit 531 and a filtering coefficient determining unit 532.

A background image inputted into the three-time enlarging unit 51 is a color image or a grayscale image. Also, a foreground image inputted into the translucent blending unit 52 is a color image or a grayscale image.

In this case, both of the inputted background image and foreground image may be color images or may be grayscale images. Also, one of the background image and foreground image may be a color image, and the other thereof may be a grayscale image.

However, in the following description, it is assumed that both the inputted background image and foreground image are color images.

In this case, it is also assumed that the type of background image inputted into the three-time enlarging unit 51 is YCbCR, and the type of foreground image inputted into the translucent blending unit 52 is YCbCr. At this time, the type of alpha blending image stored in the memory unit 54 becomes YCbCr.

Herein, [Y] is brightness. [Cb] and [Cr] are chromaticity. Brightness Y is a fine brightness component of a color image. Also, G component of R, G and B may be used as a brightness component of the color image although not being fine.

Further, a filtering process for a color image is carried out with respect to the brightness component of a color image.

Next, a description is given of operations of respective sections.

A background image of ordinary precision is inputted into a three-time enlarging unit 51 in FIG. 12. Herein, the background image of ordinary precision is a background image having YCbCr data per pixel.

And, the three-time enlarging unit 51 enlarges an inputted background image by three times to generate a three-time enlarged data. A description is given of this point using the drawings.

Figure 13:
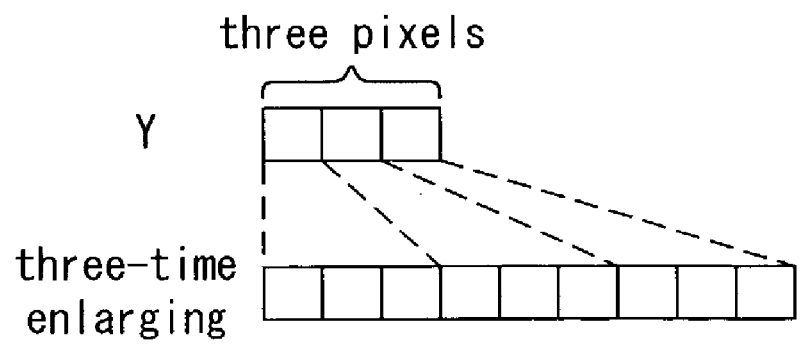
FIG. 13(a) is a view describing a three-time enlargement unit in FIG. 12.
FIG. 13(b) is a view describing a three-time enlargement unit in FIG. 12.
FIG. 13(c) is a view describing a three-time enlargement unit in FIG. 12.
Figure 13:
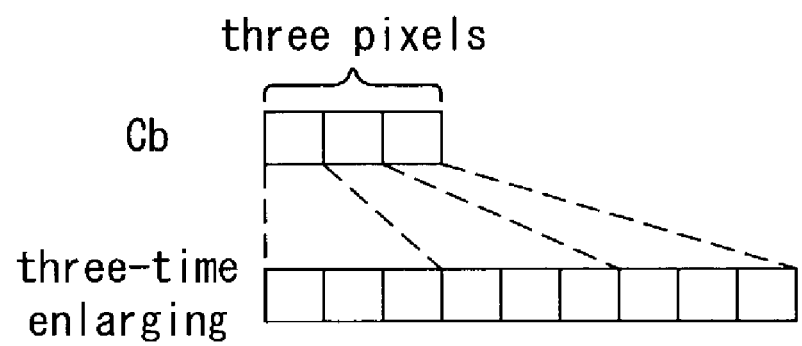
Figure 13:
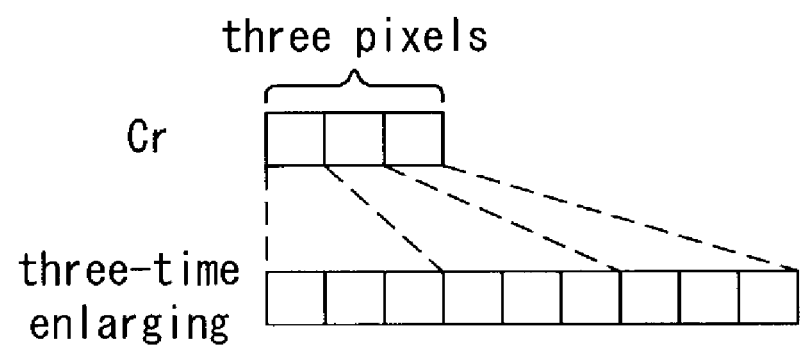

FIG. 13 is a view describing the three-time enlarging unit 51 in FIG. 12. FIG. 13(a) is a view describing three-time enlargement of the Y component, FIG. 13(b) is a view describing three-time enlargement of the Cb component, and FIG. 13(c) is a view describing three-time enlargement of the Cr component. Also, in FIG. 13, a description is given of a case where three pixels of a background image are taken for simplification.

As shown in FIG. 13(a), the three-time enlargement unit 51 simply enlarges, by three times, the Y component of an inputted background image to generate three-time enlarged data. Thereby, Y component data per sub-pixel (Data of Y component in the unit of sub-pixel) are obtained.

Further, as shown in FIG. 13(b), the three-time enlarging unit 51 simply enlarges, by three times, the Cb component of an inputted background image to generate three-time enlarged data. Thereby, Cb component data per sub-pixel (Data of Cb component in the unit of sub-pixel) are obtained.

Further, as shown in FIG. 13(c), the three-time enlarging unit 51 simply enlarges, by three times, the Cr component of an inputted background image to generate three-time enlarged data. Thereby, Cr component data per sub-pixel (Data of Cr component in the unit of sub-pixel) are obtained.

Next, a description is given of the translucent blending unit 52.

As shown in FIG. 12, a foreground image of three-time precision and an α value per sub-pixel are inputted into the translucent blending unit 52. Further, three-time enlarged data are inputted from the three-time enlarging unit 51 into the translucent blending unit 52.

Here, the foreground image of three-time precision is a foreground image having YCbCr data (YCbCr data in the unit of sub-pixel) per sub-pixel.

The translucent blending unit 52 translucently blends a foreground image with a background image to generate an alpha blending image. Now, a detailed description is given of this point.

Figure 28:
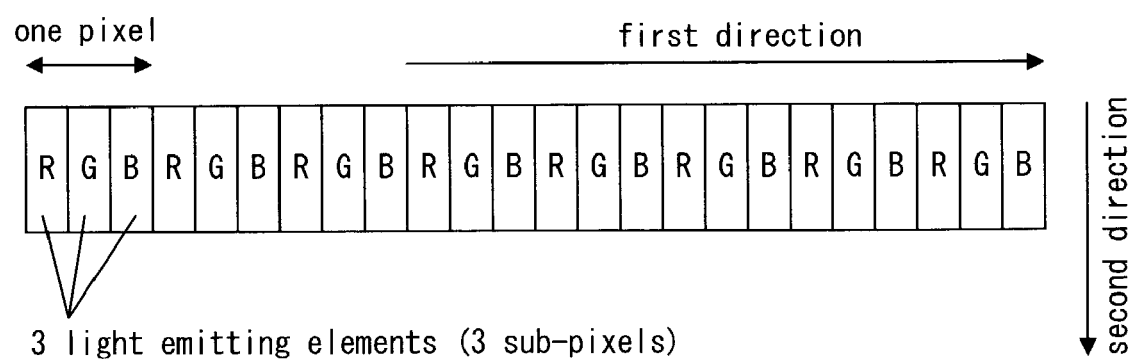
FIG. 28 is an exemplary view of one line according to a prior art.
Figure 29:
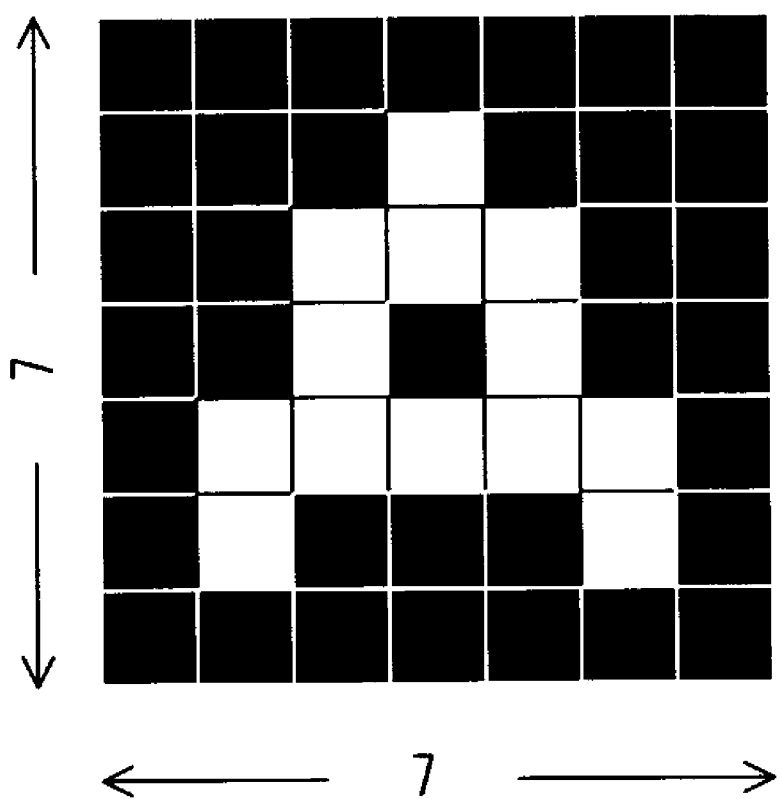
FIG. 29 is a view showing an example of an original image according to a prior art.
Figure 30:
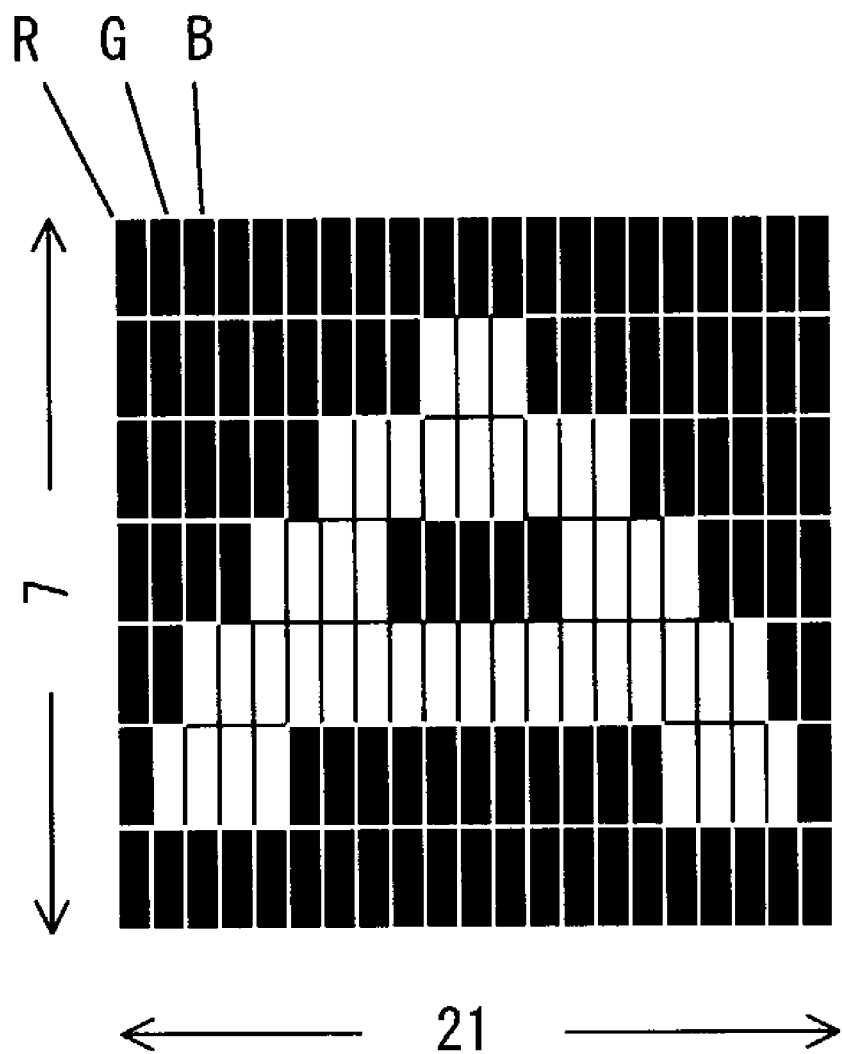
FIG. 30 is a view showing an example of a three-time image according to a prior art.
Figure 31:
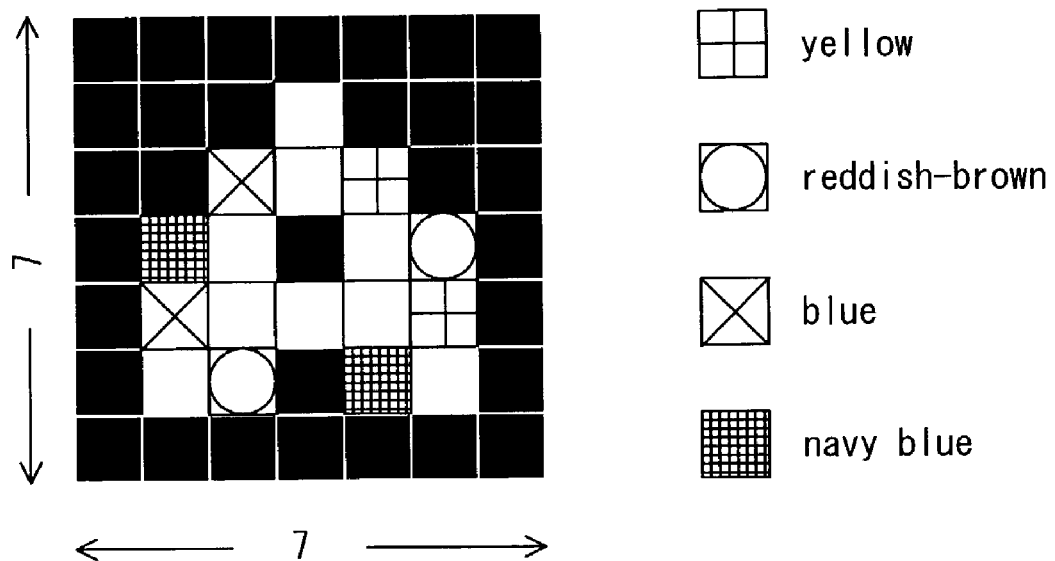
FIG. 31 is a view describing a color determination process according to a prior art.
Figure 32:
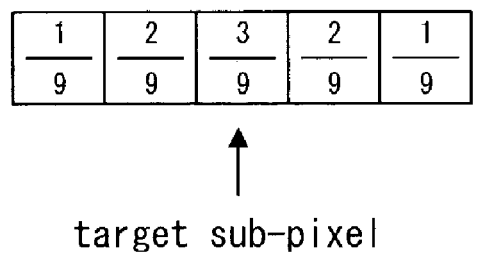
FIG. 32(a) is a view describing filtering process coefficients according to a prior art.
FIG. 32(b) is a view illustrating results of a filtering process according to the prior art.
Figure 32:
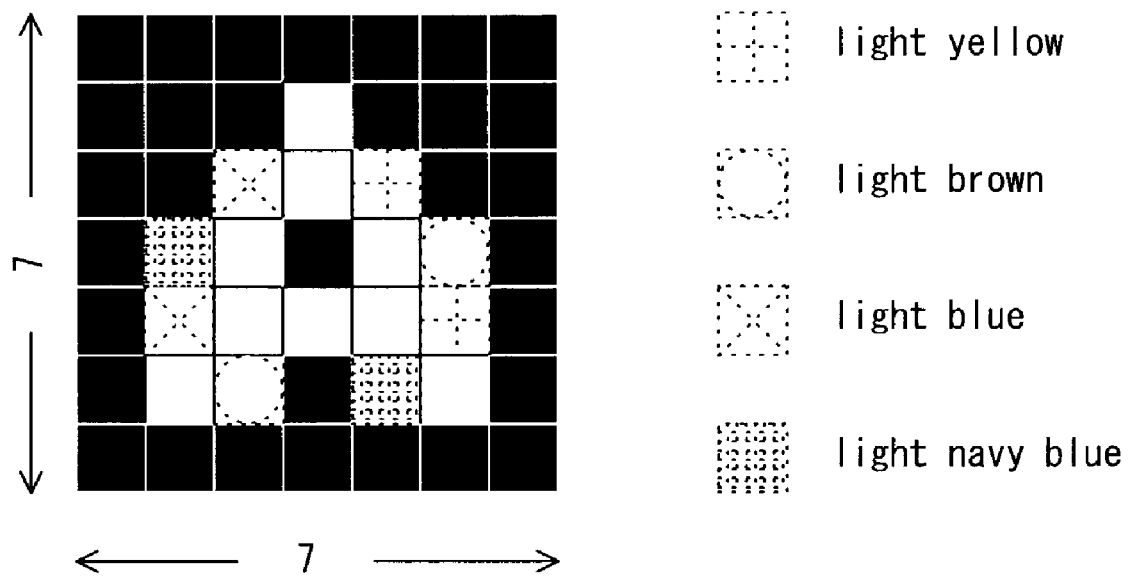
Figure 33:
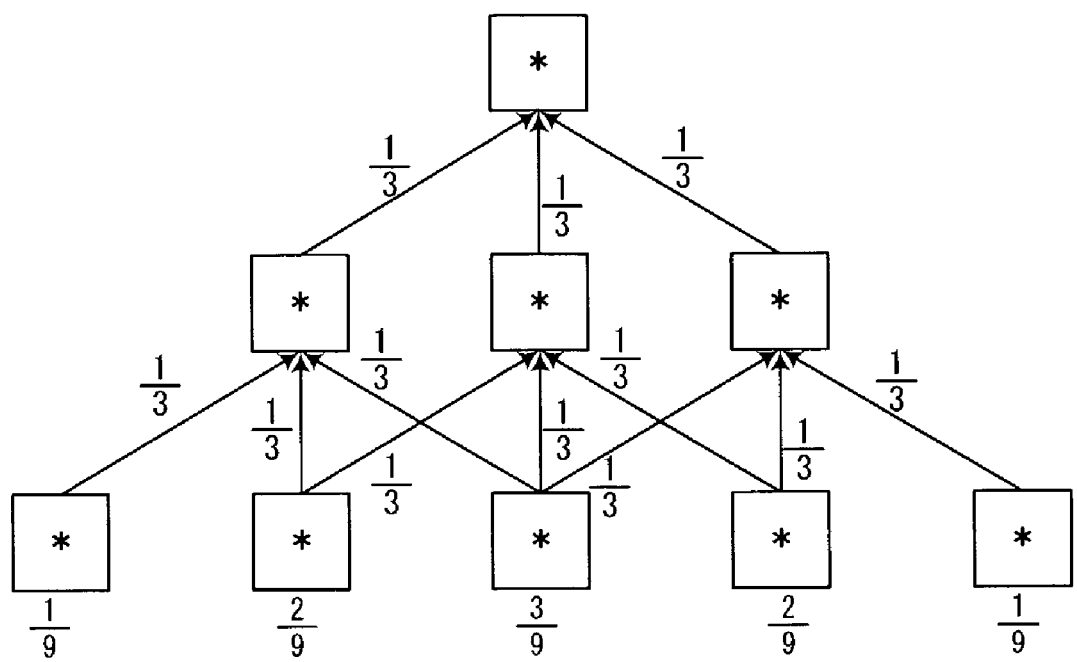
FIG. 33 is a view describing filtering process coefficients according to a prior art.

Also, for convenience of description, it is assumed that the first direction in the display device (See FIG. 28) is x direction, and the second direction is y direction.

Using an α value, the translucent blending unit 52 translucently blends Y component data of a background image in terms of a sub-pixel and Y component data of a foreground image in terms of the sub-pixel, thereby generating translucently blended Y component data in terms of the sub-pixel.

In addition, using an α value, the translucent blending unit 52 translucently blends Cb component data of a background image in terms of a sub-pixel and Cb component data of a foreground image in terms of the sub-pixel, thereby generating translucently blended Cb component data in terms of the sub-pixel. Similarly, the translucent blending unit 52 generates translucently blended Cr component data in terms of the sub-pixel.

For example, the translucent blending unit 52 carries out a translucent blending by the following expression, and obtains Y component data Y (x,y), Cb component data Cb (x,y) and Cr component data Cr (x,y), which are translucently blended.

$$Y(x,y)=\alpha(x,y)\times Yf(x,y)+\{1.0-\alpha(x,y)\}\times Yb(x,y)$$

$$Cb(x,y)=\alpha(x,y)\times Cbf(x,y)+\{1.0-\alpha(x,y)\}\times Cbb(x,y)$$

$$Cr(x,y)=\alpha(x,y)\times Crf(x,y)+\{1.0-\alpha(x,y)\}\times Crb(x,y)  \quad \text{[Expression 16]}$$

In (Expression 16), it is assumed that the Y component data of the background image in terms of a sub-pixel is [Yb(x,y)], the Cb component data of the background image in terms of a sub-pixel is [Cbb(x,y)], and the Cr component data of the background image in terms of a sub-pixel is [Crb(x,y)].

Also, in (Expression 16), it is assumed that the Y component data of the foreground image in terms of a sub-pixel is [Yf(x,y)], the Cb component data of the foreground image in terms of a sub-pixel is [Cbf(x,y)], and the Cr component data of the foreground image in terms of a sub-pixel is [Crf(x,y)].

Further, in (Expression 16), it is assumed that the α value is [α(x,y)], and the range that the α value can acquire is [0.0 through 1.0]. The α value is thus normalized.

Still further, in (Expression 16), coordinate x and coordinate y are coordinate axes in terms of a sub-pixel. Therefore, Y component data Y (x,y), Cb component data Cb (x,y) and Cr component data Cr (x,y), which are translucently blended, are obtained in terms of a sub-pixel.

As described above, an image that is obtained from Y component data Y (x,y), Cb component data Cb (x,y) and Cr component data Cr (x,y), which are generated in terms of a sub-pixel, is called an alpha blending image.

Herein, since the α value is a degree of translucent blending, it is assumed that the α value is [0.0] through [1.0] for convenience of the following description. And, a case where the α values of all the sub-pixels are identical to each other is assumed.

In this case, as the α value approaches [0.0], a background image intensively appears in the alpha blending image. And, when the α value is [0.0], the alpha blending image is only the background image. On the contrary, as the α value approaches [1.0], a foreground image intensively appears in the alpha blending image. And when the α value is [1.0], the alpha blending image is only the foreground image.

In addition, when the α value is larger than [0.0] but smaller than [1.0], the alpha blending image becomes a portion in which the background is made transparent into the foreground, in response to the size of the α value. However, although being described in Embodiment 4, when looking at an alpha blending image, a human recognizes that the alpha blending image is an almost background image if the α value is 0.2 or less.

Next, a description is given of a filtering unit 53 in FIG. 12. As shown in FIG. 12, an α value per sub-pixel is inputted into the filtering coefficient determining unit 532, and the filtering coefficient determining unit 532 determines three filtering coefficients with respect to the respective sub-pixels of the alpha blending image on the basis of the α value (The first example of determination of filtering coefficients).

In this case, the filtering coefficient determining unit 532 determines the filtering coefficients so that the ratios of the three filtering coefficients become as in [Expression 17].

$$\alpha:1+2(1-\alpha):\alpha  \quad \text{[Expression 17]}$$

As shown in (Expression 17), each of the three filtering coefficients is determined as a function of the α value.

Herein, in (Expression 17), the α value should be expressed to be [α(x,y)]. However, it is omitted to be [x,y] for simplification.

The α value used when determining filtering coefficients for filtering processes with respect to sub-pixelss existing in the coordinate (x,y) of the alpha blending image is [α(x,y)] that is used to generate the sub-pixel data.

Now, the filtering processing unit 531 carries out filtering processes with respect to the alpha blending image generated by the translucent blending unit 52, by using the filtering coefficients determined by the filtering coefficient determining unit 532. In this case, the filtering processing unit 531 carries out a filtering process with respect to the Y component data of the alpha blending image.

A detailed description is given of the above-described point with reference to the drawings.

FIG. 14 is a view describing the first example of filtering coefficient determination in the filtering unit 53 in FIG. 12. FIG. 14(a) is a view describing determination of filtering coefficients and filtering process according to the first example, FIG. 14(b) is a view illustrating filtering coefficients according to the first example, and FIG. 14(c) is a view showing the relationship between the filtering intensity (blurring degree) and α value according to the first example.

Further, in FIG. 4(a), a case where the target sub-pixel is a sub-pixel of G is taken for instance.

Therefore, FIG. 14(a) is an example of obtaining filtering coefficients to apply a filtering process to the Sub-pixel of G.

Also, for FIG. 14(a), although arrangement of the sub-pixels is [R, G and B], the arrangement is not limited to the same. It may be [B, G and R].

As shown in FIG. 14(a), in the filtering coefficient determining unit 532, three filtering coefficients to apply a filtering process with respect to the target sub-pixel of G are determined to be [(⅓)a], [(⅓)b] and [(⅓)c].

In this case, the filtering coefficient determining unit 532 determines a:b:c so that the ratio become as shown in (Expression 17). In addition, in FIG. 14(a), β=1+2(1−α) is established.

Herein, since FIG. 14(a) shows an example for obtaining three filtering coefficients to apply a filtering process with respect to the target sub-pixel of G, an α value that is used to generate data of the target sub-pixels of G of the alpha blending image is used for [α] in (Expression 17).

Therefore, as shown in the following expression, the filtering processing unit 531 obtains the sum V (x, y) of a figure, which is obtained by multiplying the Y component data Y (x,y) of the target sub-pixel of G by a filtering coefficient (⅓)b, a figure, which is obtained by multiplying the Y component data Y (x−1, y) of R sub-pixel adjacent to the left side thereof by a filtering coefficient (⅓)a, and a figure, which is obtained by multiplying the Y component data Y (x+1, y) of a sub-pixel of B adjacent to the right side thereof by a filtering coefficient (⅓)c.

$$V(x,y) = \frac{1}{3}\ aY(x-1,y) + \frac{1}{3}\ bY(x,y) + \frac{1}{3}\ cY(x+1,y) \qquad \text{[Expression 18]}$$

The sum V(x,y) is a result for which a filtering process is applied to the Y component of the target sub-pixel of G of the alpha blending image.

Here, as shown in FIG. 14(b), the closer the α value approaches [0.0], the smaller the values [a] and [c] become while the value [b] becomes larger.

As shown in FIG. 14(c), this means, in the alpha blending image, that the filtering intensity is weakened at a portion where the α value is small and the background image intensively appears. For example, in an extreme case, where the α value is [0.0], the Y component data V (x,y) of the target sub-pixel of G after filtering becomes the same value as that of the Y component data Y (x,y) of the target sub-pixel of G before the filtering, wherein the filtering intensity is the weakest, and, substantially, it is equivalent to a case where no filtering process is applied.

Herein, [a portion where the α value is small and the background image intensively appears] means a portion where a complete background only or a portion where an almost complete background only of the alpha blending image. In the present specification, [background portion] is used so as to have such a meaning with respect to the alpha blending image.

On the other hand, in the alpha blending image, the filtering intensity is strengthened for a foreground portion where the α value is not small (FIG. 14(c)). For example, in an extreme case, where the α value is [1.0], the Y component data V(x,y) of the target sub-pixel of G after filtering becomes (⅓)×Y(x−1, y)+(⅓)×Y(x,y)+ (⅓)×Y(x+1,y), wherein the filtering intensity becomes the strongest.

Herein, [a foreground portion where the α value is not small] means a completely foreground portion only, an almost completely foreground portion only or a portion, where the background is made transparent into the foreground, of the alpha blending image. In the specification, [a foreground portion] is used so as to have such a meaning with respect to the alpha blending image.

Also, if the filtering intensity is low, the blurring degree of an image is slight, and if the filtering intensity is high, the blurring degree of an image is increased.

Therefore, the filtering coefficient is determined on the basis of (Expression 17). By weakening the filtering intensity for the background portion, where the α value is small, of the alpha blending image, color blurring of the background portion of the alpha blending image is prevented from occurring.

On the other hand, the filtering coefficients are determined on the basis of (Expression 17). The filtering intensity is strengthened for the foreground portion, where the α value is not small, of the alpha blending image, and color unevenness of the foreground portion of the alpha blending image is prevented from occurring.

Now, in the above, a description was given of an example in which the filtering coefficient determining unit 532 determines the three filtering coefficients with respect to the respective sub-pixels of the alpha blending image on the basis of an inputted α value (This is the first example of determining filtering coefficients).

Next, a description is given of a second example of determining filtering coefficients, in which the filtering coefficient determining unit 531 determines five filtering coefficients with respect to respective sub-pixels of the alpha blending image on the basis of an inputted α value.

In this case, the filtering coefficient determining unit 532 determines filtering coefficients so that the ratio of the five filtering coefficients becomes as in [Expression 19]

$$\alpha^2:2\alpha\beta:2\alpha^2+\beta^2:2\alpha\beta:\alpha^2\beta=1+2(1-\alpha) \qquad \text{[Expression 19]}$$

As shown in (Expression 19), the respective five filtering coefficients are determined as functions of the α value.

Herein, in (Expression 19), although the α value should be expressed to be [(x(x,y)], [x,y] is omitted for simplification.

Therefore, α value used to determine filtering coefficients to apply the filtering process with respect to a sub-pixel existing at a coordinate (x,y) of the alpha blending image is [α(x,y)] that is used to generate data of the sub-pixel.

Therefore, the filtering processing unit 531 carries out a filtering process on an alpha blending image, which is generated by the translucent blending unit 52, using the filtering coefficients determined by the filtering coefficient determining unit 532. In this case, the filtering processing unit 531 carries out a filtering process on the Y component data of the alpha blending image.

A detailed description is given of the above point using the drawings.

Figure 15:
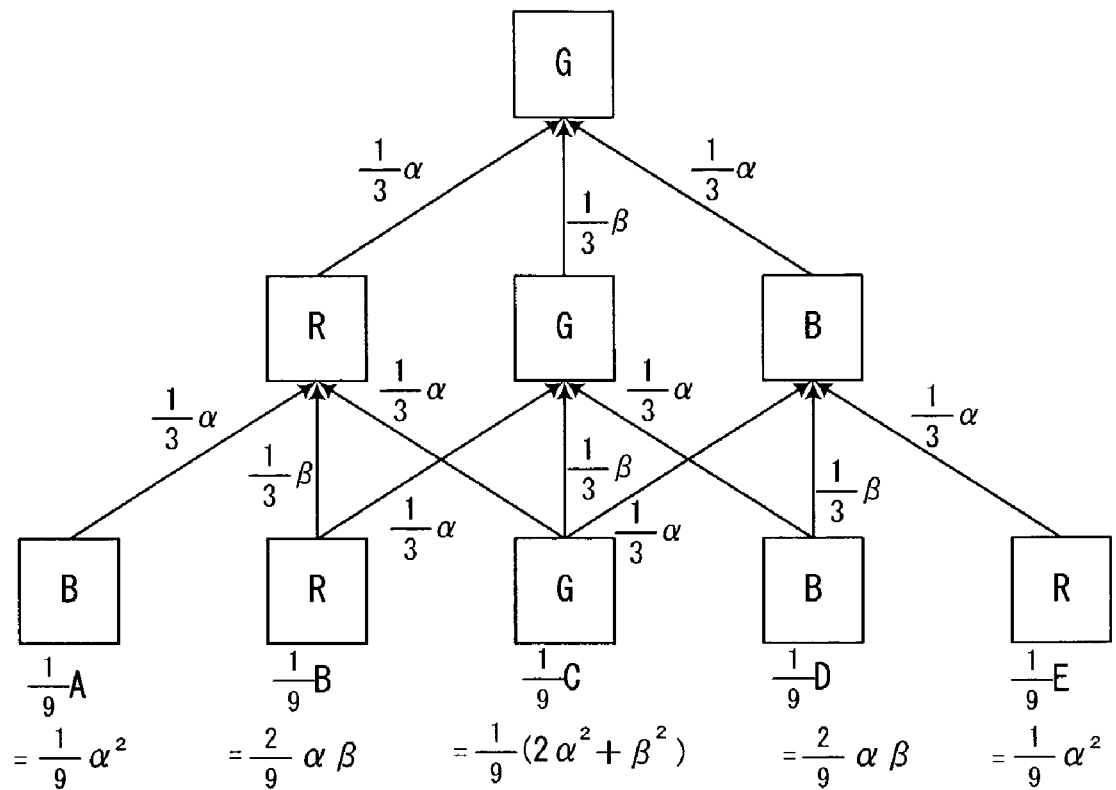
FIG. 15(a) is a view describing the second example of determination of filtering coefficients.
FIG. 15(b) is an exemplary view of filtering coefficients according to the second example.

FIG. 15 is a view describing the second example of determination of filtering coefficients in the filtering unit 53 in FIG. 12. FIG. 15(a) is a view describing determination of filtering coefficients and the filtering process according to the second example, and FIG. 15(b) is a view illustrating filtering coefficients according to the second example.

Also, in FIG. 15(a), it is assumed that the target sub-pixel is a sub-pixel of G.

Therefore, FIG. 15(a) is an example of obtaining filtering coefficients to apply a filtering process with respect to the sub-pixel of G.

Also, in FIG. 15(a), although arrangement of sub-pixels is R, G and B, the arrangement is not limited to this. For example, [B, G and R] is acceptable.

As shown in FIG. 15(a), the filtering coefficient determining unit 532 determines five filtering coefficients to apply a filtering process with respect to the target sub-pixel of G, which are [(⅑)A], [(⅑)B], [(⅑)C], [(⅑)D], and [(⅑)E].

In this case, the filtering coefficient determining unit 532 determines A:B:C:D:E so that the ratio becomes as shown in (Expression 19).

Herein, since FIG. 15(*a*) shows an example of obtaining five filtering coefficients to apply a filtering process with respect to the target sub-pixel of G, the α value that is used to generate the data of the target sub-pixel of G of the alpha blending image is used for [α] of (Expression 19).

Here, as shown in the following expression, the filtering processing unit 531 obtains the sum V(x,y) of a figure, which is obtained by multiplying the Y component data Y (x−2,y) of the sub-pixel of B adjacent to the target sub-pixel of G via a sub-pixel of R by a filtering coefficient (⅑)A, a figure, which is obtained by multiplying the Y component data Y (x−1,y) of the sub-pixel of R adjacent to the left side of the target sub-pixel of G by a filtering coefficient (⅑)B, a figure, which is obtained by multiplying the Y component data Y (x,y) of the target sub-pixel of G by a filtering coefficient (⅑)C, a figure, which is obtained by multiplying the Y component data Y (x+1,y) of the sub-pixel of B adjacent to the right side of the target sub-pixel of G by a filtering coefficient (⅑)D, and a figure, which is obtained by multiplying the Y component data Y (x+2,y) of the sub-pixel of R adjacent to the target sub-pixel of G via the sub-pixel of B by a filtering coefficient (⅑)E.

$$V(x,y) = \frac{1}{9} AY(x-2,y) + \frac{1}{9} BY(x-1,y) + \frac{1}{9} CY(x,y) + \frac{1}{9} DY(x+1,y) + \frac{1}{9} EY(x+2,y)$$

[Expression 20]

The sum V (x,y) is the result of having carried out a filtering process on the Y component of the target sub-pixel of G of the alpha blending image.

Now, as shown in FIG. 15(*b*), the closer the α value approaches [0.0], the smaller the values [A] and [E] become. Similarly, the values [B] and [D] become smaller. On the other hand, the value [C] is increased in line with the α value approaching [0.0].

This means, as shown in FIG. 14(*c*), that in the alpha blending image, the filtering intensity is weakened for the background portion where the α value is small.

Therefore, by determining the filtering coefficients on the basis of (Expression 19), the filtering intensity is weakened for the background portion, where the α value is small, of the alpha blending image, wherein the background portion of the alpha blending image is prevented from blurring.

On the other hand, by determining the filtering coefficients on the basis of (Expression 19), the filtering intensity is strengthened for the foreground portion, where the α value is not small, of the alpha blending image, wherein the foreground portion of the alpha blending image is prevented from color unevenness.

The Y component of the alpha blending image, for which the filtering process has been applied as described above, is stored in the memory unit 54 together with the Cb component and Cr component of the alpha blending image. And, the alpha blending image stored in the memory unit 54 is outputted as an output image.

Figure 16:
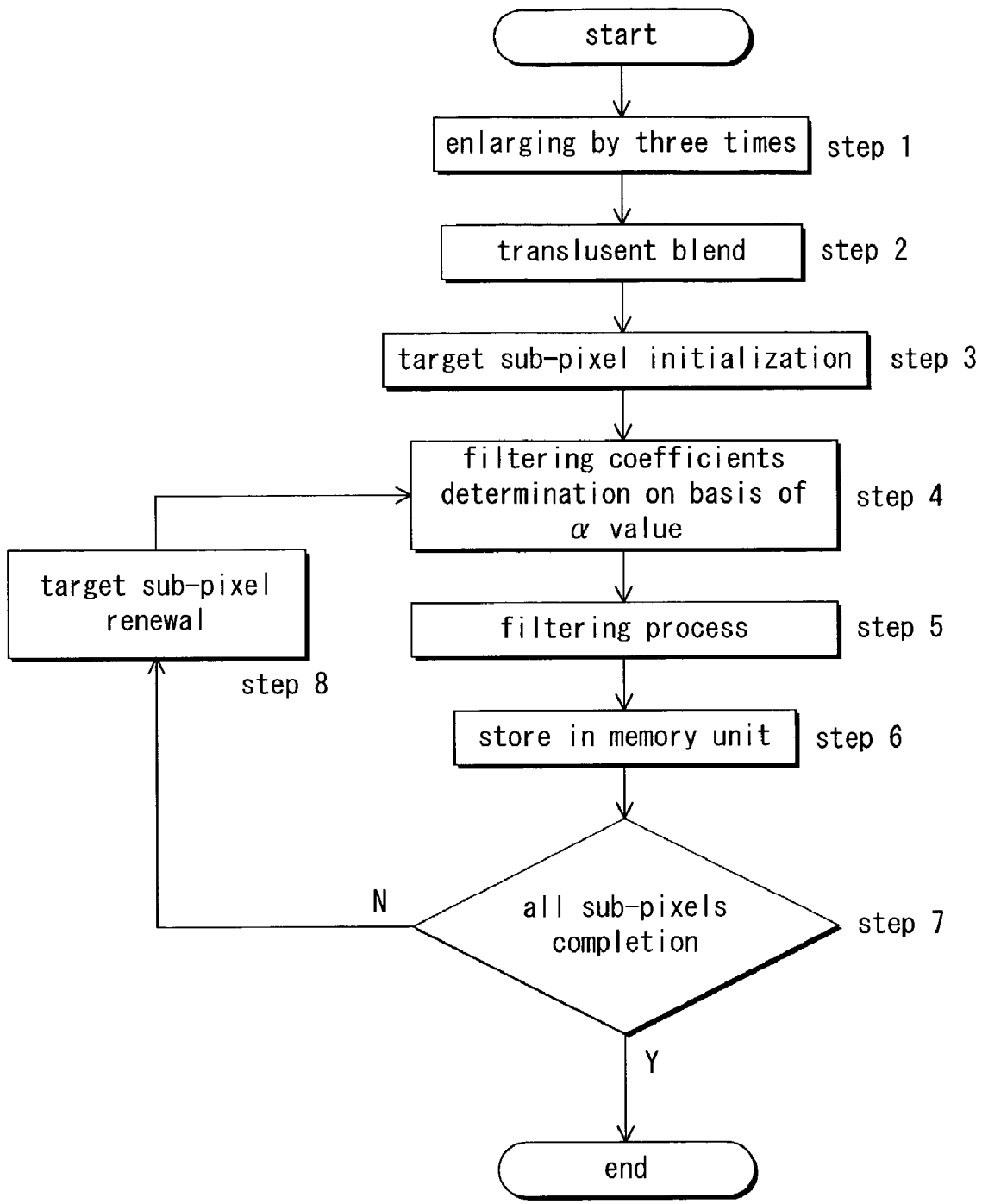
FIG. 16 is a flowchart of an image-processing apparatus according to Embodiment 3 of the invention.

Next, using FIG. 12 and FIG. 16, a description is given of a flow of the processing in an image-processing apparatus according to Embodiment 3.

FIG. 16 is a flowchart of an image-processing apparatus according to Embodiment 3.

As shown in FIG. 16, in Step 1, the three-time enlarging unit 51 enlarges a background image of normal precision by three times, and generates three-time enlarged data. And, the three-time enlarged data are outputted to the translucent blending unit 52.

In Step 2, the translucent blending unit 52 translucently blends the background image and foreground image to generate an alpha blending image. And, the alpha blending image is outputted to the filtering processing unit 531.

In Step 3, the filtering processing unit 531 initializes the target sub-pixel at the top left initial position in the alpha blending image.

In Step 4, the filtering coefficient determining unit 532 determines three filtering coefficients to apply a filtering process with respect to the target sub-pixel on the basis of (Expression 17) of the α value of the target sub-pixel.

Also, in this case, five filtering coefficients may be determined on the basis of (Expression 19).

In Step 5, the filtering processing unit 531 carries out a filtering process for the target sub-pixel using the filtering coefficients determined by the filtering coefficient determining unit 532.

In Step 6, the Y component of the target sub-pixel, for which the filtering process has been applied, is stored in the memory unit 54.

The process from Step 4 to Step 6 is repeated (Step 7) while renewing the target sub-pixels (Step 8) until the process is completed for all sub-pixels.

As described above, in the present embodiment, the three filtering coefficients for a filtering process with respect to the data of the target sub-pixel are determined on the basis of (Expression 17) (This is the first example of determination of filtering coefficients).

Thereby, while the filtering intensity is weakened in response to the size of the α value in the background portion where the α value is small, and the background portion of the alpha blending image can be prevented from blurring, in the foreground portion where the α value is not small, the filtering intensity is strengthened in response to the size of the α value, wherein color unevenness of the foreground portion of the alpha blending image can be prevented.

Further, since there are three filtering coefficients for a filtering process with respect to the data of the target sub-pixel, the filtering coefficients can be easily determined, and the filtering process can be simplified, wherein the processing speed is accelerated.

In addition, in the present embodiment, five filtering coefficients for a filtering process with respect to the data of the target sub-pixel may be determined on the basis of (Expression 19) (This is the second example of determining filtering coefficients).

Accordingly, while, at the background portion where the α value is small, the filtering intensity is weakened in response to the size of [α], and the background portion of the alpha blending image can be prevented from blurring, the filtering intensity is strengthened in response to the size of [α] at the foreground portion where the α value is not small, and the foreground portion of the alpha blending image can be prevented from color unevenness.

Further, since there are five filtering coefficients for a filtering process with respect to the data of the target sub-pixel, a fine filtering process can be carried out for the foreground portion of the alpha blending image.

As a result, it is possible to quite effectively suppress color unevenness at the foreground portion of the alpha blending image.

In addition, in the present embodiment, the type of color image is YCbCr, wherein since a filtering process is carried out with respect to the Y component which is a precise brightness component of the color image, a filtering effect can be remarkably effectively displayed, and color unevenness can be effectively suppressed remarkably.

EMBODIMENT 4

The entire configuration of an image-processing apparatus according to Embodiment 4 of the present invention is similar to that of the image-processing apparatus in FIG. 12.

Therefore, a description of Embodiment 4 is based on that the image-processing apparatus in FIG. 12 is an image-processing apparatus of Embodiment 4.

A point where Embodiment 4 differs from Embodiment 3 exists in a method for determining filtering coefficients by the filtering coefficient determining unit 532.

Since Embodiment 4 is the same as Embodiment 3 in all other points, description is properly omitted, and a description is given focusing on the filtering coefficient determining unit 3.

As shown in FIG. 12, an $\alpha$ value per sub-pixel is inputted into the filtering coefficient determining unit 532. And, the filtering coefficient determining unit 532 determines three filtering coefficients with respect to the respective sub-pixels of the alpha blending image on the basis of the $\alpha$ value. (This is the third example of determining filtering coefficients).

In this case, the filtering coefficient determining unit 532 determines the filtering coefficients so that the ratio of the three filtering coefficients become as in [Expression 21].

then $\alpha > 0.2$

1:1:1 then $\alpha \leq 0.2$ $\alpha\#:1+2(1-\alpha\#):\alpha\#\alpha\#=5.0\times\alpha$  [Expression 21]

That is, as shown in (Expression 21), where $\alpha > 0.2$, it is assumed that the three filtering coefficients are fixed values. The reason will be described later.

On the other hand, where ($\alpha \leq 0.2$, the respective three filtering coefficients are determined as functions of the $\alpha$ value as in Embodiment 3.

Herein, although the $\alpha$ value should be expressed to be [$\alpha$(x,y)] in (Expression 21), [(x,y)] is omitted for simplification.

Therefore, the $\alpha$ value that is used to determine filtering coefficients for a filtering process with respect to sub-pixels existing at the coordinate (x,y) of the alpha blending image is [$\alpha$(x,y)] used to generate the data of the sub-pixels.

Now, the filtering processing unit 531 carries out a filtering process on the alpha blending image, which is generated by the translucent blending unit 52, by using the filtering coefficients determined by the filtering coefficient determining unit 532. In this case, the filtering processing unit 531 applies a filtering process to the data of the Y component of the alpha blending image.

Also, the reason why $\alpha\#=5.0\times\alpha$ is used in (Expression 21) is to employ [1.0] when $\alpha=0.2$.

Figure 17:
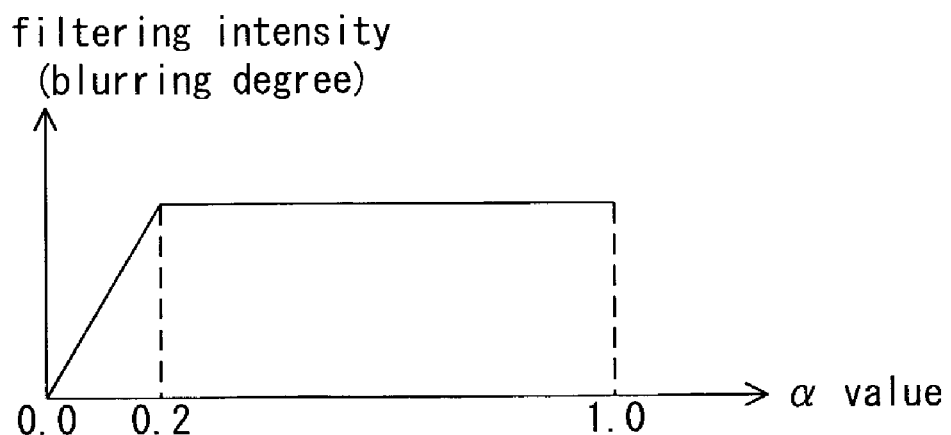
FIG. 17(a) is an exemplary view of filtering coefficients according to the third example of an image-processing apparatus according to Embodiment 4 of the invention.
FIG. 17(b) is a view showing the relationship between filtering intensity and α values according to the third example.

A detailed description is given of the above-described point with reference to FIG. 14(a) and FIG. 17. In the description, a case where the filtering coefficient determining unit 532 calculates three filtering coefficients of (⅓)a, (⅓)b, and (⅓)c with respect to the target sub-pixel of G is taken for instance.

However, in Embodiment 4, [a], [b] and [c] are not determined as shown in FIG. 14(a), but are determined as described below.

FIG. 17 is a view describing the third example of determining the filtering coefficients in the filtering unit 53 in FIG. 12. FIG. 17(a) is a view illustrating the filtering coefficients according to the third example, and FIG. 17(b) is a view showing the relationship between the filtering intensity and an $\alpha$ value according to the third example.

The filtering coefficient determining unit 532 determines a:b:c on the basis of (Expression 21).

In this case, where $\alpha > 0.2$ as shown in FIG. 17(a), [a], [b] and [c] become fixed values.

In detail, where $\alpha > 0.2$, a=b=c=1 is established. As shown in FIG. 17(b), the filtering intensity brought about by the filtering processing unit 531 is strengthened.

On the other hand, as shown in FIG. 17(a), where $\alpha \leq 0.2$, as in Embodiment 3, the closer the $\alpha$ value approaches [0.0], the smaller the values [a] and [c] become while the value [b] becomes larger.

Where $\alpha \leq 0.2$, this means that, as shown in FIG. 17(b), the smaller the $\alpha$ value becomes, the weaker the filtering intensity becomes. That is, where $\alpha \leq 0.2$, a process similar to that of Embodiment 3 is carried out.

The filtering coefficient determining unit 532 determines [a], [b], and [c] as described above, and calculates three filtering coefficients by multiplying each of these by ⅓.

In addition, since this is an example in which three filtering coefficients are obtained to apply a filtering process with respect to the target sub-pixel of G, the $\alpha$ value that has been used to generate the data of the target sub-pixel of G of the alpha blending image is used for [$\alpha$] in the ratio shown in (Expression 21).

As described above, the reason why the filtering coefficients are determined on the basis of (Expression 21) is described below.

When looking at an alpha blending image, a human recognizes that a portion of $\alpha \leq 0.2$ of the alpha blending image is the background portion (a portion where a complete background only, or a portion where an almost complete background only).

Accordingly, if the filtering coefficients are determined by employing a function of an $\alpha$ value, by which the smaller the $\alpha$ value becomes, the weaker the filtering intensity becomes, only where $\alpha \leq 0.2$, it is possible to prevent the background portion of the alpha blending image from blurring in a sufficiently practical range of use.

On the other hand, When looking at an alpha blending image, a human recognizes that a portion of $\alpha > 0.2$ of the alpha blending image is a foreground portion (that is, a portion where a complete foreground only, a portion where an almost complete foreground only, or a portion where the background is made transparent into the foreground).

Therefore, where $\alpha > 0.2$ by carrying out a filtering process using filtering coefficients of fixed value by which the filtering intensity is strengthened, color unevenness of the foreground portion of the alpha blending image can be suppressed.

Now, the filtering processing unit 531 inputs the three filtering coefficients determined as described above from the filtering coefficient determining unit 532, and obtains V(x,y) on the basis of (Expression 18).

The V(X,y) is the result of having applied a filtering process with respect to the Y component of the target sub-pixel of G of the alpha blending image.

In the above description, a case where the filtering coefficient determining unit 532 determines three filtering coefficients with respect to the respective sub-pixels of the alpha blending image on the basis of an inputted α value is taken for instance (This is the third example of determining filtering coefficients).

Next, a description is given of a case where the filtering coefficient determining unit 532 determines five filtering coefficients with respect to the respective sub-pixels of an alpha blending image on the basis of an inputted α value.

In this case, the filtering coefficient determining unit 532 determines filtering coefficients so that the ratio of the five filtering coefficients becomes as in [Expression 22].

then α>0.2

1:2:3:2:1 then α≦0.2

$$\alpha\#^2:2\alpha\#\beta:2\alpha\#^2+\beta^2:2\alpha\#\beta:\alpha\#^2 \alpha\#=5.0\times\alpha\beta=1+2(1-\alpha\#$$ [Expression 22]

That is, as shown in (Expression 22), where α>0.2, it is assumed that the five filtering coefficients are fixed values. The reason is the same as in the case of (Expression 21).

On the other hand, where α≦0.2, each of the five filtering coefficients is determined as a function of the α value as in Embodiment 3.

Herein, although the α value should be expressed to be [α(x,y)] in (Expression 22), [(x,y)] is omitted for simplification.

Therefore, the α value that is used to determine the filtering coefficients to apply a filtering process with sub-pixels existing at the coordinate (x,y) of an alpha blending image is [α(x,y)] used to generate the data of the sub-pixels.

The filtering processing unit 531 carries out a filtering process on the alpha blending image, which is generated by the translucent blending unit 52, by using the filtering coefficients determined by the filtering coefficient determining unit 532. In this case, the filtering processing unit 531 applies a filtering process to the data of the Y component of the alpha blending image.

Also, the reason why α#=5.0×α is used in (Expression 22) is to employ [1.0] when α=0.2.

A detailed description is given of the above-described point using FIG. 15(a) and FIG. 18. In the description, a case where the filtering coefficient determining unit 532 calculates five filtering coefficients (⅑)A, (⅑)B, (⅑)C, (⅑)D, and (⅑)E with respect to the target sub-pixel of G as shown in FIG. 15(a) is taken for instance.

However, in Embodiment 4, [A], [B], [C], [D] and [E] are not determined as shown in FIG. 15(a), but are determined as described below.

FIG. 18 is a view describing the fourth example of determining the filtering coefficients in the filtering unit 53 in FIG. 12. FIG. 18 illustrates the filtering coefficients according to the third example.

The filtering coefficient determining unit 532 determines A:B:C:D:E on the basis of (Expression 22).

When this is done, as shown in FIG. 18, where α>0.2, [A], [B], [C], [D], and [E] become fixed values.

In detail, where α>0.2, A=1, B=2, C=3, D=2 and E=1 are established. As shown in FIG. 17(b), the filtering intensity brought about by the filtering processing unit 531 is strengthened.

On the other hand, as shown in FIG. 18, where α≦0.2, as in Embodiment 3, the closer the α value approaches [0.0], the smaller the values [A] and [E] become, wherein values [B] and [D] are also made smaller.

On the other hand, where α≦0.2, as in Embodiment 3, the closer the α value approaches [0.0], the larger the value [C] becomes.

This means that, where α≦0.2, as shown in FIG. 17(b), the smaller the α value becomes, the weaker the filtering intensity becomes. That is, where α≦0.2, a process similar to that of Embodiment 3 is carried out.

The filtering coefficient determining unit 532 determines [A], [B], [C], [D], and [E] as described above, and multiplies each of these by ⅑ to calculate the five filtering coefficients.

In addition, since an example in which five filtering coefficients are obtained to apply a filtering process with respect to the target sub-pixel of G is employed, the α value that is used to generate data of the target sub-pixel of G of an alpha blending image is used for [α] in the ratio shown in (Expression 22).

Here, the filtering processing unit 531 inputs the five filtering coefficients obtained as described above from the filtering coefficient determining unit 532 and obtains V(x,y) on the basis of (Expression 20).

The V(x,y) is the result of having carried out a filtering process with the Y component of the target sub-pixel of G in the alpha blending image.

Figure 19:
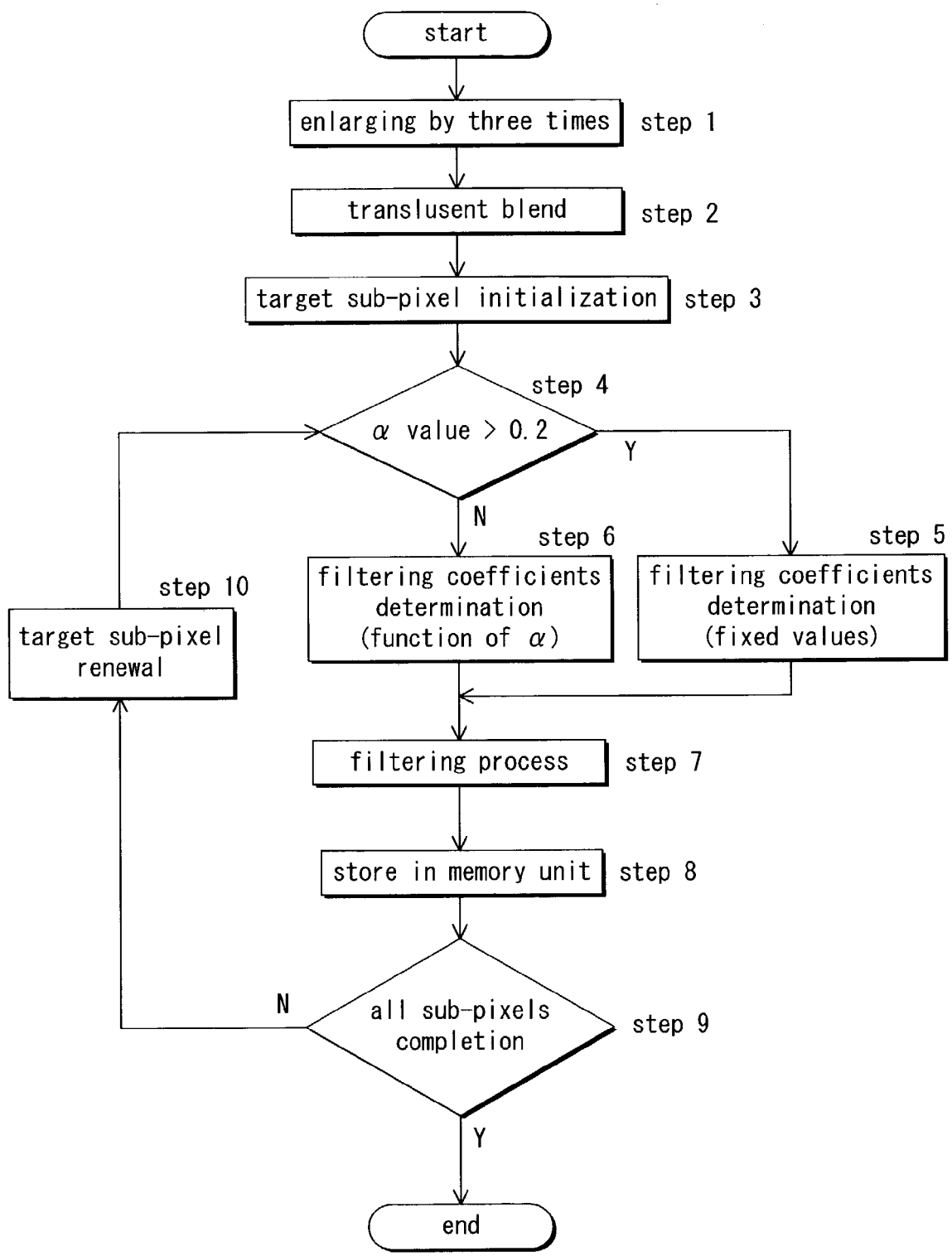
FIG. 19 is a flowchart of the image-processing apparatus according to Embodiment 4 of the invention.

Next, using FIG. 12 and FIG. 19, a description is given of a flow of processing in an image-processing apparatus according to Embodiment 4.

FIG. 19 is a flowchart of the image-processing apparatus according to Embodiment 4.

As shown in FIG. 19, in Step 1, the three-time enlarging unit 51 enlarges the background image of normal precision by three times and generates a three-time enlarged image. And, the three-time enlarged image is outputted to the translucent blending unit 52.

In Step 2, the translucent blending unit 52 translucently blends the background image and foreground image on the basis of the α value to generate an alpha blending image. And, the alpha blending image is outputted to the filtering processing unit 531.

In Step 3, the filtering processing unit 531 initializes the target sub-pixel at the top left initial position in the alpha blending image.

The filtering coefficient determining unit 532 makes the three filtering coefficients fixed values on the basis of (Expression 21) in Step 5 where the value of the target sub-pixel is α>0.2 (Step 4).

On the other hand, the filtering coefficient determining unit 532 determines three filtering coefficients to apply a filtering process with respect to the target sub-pixel as a function of [α] value of the target sub-pixel on the basis of (Expression 21) in Step 6 where the α value of the target sub-pixel is α≦0.2 (Step 4).

In addition, in Steps 5 and 6, five filtering coefficients may be determined on the basis of (Expression 22).

In Step 7, the filtering processing unit 531 carries out a filtering process on the target sub-pixel, using the filtering coefficients determined by the filtering coefficient determining unit 532.

In Step 8, the Y component of the target sub-pixel for which a filtering process is applied is stored in the memory unit 54.

A process from Step 4 through Step 8 is repeated (Step 9) while renewing the target sub-pixels (Step 10) until the processing is completed for all sub-pixels.

As described above, in the present embodiment, three filtering coefficients are determined for a filtering process with respect to the data of the target sub-pixel on the basis of (Expression 21) (This is the third example of determining filtering coefficients).

Thereby, at a portion ($\alpha \leq 0.2$) where it is recognized that the image is a portion of only the background where human looks at an alpha blending image, the filtering intensity is weakened in response to the size of [α], and it is possible to suppress the background portion of the alpha blending image from blurring in a sufficiently practical range of use.

Further, since there are three filtering coefficients for a filtering process with respect to the data of the target sub-pixel, where $\alpha \leq 0.2$, the filtering coefficients are easily determined and the filtering process can be simply carried out, wherein the processing speed can be further accelerated as a whole.

On the other hand, at a portion where the complete foreground only or a portion where it is recognized that the background is made transparent into the foreground $\alpha > 0.2$) when human looks at the alpha blending image, the filtering intensity is strengthened, and color unevenness can be prevented from occurring at the foreground portion of the alpha blending image.

Also, in the present embodiment, it is possible to determine five filtering coefficients for a filtering process with respect to the data of the target sub-pixel on the basis of (Expression 22). (This is the fourth example of determining filtering coefficients).

Accordingly, at a portion ($\alpha \leq 0.2$) where it is recognized that the alpha blending image is only the background when a human looks at the alpha blending image, the filtering intensity is weakened in response to the size of [α], and it is possible to suppress the background portion of the alpha blending image from blurring in a sufficiently practical range of use.

On the other hand, at a portion where the complete foreground only or a portion where the background is made transparent into the foreground ($\alpha > 0.2$) when a human looks at the alpha blending image, the filtering intensity is strengthened, and color unevenness can be prevented from occurring at the foreground portion of the alpha blending image.

Further, since there are five filtering coefficients for a filtering process with respect to the data of the target sub-pixel, a fine filtering process can be carried out with respect to the foreground portion of the alpha blending image, and it is possible to quite effectively suppress color unevenness.

In addition, in the present embodiment, the type of a color image is YCbCr, whereby since a filtering process is executed for the Y component which is a precise brightness component of the color image, an effect of the filtering can be remarkably effectively displayed, and color unevenness can be remarkably suppressed effectively.

EMBODIMENT 5

The entire structure of an image-processing apparatus according to Embodiment 5 of the present invention is similar to that of an image-processing apparatus in FIG. 12.

Therefore, in the description of Embodiment 5, a description is given on the assumption that an image-processing apparatus in FIG. 12 is an image-processing apparatus of Embodiment 5.

A point in which Embodiment 5 differs from Embodiment 3 is a method for determining filtering coefficients by the filtering coefficient determining unit 532.

Since all other points of Embodiment 5 are the same as those in Embodiment 3, the description thereof is properly omitted, and a description is given, focusing on the filtering coefficient determining unit 3.

As shown in FIG. 12, the α value per sub-pixel is inputted in the filtering coefficient determining unit 532. And, the filtering coefficient determining unit 532 determines three filtering coefficients with respect to the respective sub-pixels of an alpha blending image on the basis of the α value (This is the fifth example of determining filtering coefficients).

A detailed description is given of this point. Herein, it is assumed that the α value used to generate data of the target sub-pixel of the alpha blending image is [α(x,y)].

Also, it is assumed that the α value used to generate data of the sub-pixel adjacent to the left side of the target sub-pixel is [α(x−1,y)] and the α value used to generate data of the sub-pixel adjacent to the right side of the target sub-pixel is [α(x+1,y)].

In this situation, the filtering coefficient determining unit 532 makes the maximum value of [α(x−1,y)], [[α(x,y)], and [α(x+1,y)] into α$.

$$\alpha\$ = \mathrm{MAX}\{\alpha(x-1, y), \alpha(x, y), \alpha(x+1, y)\} \quad \text{[Expression 23]}$$

And, the filtering coefficient determining unit 532 determines the filtering coefficients so that the ratio of three filtering coefficients for a filtering process with respect to the data of the target sub-pixel becomes as in [Expression 24].

$$\alpha\$:1+2(1-\alpha\$):\alpha\$ \quad \text{[Expression 24]}$$

As shown in (Expression 24), the respective three filtering coefficients are determined as functions of [α$].

Thus, the point of using the maximum value of α$ in Embodiment 5 differs from Embodiment 3 in which [α(x,y)] of the target sub-pixel is employed. The reason will be described later in detail.

Now, the filtering processing unit 531 carries out a filtering process on an alpha blending image, which is generated by the translucent blending unit 52, by using the filtering coefficients determined by the filtering coefficient determining unit 532. In this case, the filtering processing unit 531 applies a filtering process for the data of the Y components of the alpha blending image.

Figure 20:
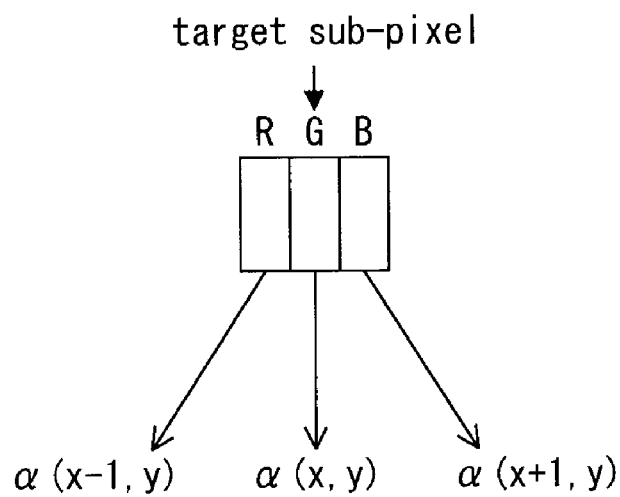
FIG. 20 is a view describing the fifth example of determination of filtering coefficients of an image-processing apparatus according to Embodiment 5 of the invention.

A detailed description is given of the above-described point using FIG. 14(*a*) and FIG. 20. In the description, a case where the filtering coefficient determining unit 532 calculates three filtering coefficients (⅓)a, (⅓)b and (⅓)c with respect to the target sub-pixel of G as shown in FIG. 14(*a*) is taken for instance.

However, in Embodiment 5, [a], [b] and [c] are not determined as shown in FIG. 14(*a*), but are determined as described below.

FIG. 20 is a view describing the fifth example of determining filtering coefficients in the filtering unit 53 in FIG. 12.

As shown in FIG. 20, it is assumed that α value of the target sub-pixel of G is [α(x,y)], the α value of the sub-pixel of R adjacent to the left side thereof is [α(x−1,y)], and the α value of the sub-pixel of B adjacent to the right side thereof is [α(x+1,y)].

In this case, the filtering coefficient determining unit 532 obtains the maximum value α$ of [α(x,y)], [α(x−1,y)], and [α(x+1,y)] on the basis of (Expression 23).

And, the filtering coefficient determining unit 532 determines a:b:c so that the ratio becomes as shown in (Expression 24).

The filtering coefficient determining unit 532 thus determines [a], [b], and [c], and multiplies each of these by ⅓ to calculate the three filtering coefficients.

Now, in Embodiment 5, the three filtering coefficients are determined by using the maximum value of [α$], differing from Embodiment 3. Next, the reason thereof will be described.

In Embodiment 3, the filtering coefficients are determined as functions of α value using (Expression 17).

Therefore, where the α value remarkably changes between adjacent sub-pixels as at the boundary between the foreground portion and the background portion, the filtering coefficients radically change between the adjacent sub-pixels. There may be a case where color phase irregularity occurs by such a radical change in the filtering coefficients.

Therefore, in the present embodiment, by determining the filtering coefficients using the maximum value of α$ of the three α values, in total, of the target sub-pixel and sub-pixels adjacent to both sides of the target sub-pixel, the filtering intensity with respect to the target sub-pixel is strengthened in cases where the α value of the target sub-pixel is small and the α values of the adjacent sub-pixels are remarkably large, and the blurring degree of the target sub-pixel is increased.

Thereby, where the α value remarkably changes between adjacent sub-pixels, it is possible to suppress color phase irregularity resulting from a radical change in the filtering coefficients.

Also, according to (Expression 17), where the α value of the target sub-pixel is small and the α values of the adjacent sub-pixels are remarkably large, the filtering intensity of the target sub-pixel is weakened.

However, in the present embodiment, where the α value does not radically change between the adjacent sub-pixels, for example, where the background portion is formed between the adjacent sub-pixels, the filtering intensity with respect to the target sub-pixel is weakened as in Embodiment 3, and it is possible to prevent the background portion from blurring.

Now, the filtering processing unit 531 inputs the three filtering coefficients obtained as described above from the filtering coefficient determining unit 532 and obtains V(x,y) on the basis of (Expression 18).

The V(x,y) is the result of having applied a filtering process on the Y component of the target sub-pixel of G of the alpha blending image.

In the above description, a case where the filtering coefficient determining unit 532 determines the three filtering coefficients with respect to the respective sub-pixels of the alpha blending image on the basis of the inputted α value is taken for instance (This is the fifth example of determining filtering coefficients).

Next, a description is given, as the sixth example of determining filtering coefficients, of a case in which the filtering coefficient determining unit 532 determines five filtering coefficients with respect to the respective sub-pixels of the alpha blending image on the basis of the inputted α value.

Herein, it is assumed that the α value used to generate data of the target sub-pixel of the alpha blending image is [α(x,y)].

Also, it is assumed that the α value used to generate data of the sub-pixel adjacent to the target sub-pixel via the sub-pixel adjacent to the left side of the target sub-pixel is [α(x−2,y)], and the α value used to generate data of the sub-pixel adjacent to the left side of the target sub-pixel is [α(x−1,y)].

Still further, it is assumed that the α value used to generate data of the sub-pixel adjacent to the target sub-pixel via the sub-pixel adjacent to the right side of the target sub-pixel is [α(x+2,y)], and the α value used to generate data of the sub-pixel adjacent to the right side of the target sub-pixel is [α(x+1,y)].

In this case, the filtering coefficient determining unit 532 makes the maximum value of [α(x−2,y)], [α(x−1,y)], [α(x,y)], [α(x+1,y)], and [α(x+2,y)] into [α$].

$$\alpha\$ = \text{MAX}\{\alpha(x-2,y), \alpha(x-1,y), \alpha(x,y), \alpha(x+1,y)\alpha(x+2,y)\} \quad \text{[Expression 25]}$$

And, the filtering coefficient determining unit 532 determines the filtering coefficients so that the ratio of five filtering coefficients for a filtering process with respect to the data of the target sub-pixel becomes as in (Expression 26).

$$\alpha\$^2 : 2\alpha\$\beta : 2\alpha\$^2 + \beta^2 : 2\alpha\$\beta : \alpha\$^2\beta = 1 + 2(1-\alpha\$) \quad \text{[Expression 26]}$$

As shown in (Expression 26), each of the five filtering coefficients is determined as a function of [α$]. Thus, the reason why the maximum value of α$ is used is similar to the above.

The filtering processing unit 531 applies a filtering process on the alpha blending image generated by the translucently blended unit 52 by using the filtering coefficients determined by the filtering coefficient determining unit 532. In this case, the filtering processing unit 531 carries out a filtering process on the data of the Y component of the alpha blending image.

The above-described point will be described in detail, using FIG. 15(a) and FIG. 21. In the description, as shown in FIG. 15(a), a case where five filtering coefficients (⅑)A, (⅑)B, (⅑)C, (⅑)D, and (⅑)E are calculated with respect to the target sub-pixel of G is taken for instance.

However, in Embodiment 5, [A], [B], [C], [D] and [E] are not determined as shown in FIG. 15(a), but are determined as described below.

Figure 21:
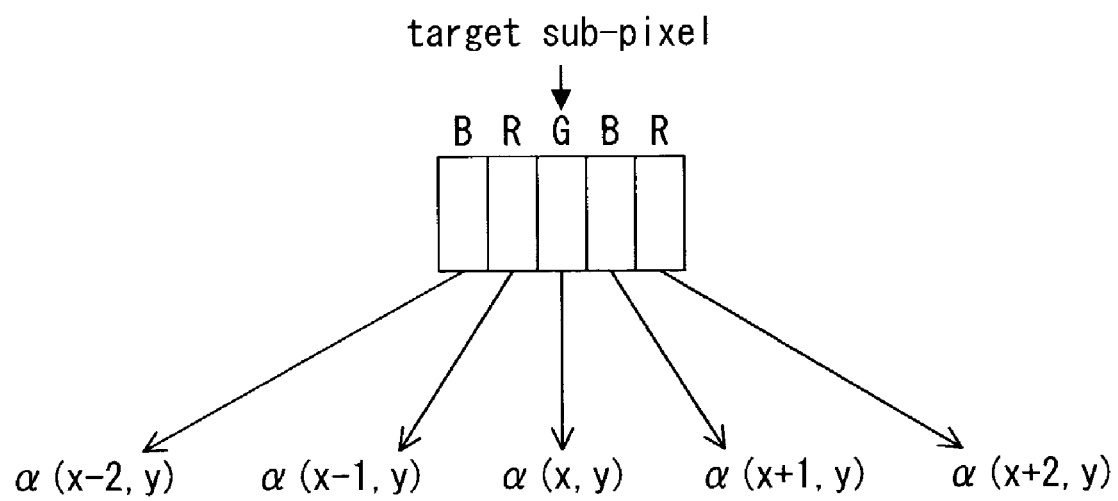
FIG. 21 is a view describing the sixth example of determination of filtering coefficients of an image-processing apparatus according to Embodiment 5 of the invention.

FIG. 21 is a view describing the sixth example of determining filtering coefficients in the filtering unit 53 in FIG. 12.

As shown in FIG. 21, it is assumed that the α value of the target sub-pixel of G is [α(x,y)].

Also, it is assumed that the α value of sub-pixels of B adjacent to the target sub-pixel of G via the sub-pixel of R adjacent to the left side of the target sub-pixel is [α(x−2,y)], and the α value of the sub-pixel of R adjacent to the left side of the target sub-pixel is [α(x−1,y)].

Also, it is assumed that the α value of sub-pixels of R adjacent to the target sub-pixel of G via the sub-pixel of B adjacent to the right side of the target sub-pixel is [α(x+2,y)], and the α value of the sub-pixel of B adjacent to the left side of the target sub-pixel is [α(x+1,y)].

In this case, the filtering coefficient determining unit 532 obtains the maximum value α$ of [α(x−2,y)], [α(x−1,y)], [α(x,y)], [α(x+1,y)], and [α(x+2,y)] on the basis of (Expression 25).

And, the filtering coefficient determining unit 532 determines A:B:C:D:E into the ratio as shown in (Expression 26).

Thus, the filtering coefficient determining unit 532 determines [A], [B], [C], [D], and [E] and multiplies each of these by ⅑ to calculate five filtering coefficients.

Now, the filtering processing unit 531 inputs the five filtering coefficients obtained as described above from the filtering coefficient determining unit 532, and obtains V(x,y) on the basis of (Expression 20).

The V(x,y) is the result of having carried out a filtering process on the Y component of the target sub-pixel of G of the alpha blending image.

Figure 22:
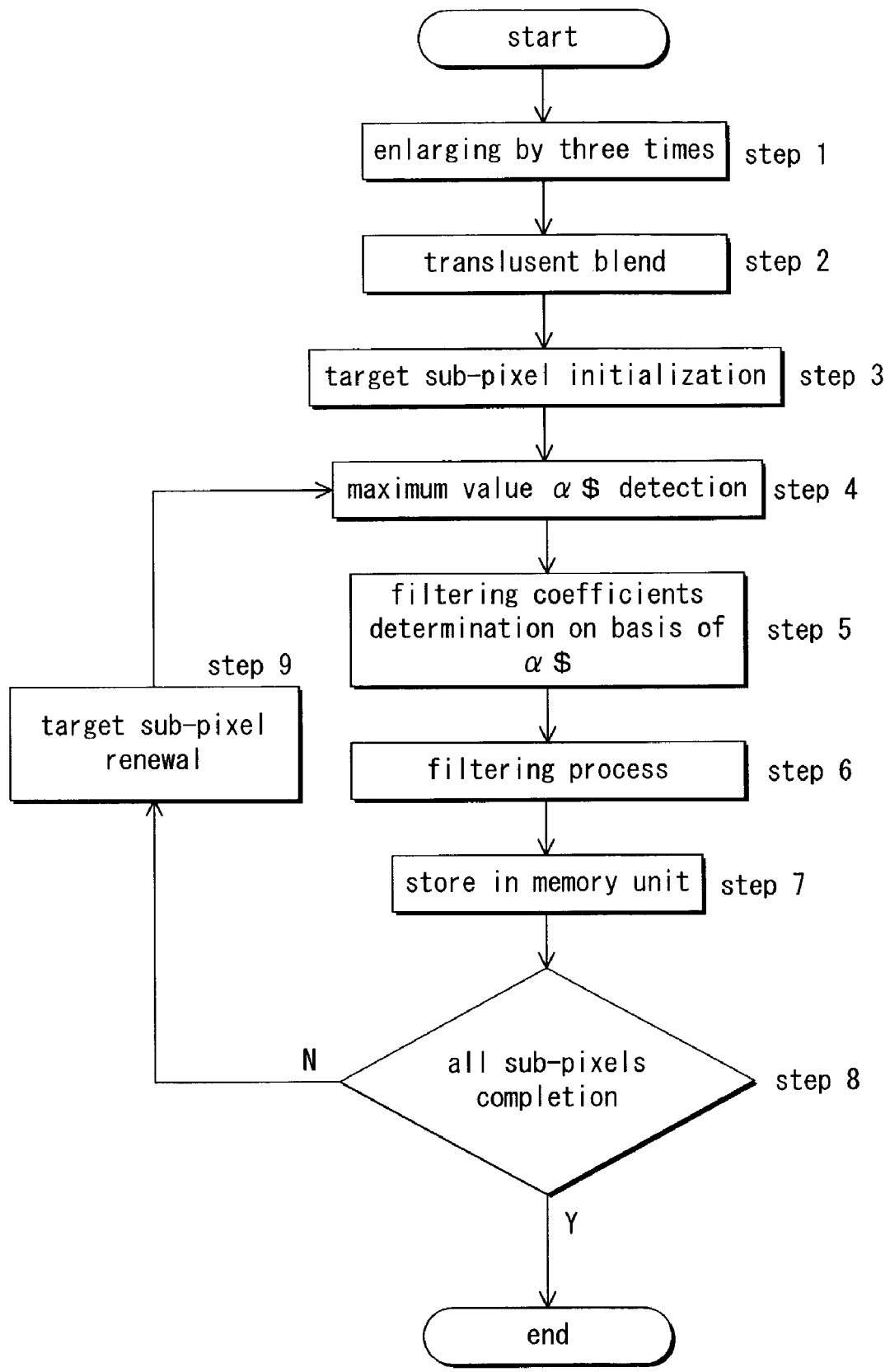
FIG. 22 is a flowchart of an image-processing apparatus according to Embodiment 5 of the invention.

Next, using FIG. 12 and FIG. 22, a description is given of a processing flow of an image-processing apparatus according to Embodiment 5.

FIG. 22 is a flowchart of the image-processing apparatus according to Embodiment 5.

As shown in FIG. 22, in Step 1, the three-time enlarging unit 51 enlarges the background image of normal precision by three times and generates a three-time enlarged data. And, the three-time enlarged data are outputted into the translucent blending unit 52.

In Step 2, the translucent blending unit 52 translucently blends the background image and foreground image on the basis of the α values in order to generate an alpha blending image. And, the alpha blending image is outputted into the filtering processing unit 531.

In Step 3, the filtering processing unit 531 initializes the target sub-pixel at the top left initial position in the alpha blending image.

In Step 4, the filtering coefficient determining unit 532 detects the maximum value α$ of the three α values of the target sub-pixel and sub-pixels adjacent to both side of the target sub-pixel on the basis of (Expression 23).

In Step 5, the filtering coefficient determining unit 532 determines three filtering coefficients to apply a filtering process with respect to the target sub-pixels on the basis of the maximum value α$ in compliance with (Expression 24).

Also, in Step 4, the maximum value α$ may be obtained from five α values, in total, of the target sub-pixel and sub-pixels adjacent thereto on the basis of (Expression 25).

In this case, in Step 5, five filtering coefficients are determined on the basis of (Expression 26).

In Step 6, the filtering processing unit 531 carries out a filtering process for the target sub-pixel, using the filtering coefficients determined by the filtering coefficient determining unit 532.

In Step 7, the Y component of the target sub-pixel for which a filtering process is carried out is stored in the memory unit 54.

The processing from Step 4 through Step 7 is repeated (Step 8) while renewing the target sub-pixels (Step 9) until the processing of all the sub-pixels is completed.

As described above, in the present embodiment, the three filtering coefficients for a filtering process with respect to the data of the target sub-pixel are determined on the basis of (Expression 23) and (Expression 24). (This is the fifth example of determining filtering coefficients).

Thereby, while, at the background portion where the α value is small, the filtering intensity is weakened, and it is possible to suppress the background portion of the alpha blending image from blurring, at the foreground portion where the α value is not small, the filtering intensity is strengthened, and color unevenness of the foreground portion of the alpha blending image can be suppressed.

Further, by determining the filtering coefficients using the maximum value α$ of the three α values, in total, of the target sub-pixel and sub-pixels adjacent to both sides of the target sub-pixel, the filtering intensity is strengthened, wherein the blurring degree of the target sub-pixel can be increased.

As a result, where the α value remarkably changes between the adjacent sub-pixels, it is possible to prevent color phase irregularity resulting from a radical change in the filtering coefficients from occurring.

Also, since there are three filtering coefficients for a filtering process with respect to data of the target sub-pixel, the filtering coefficients can be easily determined, and the filtering process can be simply carried out, wherein the processing speed can be accelerated.

Also, in the present embodiment, the five filtering coefficients for a filtering process with respect to data of the target sub-pixel may be determined on the basis of (Expression 25) and (Expression 26). (This is the sixth example of determining filtering coefficients).

Thereby, the filtering intensity is weakened at a portion where the α value is small, and it is possible to suppress the background portion of the alpha blending image from blurring. On the other hand, at the foreground portion where the α value is not small, the filtering intensity is strengthened, and it is possible to suppress the foreground portion of the alpha blending image from color unevenness.

Further, by determining the filtering coefficients using the maximum value α$ of the five α values, in total, of the target sub-pixel and sub-pixels consecutively adjacent to the target sub-pixel, the filtering intensity is strengthened, wherein the blurring degree of the target sub-pixel can be increased.

As a result, where the α value remarkably changes between sub-pixels located in the vicinity, it is possible to suppress the color phase irregularity resulting from a radical change in the filtering coefficients.

Also, since there are five filtering coefficients for a filtering process with respect to the data of the target sub-pixel, a fine filtering process can be carried out with respect to the foreground portion of the alpha blending image.

Resultantly, color unevenness can be quite effectively suppressed with respect to the foreground portion of the alpha blending image.

Also, in the present embodiment, the type of color image is YCbCr, wherein since a filtering process can be carried out with respect to the Y component that is a precise brightness component of the color image, the filtering effect can be remarkably effectively displayed, and color unevenness can be remarkably effectively suppressed.

EMBODIMENT 6

The entire structure of an image-processing apparatus according to Embodiment 6 of the invention is similar to that of the image-processing apparatus in FIG. 12.

Therefore, in a description of Embodiment 6, the description is based on the assumption that the image-processing apparatus in FIG. 12 is an image-processing apparatus for Embodiment 6.

Embodiment 6 differs from Embodiment 3 in a method for determining filtering coefficients by the filtering coefficient determining unit 532.

Embodiment 6 is similar to Embodiment 3 in all other points. Therefore, description is properly omitted, and is focuses on the filtering coefficient determining unit 3.

Now, an image-processing apparatus according to Embodiment 6 is a combination of an image-processing apparatus according to Embodiment 4 and an image-processing apparatus according to Embodiment 5.

The point is explained while describing a processing flow in the image-processing apparatus according to Embodiment 6.

Figure 23:
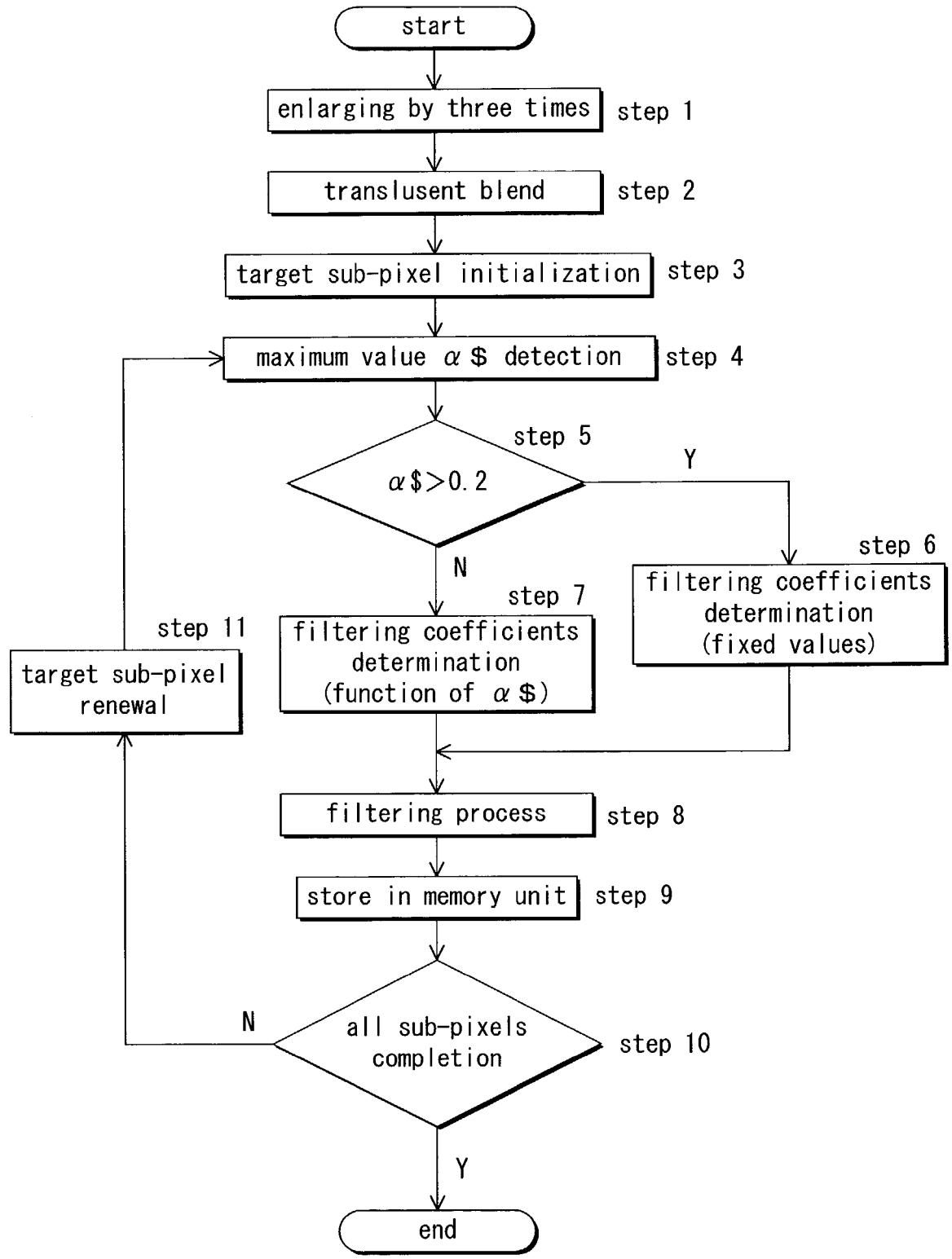
FIG. 23 is a flowchart of an image-processing apparatus according to Embodiment 6 of the invention.

FIG. 23 is a flowchart of an image-processing apparatus according to Embodiment 6.

As shown in FIG. 23, in Step 1, the three-time enlarging unit 51 enlarges the background image of normal precision by three times and generates a three-time enlarged data. And, the three-time enlarged data are outputted into the translucent blending unit 52.

In step 2, the translucent blending unit 52 translucently blends the background and foreground images on the basis of an α value, and generates an alpha blending image. And, the alpha blending image is outputted into the filtering processing unit 531.

In Step 3, the filtering processing unit 531 initializes the target sub-pixel at the top left initial position in the alpha blending image.

In Step 4, the filtering coefficient determining unit 532 detects the maximum value α$ of three α values of the target sub-pixel and sub-pixels adjacent to both sides of the target sub-pixel on the basis of (Expression 23). The reason why the maximum value α$ is obtained is the same as that for Embodiment 5.

Now, the filtering coefficient determining unit 532 makes the three filtering coefficients fixed values on the basis of the following expression in Step 6 where α$>0.2 (Step 5). (This is the seventh example of determining filtering coefficients).

then α$>0.2

1:1:1 then α$≦0.2

$\alpha\psi:1+2(1-\alpha\psi):\alpha\psi\alpha\psi=5.0\times\alpha\$$  [Expression 27]

On the other hand, the filtering coefficient determining unit 532 determines three filtering coefficients for a filtering process with respect to the target sub-pixel as a function of the maximum value α$ on the basis of (Expression 27) in Step 7 where α$≦0.2. (This is the seventh example of determining filtering coefficients).

The reason why the filtering coefficients are made fixed values where α$>0.2 and the filtering coefficients are determined on the basis of (Expression 27) where α$≦0.2 is the same as that of Embodiment 4.

Here, in Step 8, the filtering processing unit 531 carries out a filtering process for the target sub-pixel by using the filtering coefficients determined by the filtering coefficient determining unit 532.

In Step 9, the Y component of the target sub-pixel to which the filtering process is applied is stored in the memory unit 54.

The processing from Step 4 through Step 9 is repeated (Step 10) while renewing the target sub-pixels (Step 11) until the process is completed for all the sub-pixels.

Also, in Step 4, the filtering coefficient determining unit 532 can obtain the maximum value α$ of the five α values, in total, of the target sub-pixel and sub-pixels in the vicinity thereof on the basis of (Expression 25).

In this case, in Steps 6 and 7, the filtering coefficient determining unit 532 determines five filtering coefficients on the basis of the following expression. (This is the eighth example of determining the filtering coefficients).

then α$>0.2

1:2:3:2:1 then α$≦0.2

$\alpha\psi^2:2\alpha\psi\beta:2\alpha\psi^2+\beta^2:2\alpha\psi\beta:\alpha\psi^2\alpha\psi=5.0\times\alpha\$ \ \beta=1+2(1-\alpha\psi)$  [Expression 28]

Here, as described above in the present invention, three filtering coefficients for a filtering process with respect to the data of the target sub-pixel are determined on the basis of (Expression 23) and (Expression 27). (This is the seventh example of determining filtering coefficients).

Thereby, at a portion (α$≦0.2) where it is recognized that an alpha blending image is a portion of only the background where a human looks at the alpha blending image, the filtering intensity is weakened in response to the size of α$, and it is possible to suppress the background portion of the alpha blending image from blurring in a sufficiently practical range of use.

Further, by determining the filtering coefficients using the maximum value α$ of the three filtering coefficients, in total, of the target sub-pixel and sub-pixels adjacent to both sides thereof, the filtering intensity is strengthened, and the blurring degree of the target sub-pixel can be increased.

As a result, where the α value remarkably changes between the adjacent sub-pixels, color phase irregularity resulting from a radical change in the filtering coefficients can be suppressed.

Also, since there are three filtering coefficients for a filtering process with respect to data of the target sub-pixel, where α$≦0.2, the filtering coefficients can be easily determined, and the filtering process can be simply carried out, wherein the processing speed can be accelerated as a whole.

On the other hand, at a portion (α$>0.2) where it is recognized that an alpha blending image is only a foreground portion or a portion where the background is made transparent into the foreground when human looks at the alpha blending image, the filtering intensity is strengthened, and color unevenness of the foreground portion of the alpha blending image can be suppressed.

Also, in the present embodiment, five filtering coefficients for a filtering process with respect to the data of the target sub-pixel may be determined on the basis of (Expression 25) and (Expression 28). (This is the eighth example of determining filtering coefficients).

Therefore, at a portion (α$≦0.2) where it is recognized that an alpha blending image is a portion of only the background when a human looks at the alpha blending image, the filtering intensity is weakened in response to the size of [α$], and it is possible to suppress the background portion of the alpha blending image from blurring in a sufficiently practical range of use.

Further, by determining the filtering coefficients by using the maximum value [α$] of the five α values, in total, of the target sub-pixel and sub-pixels consecutively adjacent to both sides thereof, the filtering intensity is strengthened, and the blurring degree of the target sub-pixel can be increased.

As a result, where the α value remarkably changes between sub-pixels located in the vicinity, it is possible to suppress color phase irregularity resulting from a radical change in the filtering coefficients.

On the other hand, at a portion (α$>0.2) where it is recognized that an alpha blending image is a portion of only the foreground or a portion where the background is made transparent into the foreground when a human looks at the alpha blending image, the filtering intensity is strengthened, and color unevenness of the foreground portion of the alpha blending image can be suppressed.

Further, since there are five filtering coefficients for a filtering process with respect to the data of the target sub-pixel, a fine filtering process can be carried out for the foreground portion of the alpha blending image, wherein the color unevenness can be remarkably effectively suppressed.

Also, in the present embodiment, since the type of color image is YCbCr, a filtering process is executed with respect to the Y component, which is a precise brightness component of the color image, and a filtering effect can be remarkably effectively displayed, and the color unevenness can be remarkably effectively suppressed.

EMBODIMENT 7

Where a sub-pixel rendering process is carried out, such a process is repeated, in which display data that are stored in a frame memory in the form of R, G and B values, and the display data is converted to a color space YCbCr. After a prescribed process is carried out, the data is converted to a color space RGB again and the display data are written to the frame memory.

For example, such a repeated process is carried out in Embodiment 1 and Embodiment 2.

Here, regardless of whether or not the sub-pixel rendering process is carried out, where conversion of display data is repeated between the color space RGB and the color space YCbCr (however, it is assumed that Y1, Y2, and Y3 are provided per pixel as the brightness component Y), there may be cases where color phase irregularity occurs as described below.

For example,

[Expression 29] is employed for conversion from R, G and B to YCbCr, and

[Expression 30] is employed for conversion from YCbCr to R, B and G.

$$Y1=Y2=Y3=G$$

$$yCb=G-B$$

$$Cr=G-R \qquad \text{[Expression 29]}$$

$$G=Y2$$

$$B=Y3-Cb$$

$$R=Y1-Cr \text{[Expression 30]}$$

Herein, initially, it is assumed that (Y1, Y2, Y3, Cb, Cr)=(10, 15, 20, 0, 0). If this is converted to R, G and B values using (Expression 30), (R, G, B)=(10, 15, 20) is brought about. And, if this is returned to the color space YCbCr by using (Expression 29), (Y1, Y2, Y3, Cb, Cr)=(15, 15, 15, 5, −5) is brought about. The above-described process is only conversion in the mere color space, wherein the colors should be returned to their original colors.

However, in fact, the colors are not returned to their original colors. If this is expressed in terms of phenomenon, color blurring results from an error or a difference due to the conversion.

Therefore, as described above, there are cases where display quality deteriorates if this type of conversion is repeated. Also, where expressions other than (Expression 29) and (Expression 30) are employed, display quality may deteriorate as well.

Therefore, Embodiment 7 provides a displaying apparatus in which color blurring scarcely occurs even if conversion is repeated between two color spaces.

Figure 24:
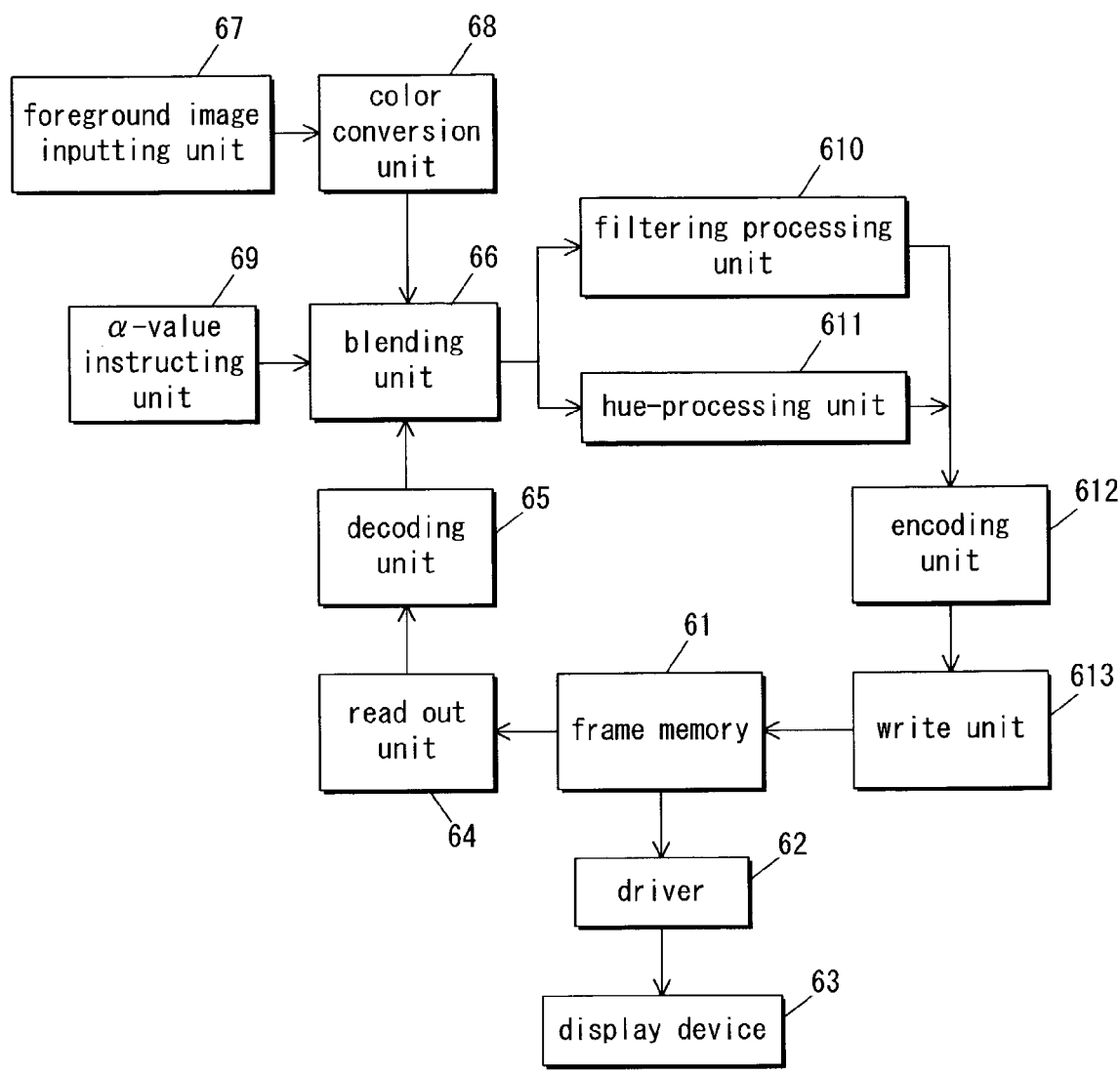
FIG. 24 is a block diagram of a displaying apparatus according to Embodiment 7 of the invention.

FIG. 24 is a block diagram of a displaying apparatus according to Embodiment 7 of the invention.

Figure 27:
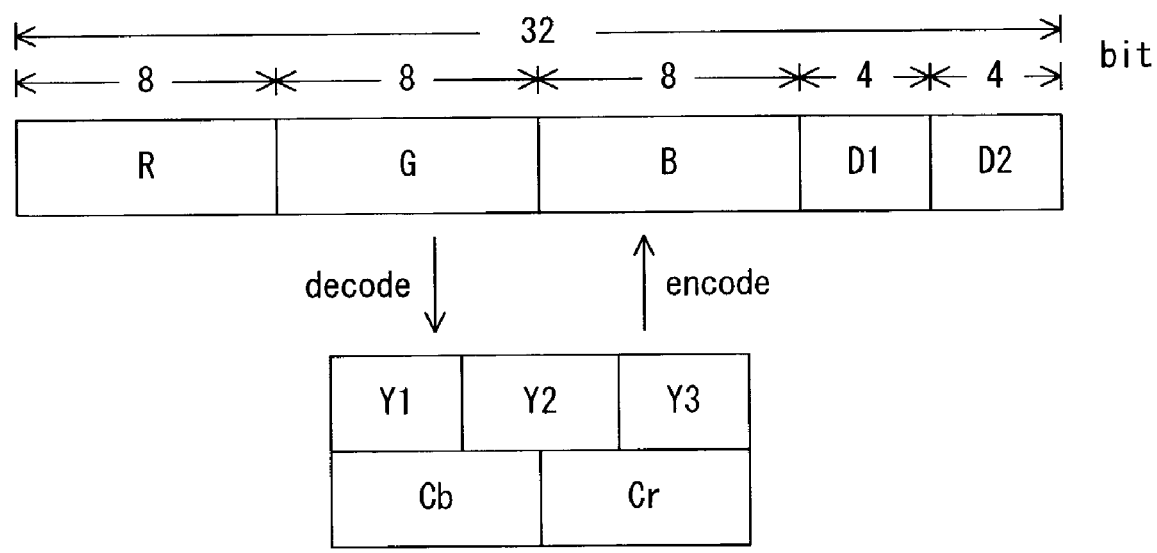
FIG. 27 is a view describing conversion of color space and correction information.

In FIG. 24, the frame memory 61 stores display data. The display data are 32-bit data consisting of R, G and B values (each consisting of 8 bits) and correction information (D1 and D2) per pixel of the display device 63 as shown in FIG. 27. And, the respective components D1 and D2 of the correction information are, respectively, of four bits.

And, in the specification, this is called [decode] wherein the color space RGB (which is expressed in terms of R, G and B values and correction information (D1, D2)) is converted to the color space YCbCr, and three brightness components Y1, Y2 and Y3 and hue components Cb and Cr are obtained. That is, [Decode] referred to in the specification does not mean that "original information is obtained by inversely converting coded information", which is generally used.

On the contrary, in the specification, this is called [encode] wherein R, G and B values and correction information (D1, D2) are obtained by carrying out conversion from three brightness components Y1, Y2, and Y3 and hue components Cb and Cr (that is, the color space YCbCr) to the color space RGB. That is, [Encode] referred to in the specification does not mean that "coded information is obtained by forward conversion of original information", which is generally used.

Also, in FIG. 24, the driver 62 independently controls respective light-emitting elements of the display device 63 and causes them to emit light on the basis of the display data of the frame memory 61. Herein, the display device 63 is, for example, a color liquid crystal panel, etc. In the display device 63, one pixel is composed by aligning light-emitting elements, which emit respective colors of R, G and B, in a fixed order (for example, order of R, G and B). Also, a color plasma display and an organic EL display, etc., may be used as the display device 63.

Herein, display data written in the frame memory 61 are transmitted to the display device 63 through the driver 62 and are also an image displayed on the display screen of the display device 63 at present. And, since the displaying apparatus carries out a process of sequentially superimposing the foreground images on the display data of the frame memory 61, in this meaning, the display data written in the frame memory 61 can be said to be data of the background image immediately before being superimposed.

The read out unit 64 reads out display data from a portion region of the frame memory 61. The portion region may be one line to be focused, of the display screen of the display device 63 or may be a focused portion of regions which are obtained by dividing the display screen of the display device 63 with respective unique identifiers. Further, it may be a specific region indicated by an element (not illustrated). In an extreme case, the portion region may be the entire region of the frame memory 61.

Figure 25:
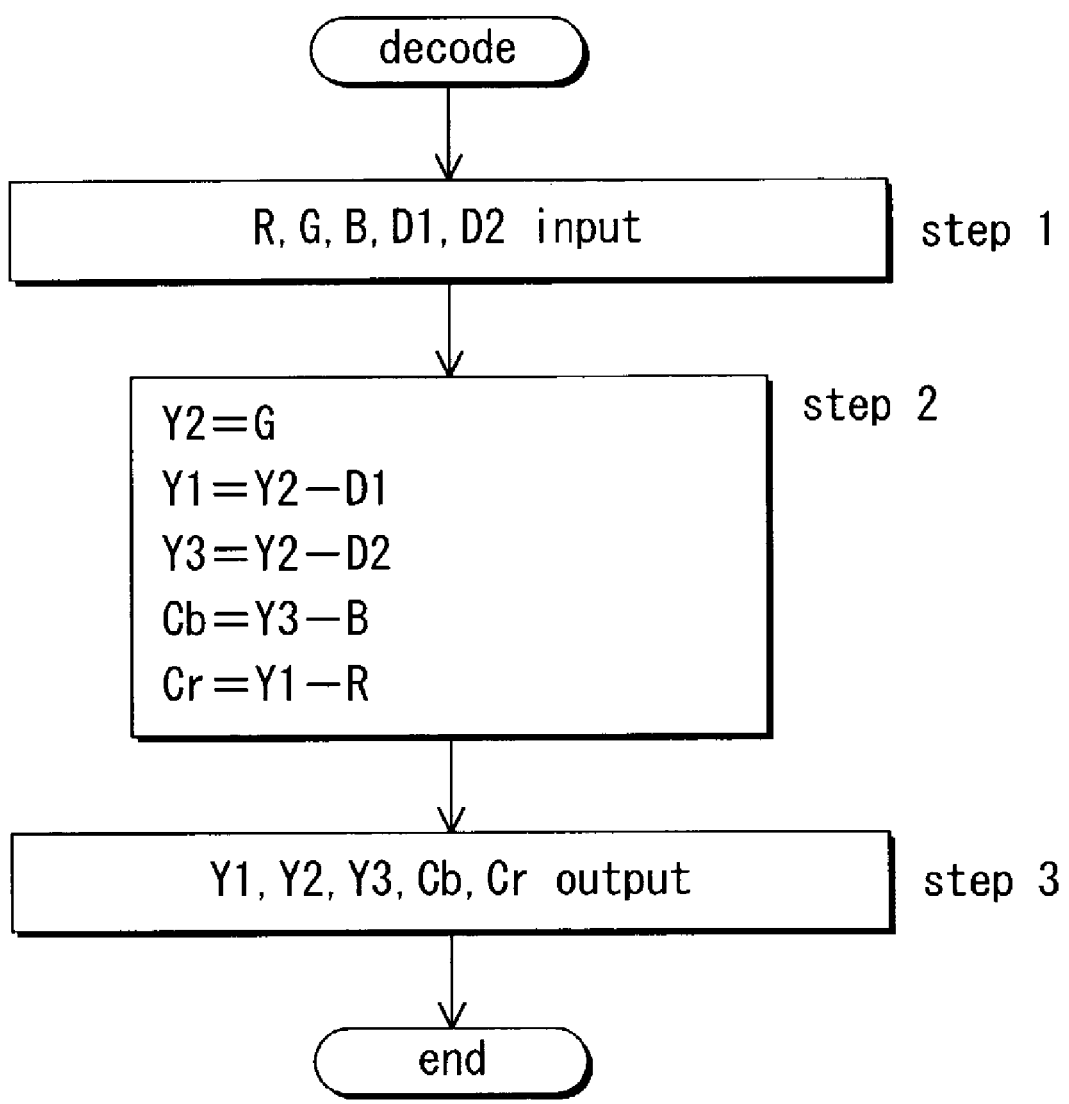
FIG. 25 is a flowchart of decoding according to Embodiment 7 of the invention.

The decoding unit 65 decodes display data (background image) of the portion region, which are read out by the read out unit 64, in compliance with a flowchart shown in FIG. 25.

As described above, the display data (background image) has a structure shown at the upper portion of FIG. 27 per pixel, is expressed in the color space RGB, and at the same time have correction information (D1 and D2).

And, as shown in FIG. 25, in Step 1, the decoding unit 65 inputs respective values of R, G, B, D1 and D2 per pixel. And in Step 2, conversion of the color space is carried out by (Expression 31).

$$Y2=G$$

$$Y1=Y2-D1$$

$$Y3=Y2-D2$$

$$Cr=Y1-R$$

$$Cb=Y3-B \qquad \text{[Expression 31]}$$

Y1, Y2, Y3: brightness components
D1, D2: correction information

Herein, the example which is described at the beginning of description of Embodiment 7 is taken into consideration. In the example, as will be described later in connection with the encoding unit 612, (R, G, B, D1, D2)=(10, 15, 20, 5, −5) is obtained.

If so, by calculations in Step 2, (Y1, Y2, Y3, Cb, Cr)=(10, 15, 20, 0, 0) is provided. Thereby, by adding correction information (D1, D2), it is understood that the status can be completely returned to the original state.

And, in Step 3 in FIG. 25, the decoding unit 65 outputs three brightness components Y1, Y2, Y3 and two hue components Cb and Cr, which are obtained per pixel, to the blending unit 66, whereby the blending unit 66 inputs data which is obtained by converting the background image of the frame memory 61 to the color space YCbCr.

The foreground image inputting unit 67 inputs a foreground image to be superimposed, into the background image inputted by the blending unit 66. Herein, since the foreground image inputting unit 67 inputs the foreground image in terms of the expression of the color space RGB, the foreground image is converted to the color space YCbCr by the color conversion unit 68 and is inputted into the blending unit 66. Also, if the foreground image inputting unit 67 inputs the foreground image in terms of the expression of the color space YCbCr, the color conversion unit 68 may be omitted.

In the example, although the foreground image inputting unit 67 inputs a three-time image having precision three times greater in the juxtaposing direction along which three light-emitting elements are arranged than in the direction orthogonal thereto in response to the three light-emitting elements of the display device 63, such an image may not be the foreground image.

Also, an α-value instructing unit 69 instructs an α value in a blending process to the blending unit 66. The blending unit 66 blends the background image (Y1b, Y2b, Y3b, Cbb, Crb) and the foreground image (Y1f, Y2f, Y3f, Cb, Crf) by the following expression using the α value, thereby obtaining a blend image (Y1#, Y2#, Y3#, Cb#, Cr#).

$$Yi\#=\alpha \times Yif+(1-\alpha)Yib (i=1,2,3)$$

$$Cb\#=\alpha \times Cbf+(1-\alpha)Cbb$$

$$Cr\#=\alpha \times Crf+(1-\alpha)Crb$$

And, the blending unit 66 transfers the brightness components (Y1#, Y2#, Y3#) to the filtering processing unit 610 and transfers the hue components (Cb#, Cr#) to the hue-processing unit 611.

Here, in the example, the filtering processing unit 610 carries out a sub-pixel rendering process, which is described in the above-described paper ([Sub-pixel Font Rendering Technology]), using the brightness components (Y1#, Y2#, Y3#), etc., and the hue-processing unit 611 carries out a prescribed process with respect to the hue components (Cb#, Cr#). Herein, the processes themselves, which are carried out by the filtering processing unit 610 and hue-processing unit 611, have been already described in the above-described embodiments. Further description is omitted. However, in an extreme case, the filtering processing unit 610 and hue-processing unit 611 may be omitted, wherein the brightness components (Y1#, Y2#, Y3#) and hue components (Cb#, Cr#) may be directly outputted into the encoding unit 612.

Figure 26:
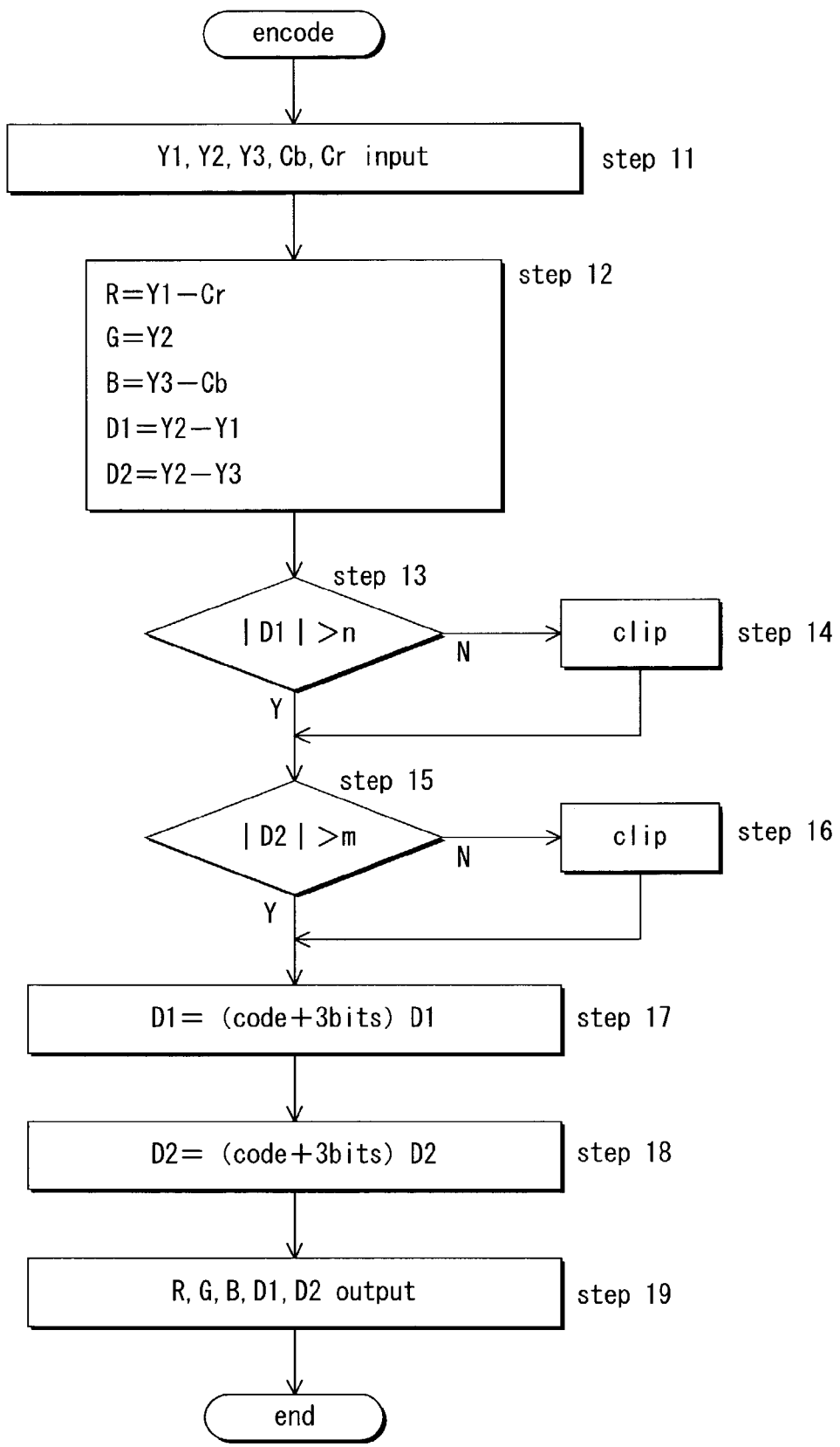
FIG. 26 is a flowchart of encoding of Embodiment 7 thereof.

The encoding unit 612 converts a blend image to the color space RGB along the flowchart shown in FIG. 26, and at the same time, generates correction information (D1, D2).

In detail, in Step 12 in FIG. 26, the encoding unit 612 inputs the blend image, using Y1=Y1#, Y2=Y2#, Y3=Y3#, Cb=Cb#, and Cr=Cr#.

Next, in Step 12, the encoding unit 612 acquires R, G and B values and correction information by (Expression 32).

$$R=Y1-Cr$$

$$G=Y2$$

$$B=Y3-Cb$$

$$D1=Y2-Y1$$

$$D2=Y2-Y3 \qquad \text{[Expression 32]}$$

Y1, Y2, Y3: brightness components
D1, D2: correction information

Herein, if the above example is taken again, since (Y1, Y2, Y3, Cb, Cr)=(10, 15, 20, 0, 0), the result of processing in Step 12 becomes (R, G, B, D1, D2)=(10, 15, 20, 5, −5).

Next, in Step 13 and Step 14, the encoding unit 612 carries out a clipping process so that the absolute value of the component D1 of the correction information becomes smaller than n (in this example, n=31). And, in Step 15 and Step 16, the encoding unit 612 also carries out a clipping process so that the absolute value of the component D2 of the correction information becomes smaller than m (in this example, m=63).

Here, according to research carried out by the present inventor, et. al., if filtering process coefficients, for which the relationship where the contribution degree of light-emitting elements for emitting respective colors of R, G and B becomes R>G>B is taken into consideration, are used, it is understood that approx. 70% of the components D1 and D2 is in the above-described clipping range. Therefore, in the present embodiment, n and m values are determined as described above.

However, this is merely for illustration. Therefore, the n and m values may be changed, or the clipping itself may be omitted.

Next, in Steps 17 and 18, the encoding unit 612 picks up a code and three bits so that the components D1 and D2 of the correction information, respectively, become 4 bits, and normalizes the code and three bits.

Herein, in the present embodiment, since the maximum value of the absolute value is made into [31] with respect to the component D1, 3 bits of the second through fourth bit are picked up with respect to the component D1. Similarly, since the maximum value of the absolute value is made into [63], three bits of the third through fifth bit are picked up with respect to the component D2.

After the above-described process is completed, the encoding unit 612 outputs the obtained R, G and B values and correction information (D1, D2) into the write unit 613 in FIG. 24. (Step 19).

And, in FIG. 24, the write unit 613 overwrites display data (blend image and correction information), which are obtained from the encoding unit 612, in the portion region read out in advance by the read out unit 64.

If the above-described process is repeated, the display data of the frame memory 61 is renewed one after another, the display screen of the display device 63 changes.

In addition, in the description of the above-described Embodiment 7, if (Expression 31) is replaced by (Expression 33) or (Expression 32) is replaced by (Expression 34), an effect similar thereto can be brought about.

$$\begin{pmatrix} Y2 \\ Cb \\ Cr \end{pmatrix} = \begin{pmatrix} 1 & 0 & 1.402 \\ 1 & -0.344 & -0.714 \\ 1 & 1.772 & 0 \end{pmatrix}^{-1} \begin{pmatrix} R+D1 \\ G \\ B+D2 \end{pmatrix} \quad \text{[Expression 33]}$$

Y1=Y2−D1, Y3=Y2−D2

Y1, Y2, Y3: brightness components
D1, D2: correction information

R=Y1+1.402Cr

G=Y2−0.344Cb−0.714Cr

B=Y3+1.772Cb

D1=Y2−Y1, D2=Y2−Y3 [Expression 34]

Y1, Y2, Y3: brightness components
D1, D2: correction information

Further, in the present embodiment, only correction information is stored in an entire 8-bit region left after removing 24 bits, which are used for R, G and B values, from the region of 32 bits.

However, it is possible that the entire number of bits for the correction information is made smaller than 8 bits, other information is stored in 8 bits along with the correction information.

As described above, according to the present embodiment (Embodiment 7), the regions of a frame memory, which have not been effectively utilized in prior arts, can be effectively utilized, and color blurring, which may be brought about in line with conversion of the color space, can be suppressed, thereby improving the display quality.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A displaying method for causing a display device, in which one pixel is comprised by aligning three light-emitting elements emitting respective colors of R, G and B in a juxtaposing direction, to display data by independently controlling said light-emitting elements on the basis of data of a frame memory, comprising:
   of extracting a line image, which comprises one line parallel to the juxtaposing direction of the light-emitting elements, from a three-time image;
   determining a work region in which an M sub-pixel is added to the front side of said line image and an N sub-pixel is added to the rear side thereof in the juxtaposing direction where M and N are natural numbers;
   reading out a background image of a region corresponding to said work region from said frame memory;
   blending said read out background image, whose precision is made the same precision as the three-time image in a pseudo state, and said line image, and obtaining a blend image; and
   writing image data resulting from said blend image in a region corresponding to said work region of the frame memory;
   wherein said extracting through said writing are repeated for all lines of the three-time image.

2. The displaying method as set forth in claim 1, wherein said work region has a length that is divisible by 3 in sub-pixel precision.

3. The displaying method as set forth in claim 1, wherein an α value concerning the line image is acquired in said extracting, and said blending is carried out on the basis of the acquired α value.

4. The displaying method as set forth in claim 3, wherein the α value used for said blending and a fixed threshold value are compared in terms of size, and a filtering parameter β normalized to be 0 or 1 is generated.

5. The displaying method as set forth in claim 4, wherein a filtering process is carried out on brightness components and a range of β=1 is enlarged before carrying out said filtering process.

6. The displaying method as set forth in claim 4, wherein a filtering process is carried out on brightness components in a range of β=1.

7. The displaying method as set forth in claim 1, wherein said blending is carried out in a color space RGB.

8. The displaying method as set forth in claim 1, wherein said blending is carried out in a color space YCbCr.

9. The displaying method as set forth in claim 1, wherein a color space RGB is converted to a color space YCbCr on the basis of Y=G, Cb=G−B, and Cr=G−R, and the color space YCbCr is inversely converted to the color space RGB on the basis of R=Y−Cr, G=Y, and B=Y−Cb.

10. A displaying apparatus having a display device which comprises one pixel by aligning three light-emitting elements to emit respective colors of R, G and B in a juxtaposing direction, a driver for independently controlling the respective light-emitting elements of said display device, and a frame memory for providing image data to said driver, said displaying apparatus comprising:
    a unit for extracting a line image, which comprises one line parallel to the juxtaposing direction of the light-emitting elements, from a three-time image;
    a unit for determining a work region in which an M sub-pixel is added to the front side of said line image and an N sub-pixel is added to the rear side thereof in the juxtaposing direction where M and N are natural numbers;
    a unit for reading out a background image of a region corresponding to the work region from the frame memory;
    a unit for blending said read out background image, whose precision is made the same precision as the three-time image in a pseudo state, and said line image, and acquiring a blend image; and
    a unit for writing image data resulting from said blend image in a region corresponding to said work region of the frame memory.

11. The displaying apparatus as set forth in claim 10, wherein the work region has a length that is divisible by 3 in sub-pixel precision.

12. The displaying apparatus as set forth in claim 10, wherein said line image-extracting unit acquires an α value concerning the line image, and said blending unit carries out blending on the basis of the acquired α value.

13. The displaying apparatus as set forth in claim 12, wherein the α value used for blending and a fixed threshold value are compared in terms of size to generate a filtering parameter β normalized to be 0 or 1.

14. The displaying apparatus as set forth in claim 13, wherein a range of β=1 is enlarged before carrying out a filtering process for the brightness components.

15. The displaying apparatus as set forth in claim 13, further including a filtering processing unit for carrying out a filtering process for brightness components in the range of β=1.

16. The displaying apparatus as set forth in claim 10, wherein said blending unit blends in a color space RGB.

17. The displaying apparatus as set forth in claim 10, wherein said blending unit blends in a color space YCbCr.

18. The displaying apparatus as set forth in claim 10, further comprising:

a color conversion unit for converting a color space RGB to a color space YCbCr on the basis of Y=G, Cb=G−B, Cr=G−R, and an inverse color conversion unit for inversely converting the color space YCbCr to the color space RGB on the basis of R=Y−Cr, G=Y, B=Y−Cb.

* * * * *